(12) United States Patent
Lindee et al.

(10) Patent No.: US 8,469,697 B2
(45) Date of Patent: Jun. 25, 2013

(54) ROTARY MOLD SYSTEM FOR MOLDING FOOD PRODUCTS

(75) Inventors: Scott A. Lindee, Mokena, IL (US); David Hansen, Orland Park, IL (US); Salvatore Lamartino, Orland Park, IL (US); Bruce Bauer, Mokena, IL (US); Thomas C. Wolcott, Mokena, IL (US); Steve Ill, Mokena, IL (US); E. William Wight, Roscoe, IL (US)

(73) Assignee: Formax, Inc., Mokena, IL (US)

( * ) Notice: Subject to any disclaimer, the term of this patent is extended or adjusted under 35 U.S.C. 154(b) by 41 days.

(21) Appl. No.: 13/187,426

(22) Filed: Jul. 20, 2011

(65) Prior Publication Data

US 2012/0058213 A1 Mar. 8, 2012

Related U.S. Application Data

(60) Provisional application No. 61/366,033, filed on Jul. 20, 2010.

(51) Int. Cl.
*B29C 45/42* (2006.01)

(52) U.S. Cl.
USPC ............ 425/556; 235/375; 425/572; 425/588

(58) Field of Classification Search
USPC ........................... 235/375; 425/556, 572, 588
See application file for complete search history.

(56) References Cited

U.S. PATENT DOCUMENTS

| | | | |
|---|---|---|---|
| 3,427,649 A | 2/1969 | Fay | |
| 3,768,228 A | 10/1973 | Doering, Jr. | |
| 3,851,355 A | 12/1974 | Hughes | |
| 4,118,831 A * | 10/1978 | Holly et al. | 425/562 |
| 4,193,167 A * | 3/1980 | Orlowski et al. | 425/556 |
| 4,212,609 A | 7/1980 | Fay | |
| 4,276,318 A * | 6/1981 | Orlowski et al. | 426/513 |
| 4,284,973 A * | 8/1981 | Howell et al. | 340/429 |
| 4,298,326 A * | 11/1981 | Orlowski | 425/219 |
| 4,404,229 A | 9/1983 | Treharne | |
| 4,646,385 A | 3/1987 | Roberts et al. | |
| 4,768,260 A | 9/1988 | Sandberg | |
| 4,957,425 A | 9/1990 | Fay | |
| 5,297,947 A | 3/1994 | Cardinali | |
| 5,340,599 A | 8/1994 | Maruyama et al. | |
| 5,411,390 A | 5/1995 | Fay | |
| 6,261,620 B1 | 7/2001 | Leadbeater | |
| 6,811,802 B2 | 11/2004 | van Esbroeck et al. | |
| 7,284,973 B2 | 10/2007 | van Esbroeck et al. | |

(Continued)

*Primary Examiner* — Tim Heitbrink
(74) *Attorney, Agent, or Firm* — Klintworth & Rozenblat IP LLC

(57) ABSTRACT

A rotary molding system for molding food products, mold cavities formed when a mold shell rotates mold shapes disposed along the mold shell into a fill position between a fill plate and a wear plate. Molded food products are removed from mold cavities using knock-out cups, the use of air pressure, or the use of a vacuum source disposed below the mold cavity, without the need to slow the rotation of the mold shell. Knock-out cups may be used with a heating system to reduce accumulation of unwanted materials on the knock-out cups. The rotary molding system can also be used to form products with contoured surfaces. A smart tagging system can be used to ensure that compatible sets of mold shells and knock out cups are being used. A vacuum region may be disposed upstream of the fill position to remove air within the mold cavity prior to filling.

12 Claims, 73 Drawing Sheets

U.S. PATENT DOCUMENTS

| | | | |
|---|---|---|---|
| 7,597,549 B2 * | 10/2009 | van Esbroeck et al. | 425/89 |
| 8,029,841 B2 * | 10/2011 | Van Esbroeck et al. | 426/389 |
| 2005/0220932 A1 | 10/2005 | van der Eerden et al. | |
| 2007/0098862 A1 | 5/2007 | Hansen et al. | |
| 2007/0224305 A1 | 9/2007 | Meskendahl et al. | |
| 2007/0224306 A1 | 9/2007 | van Esbroeck et al. | |
| 2007/0295228 A1 | 12/2007 | Gosz et al. | |
| 2008/0233228 A1 | 9/2008 | Lindee et al. | |
| 2009/0134308 A1 | 5/2009 | van der Eerden et al. | |
| 2009/0134544 A1 | 5/2009 | van Der Eerden et al. | |

* cited by examiner

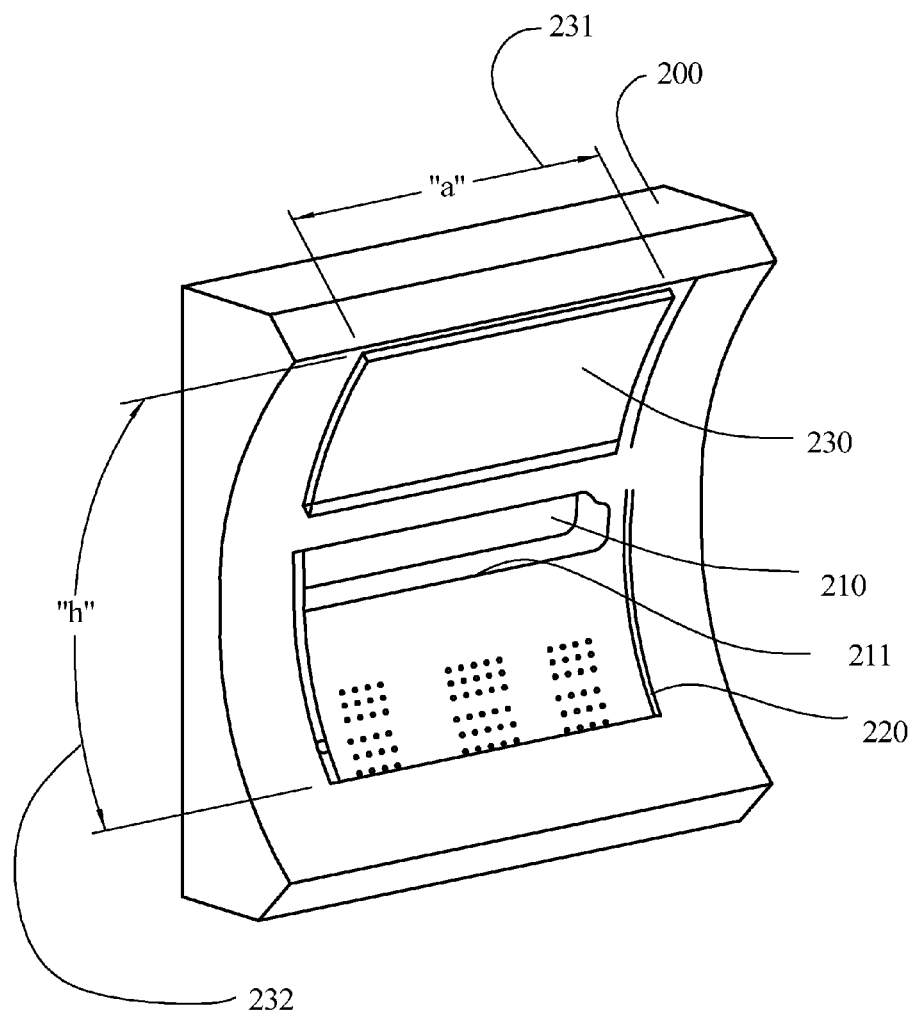

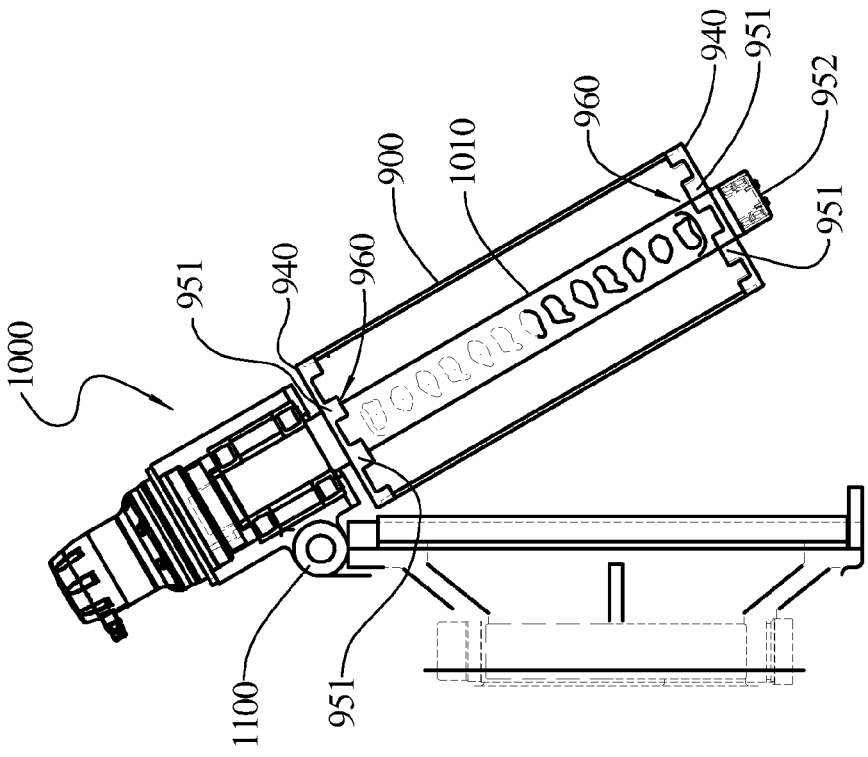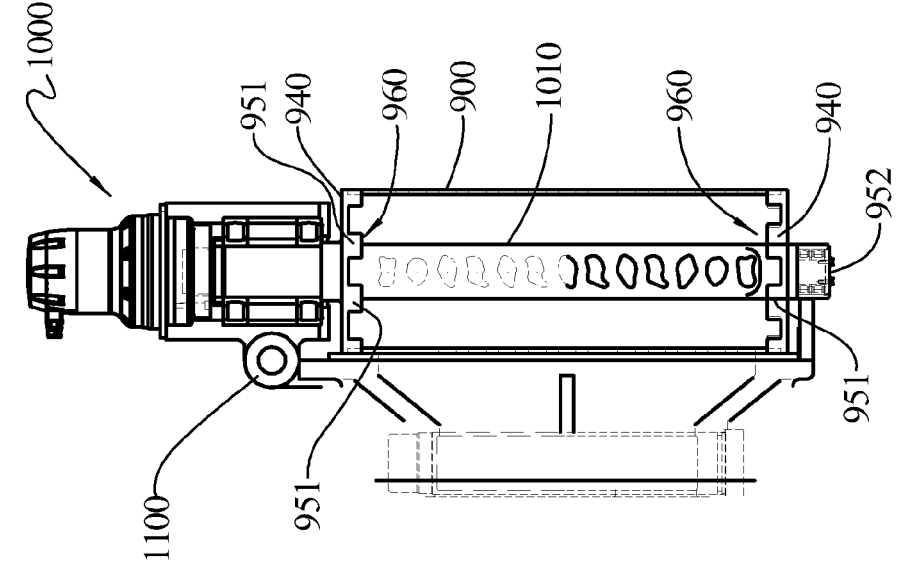

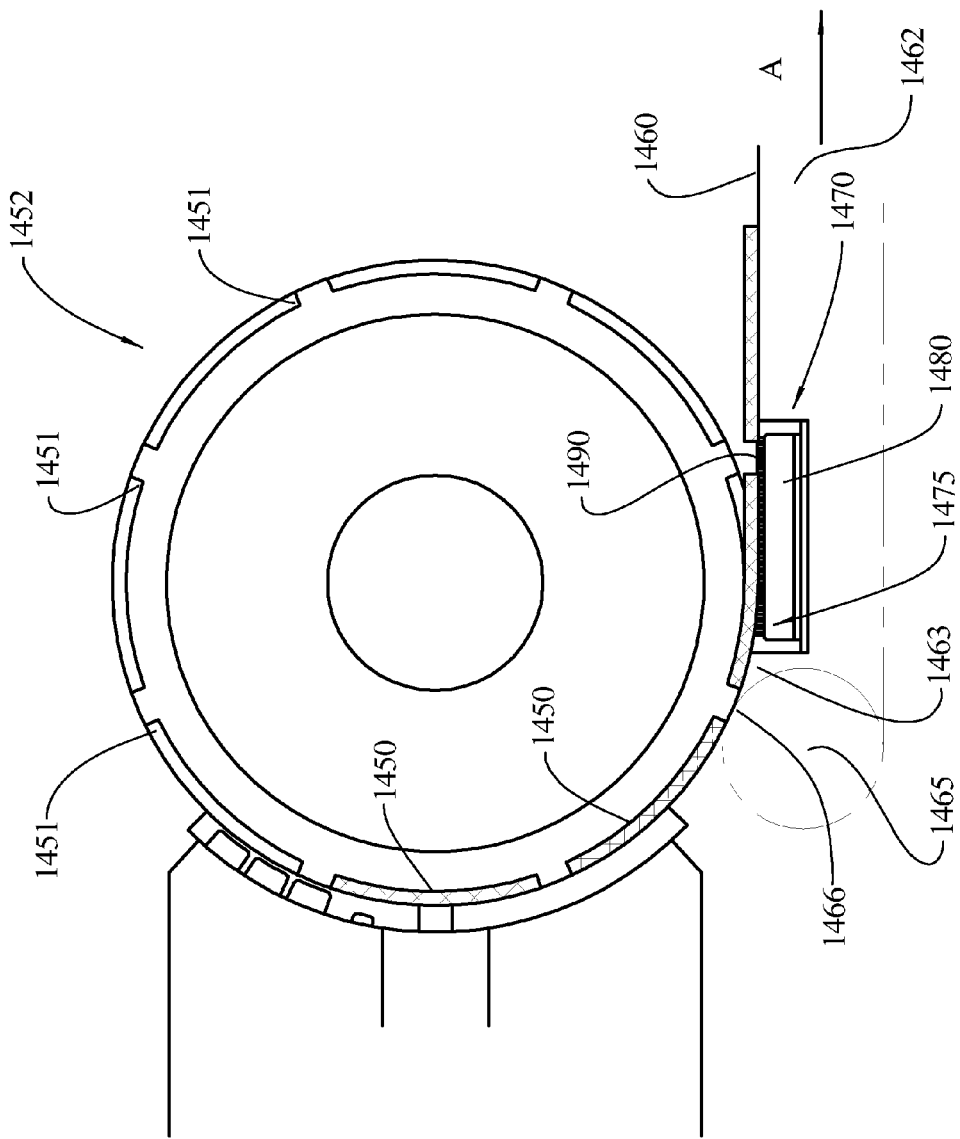

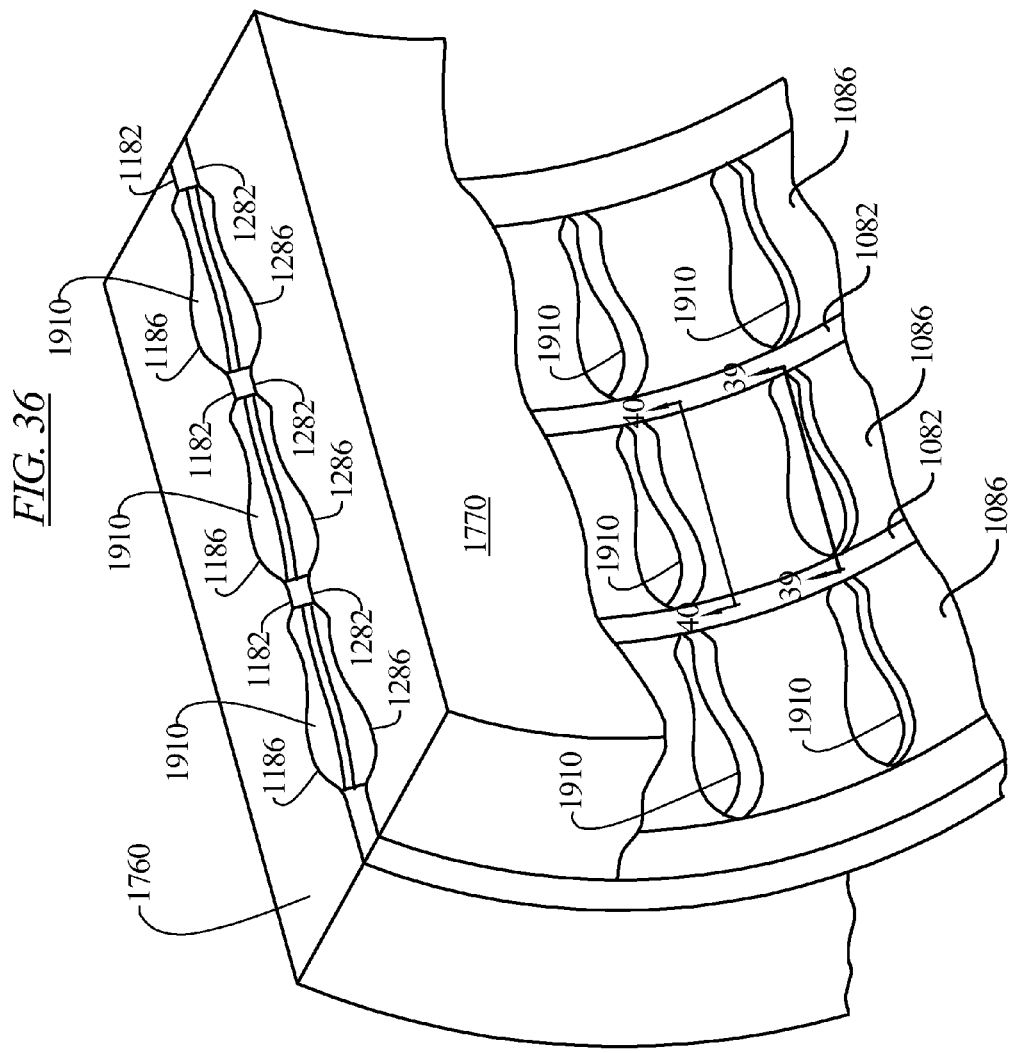

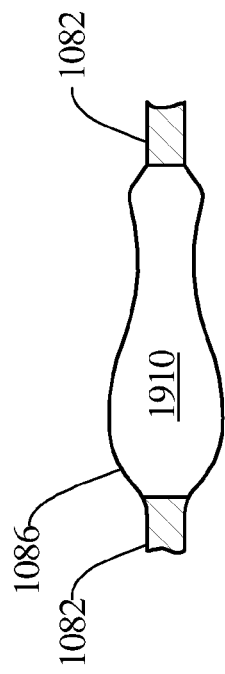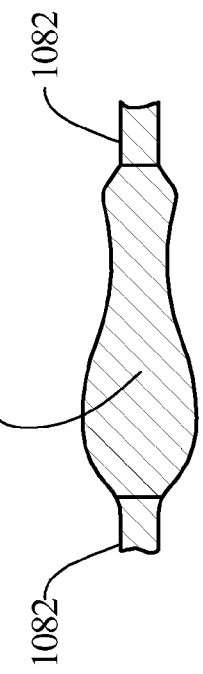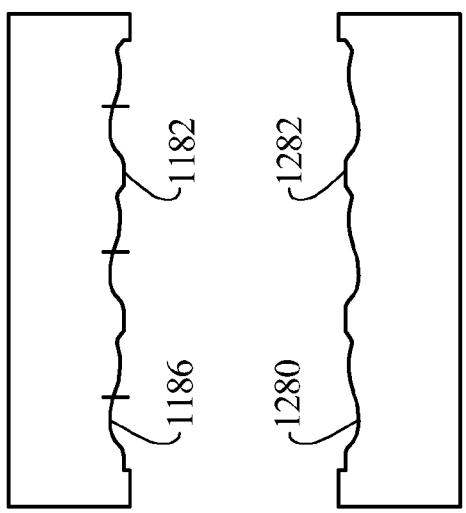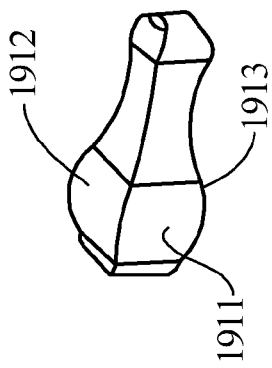

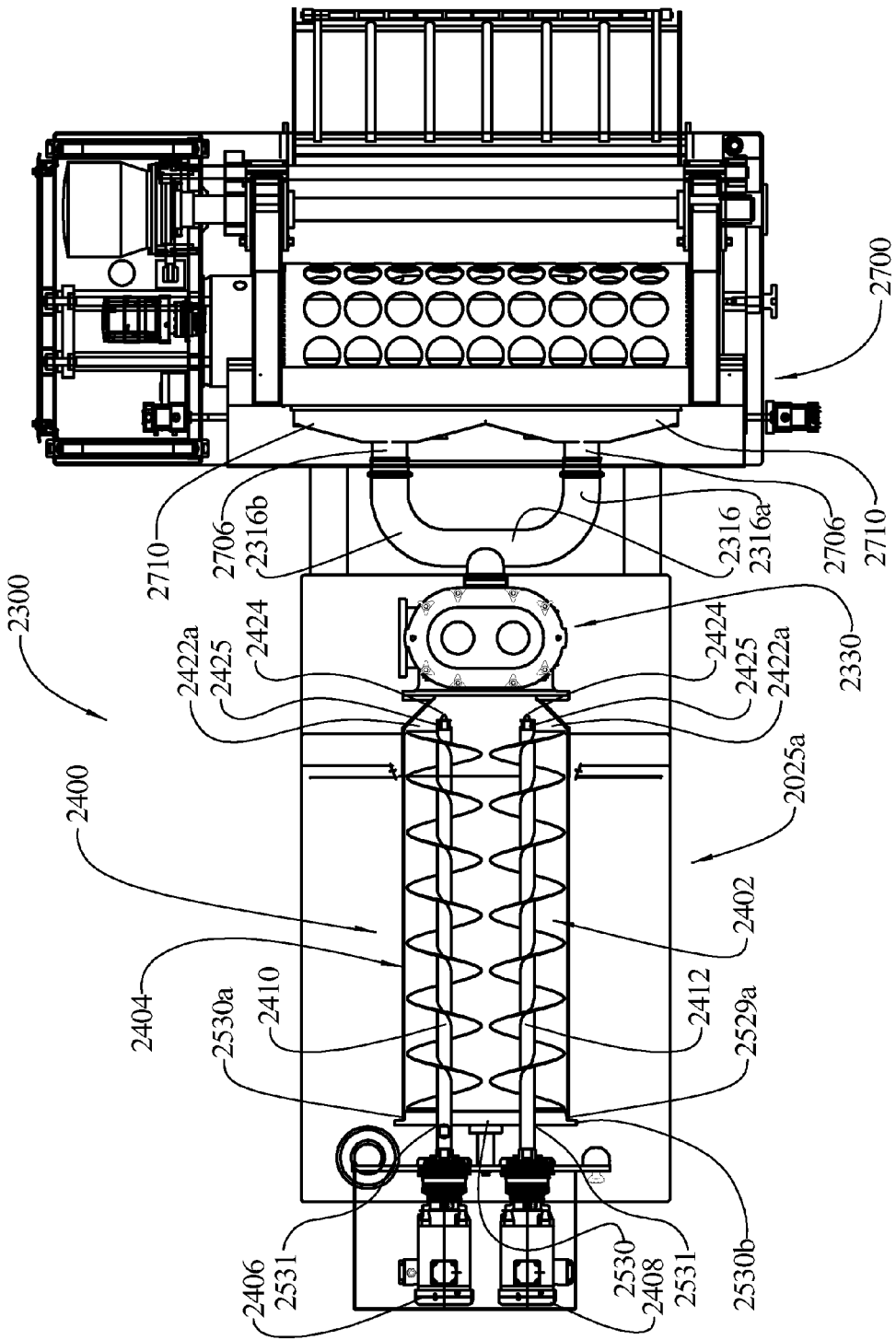

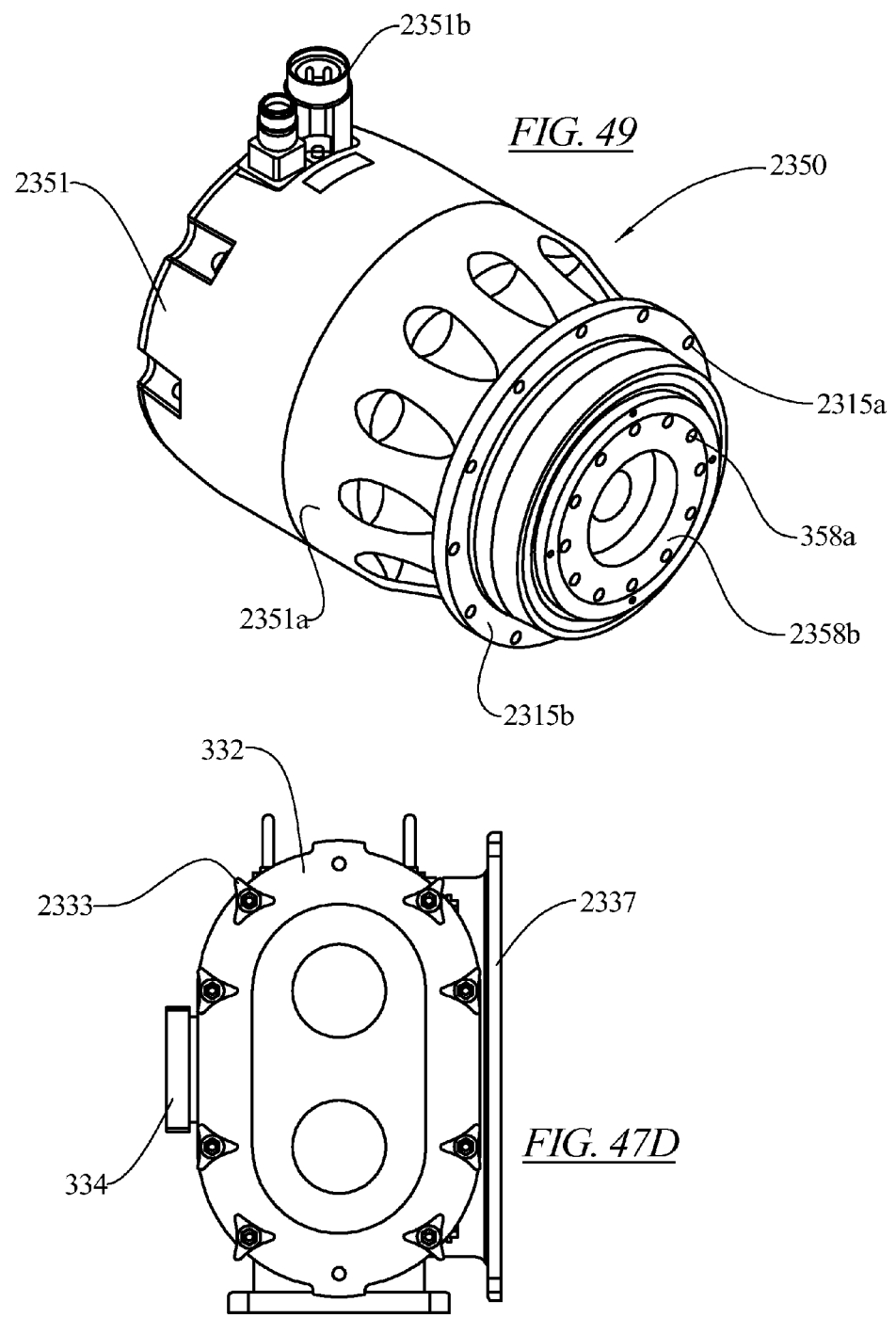

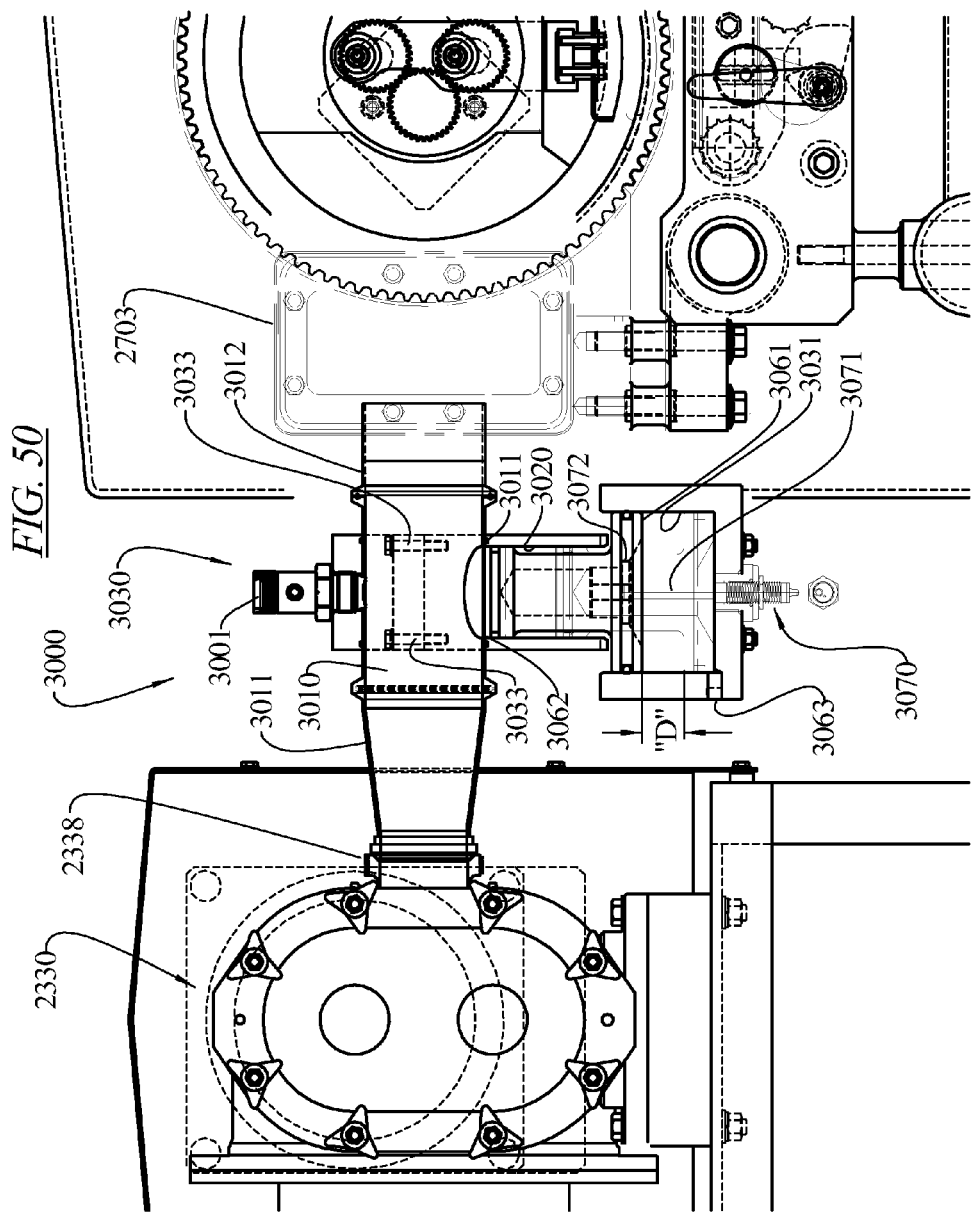

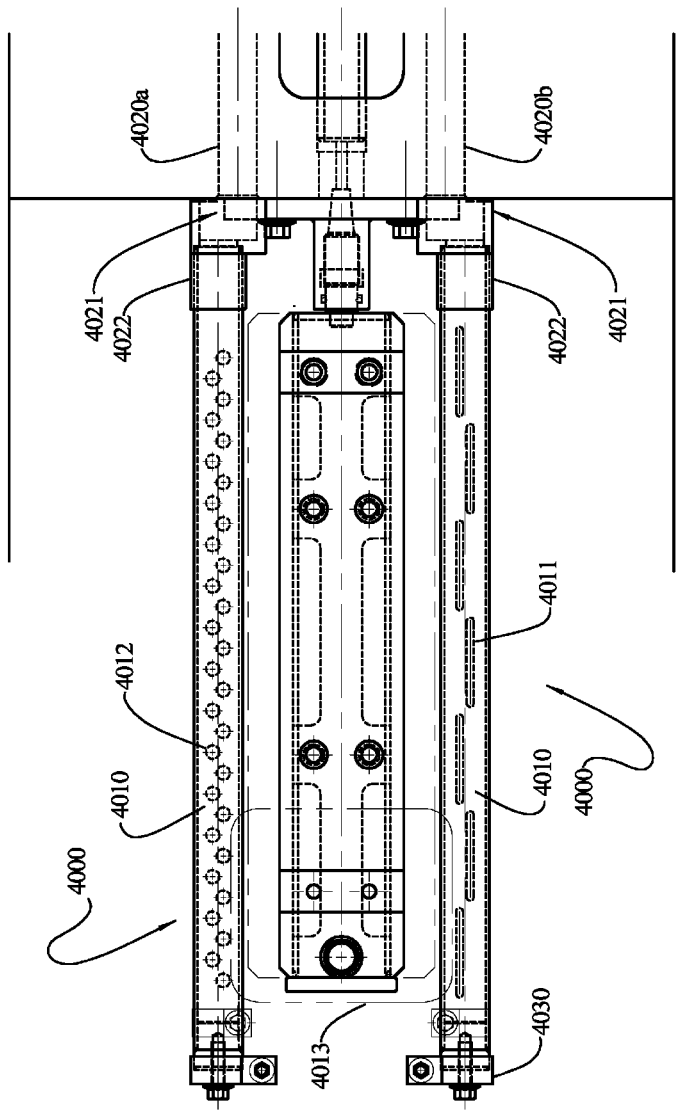

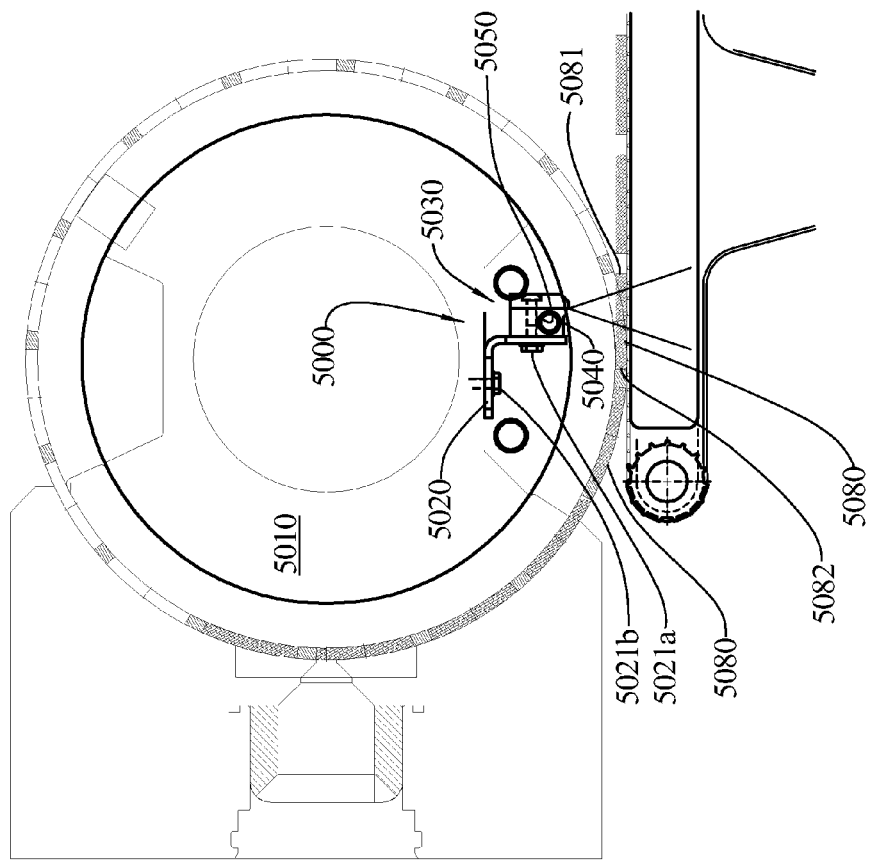

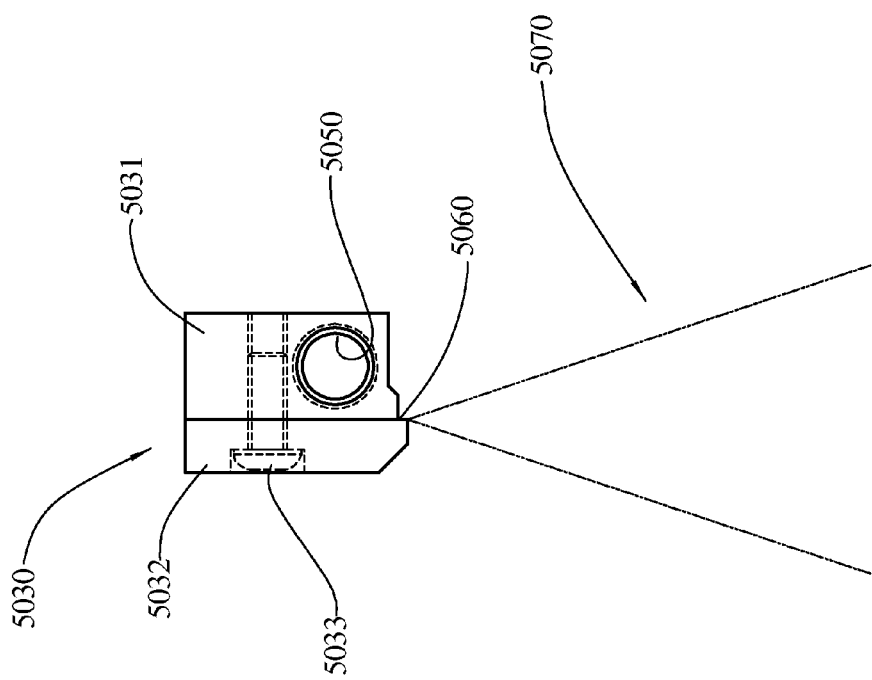

ROTARY MOLD SYSTEM FOR MOLDING FOOD PRODUCTS

This application claims the benefit of U.S. Provisional Application No. 61,366,033 filed on Jul. 20, 2010.

FIELD OF THE INVENTION

This invention relates in general to molding systems and methods for producing specifically shaped products, and more particularly, to the production of food products.

BACKGROUND OF THE INVENTION

Food patties of various kinds, including hamburgers, molded steaks, fish cakes, chicken patties, pork patties, potato patties, and others, are frequently formed in high-volume automated molding machines. U.S. Pat. No. 3,851,355 discloses a meat form apparatus of the rotatable wheel type. U.S. Pat. Nos. 3,427,649; 4,212,609 and 4,957,425 disclose methods and machines for producing molded products using a rotary die with porous bottom walls. Patent Application Publication US 2005/0220932 discloses methods for molding three dimensional products from food stuffs utilizing porous mold cavities. Patent Application Publication US 2007/0224306 also provides a method for molding three dimensional products.

U.S. Pat. No. 3,851,355 discloses a meat forming apparatus of the rotatable wheel type including a plurality of cavities disposed about its peripheral surface. Freely moveable piston means are disposed in each of the cavities. The pistons move radially outward to reject a molded meat product.

In U.S. Pat. Nos. 3,427,649 and 4,212,609, a rotary die roll with die cavities being defined by a configured side wall and a porous bottom wall is disclosed. During revolution of the roll, a batch of the product is forced into each cavity as the cavity is passed beneath a hopper. The bottom walls of the cavities are moved outwardly to force the configured products from the die cavities. Air is forced through the porous bottom walls to assist in the removal of product from the die cavities.

Patent Application Publication US 2005/0220932 discloses the use of a porous structure for the boundary of the mold. The use of a porous structure with intercommunicating pores allows for uniform distribution of a forcing fluid over all the interfaces between the boundary and the molded product, which assists with the uniform removal of the product.

Patent Application Publication US 2007/0224306 discloses methods and molding devices for molding three-dimensional products. The method comprises filling a mold cavity with a portion of the mass under the influence of a filling pressure exerted on the mass, dosing the filling opening of the mold cavity and holding the mass in the mold cavity for a fixing period.

The present inventors have recognized that known prior art molding devices described, and others, have been disadvantageous for various reasons. The present inventors have recognized that some machine molded food patties exhibit a tendency towards excess shrinkage or distortion when the patties are subsequently cooked. The present inventors have recognized that additional problems encountered in high volume food patty molding machines include difficulty in assuring complete and consistent filling of the mold cavity. The present inventors have recognized that some of the prior art devices produce molded products lacking the capacity to form uniform molded products efficiently. The present inventors have recognized that frequently, air trapped in a mold cavity as a result of the mold cavity being filled under high pressure leads to non-uniform food products. The present inventors have recognized that entrapped air also has a tendency to disrupt the ejection process, as the force used to push the formed product out of the mold cavity is not distributed evenly against the molded product. The present inventors have recognized that filling the mold cavity under lower pressure can allow for air to leave the mold cavity, but filling the mold cavity at a lower pressure usually requires an additional step of applying a fixing pressure in order to produce a cohesive product. The present inventors have recognized that removing air in the mold cavity prior to filling the mold cavity can avoid problems with filling mold cavities using prior art apparatuses.

The present inventors have recognized the need for a more efficient rotary molding apparatus which produces molded food products with consistent uniformity. The present inventors have recognized the need for a rotary molding apparatus that provides for a more efficient and uniform filling of the mold cavities by allowing high pressure filling with a mechanism for discharging air trapped in the mold, thus bypassing the additional step of applying a fixing pressure. The present inventors have recognized the need for a rotary molding apparatus that provides for a rotary cylinder with replaceable and removable parts to allow the molding apparatus to accommodate various molding configurations, and to allow the rotary molding apparatus to be easily cleaned and maintained.

The present inventors have recognized the need for a rotary molding apparatus capable of forming contoured food products.

The present inventors have recognized the need for a rotary molding apparatus with a mechanism for regulating feed pressure.

The present inventors have recognized the need for more efficient methods for removing molded food product from the mold cavity.

The present inventors have recognized the need for a rotary molding apparatus with a tagging system for ensuring that the user utilizes the correct knock-out cups with the corresponding rotary mold.

The present inventors have recognized the need for a rotary molding apparatus with a heating system for preventing buildup around knock-out cup edges.

SUMMARY OF THE INVENTION

The present invention provides a method and apparatus for molding food patties that eliminates or minimizes the disadvantages described above without requiring a reduction in the speed of high-volume production of molded products.

The present invention provides a method and apparatus for molding food products that consistently conform to the mold cavity configuration.

Accordingly, in one aspect, the invention relates to an improved method of molding food patties comprising the steps of: feeding pressurized food product through a feeder inlet connected to an interface plate, filling a row of mold cavities simultaneously, and providing an outlet for displaced air to escape as the mold cavities are filled. Feeder inlets with various mechanisms for evening out filling pressure across a row of mold cavities, such as having more than one inlet, can be used. The interface plate, or fill plate, can also comprise a plurality of perforations to provide the molded food product with the desired textures. The perforated fill plate can be interchangeable with standard fill plates.

A feed pump can be used to feed pressurized food product through the feeder inlet. In one embodiment, an auger system comprising a pair of feed screws at the bottom of a food hopper transports food product to a pump. The output passage of the pump transports food product to the feeder inlet to fill mold cavities.

In one embodiment, a pump accumulator is disposed between the pump and the feed inlet to regulate the pressure and/or volume of the food mass in the feed pathway. A pump accumulator assists in absorbing any intermittent increase/decrease in pressure as a result of the feed inlet being in and out of communication with the mold cavity as the mold shell rotates sets of mold cavities into the fill position. The pump accumulator also allows for a more rapid response to a demand for food mass at a desired fill pressure when a row of new cavities is rotated into the fill position in communication with the feed inlet.

Mold cavities rotate in a direction such that the mold cavities first pass the air discharge region to arrive at the feeder inlet passage. The air discharge region and feeder inlet passage are situated at a distance such that portions of the mold cavity can be in contact with the feeder inlet passage and the air discharge region simultaneously. As the mold cavity passes the feeder inlet passage, the food product is deposited into the mold cavity. As the food product fills the mold cavity, air remaining in the mold cavity is displaced towards the portion of the mold cavity that is still in contact with the air discharge region. The air discharge region provides a route for the air remaining in the mold cavity to escape.

In another aspect, the mold cavity is subjected to a vacuum force to remove air in the mold cavity prior to the mold cavity reaching the fill station. The vacuum force can be an external vacuum source or be derived from low pressure regions within the rotary molding apparatus.

According to another aspect, the invention relates to an improved rotary molding system comprising a rotary cylinder that includes a mold cylinder and a cylindrical mold shell wherein the mold shell is disposed around the mold cylinder and engages with the mold cylinder to form mold cavities. A pair of toothed endless belts in engagement with gear rings disposed on either end of the rotary mold cylinder drives the rotary cylinder. Tensioners may be used to enhance the engagement of the endless belt with the toothed gear ring.

The rotary cylinder is disposed against an interface plate having a feeder inlet passage and an air discharge region along a curved surface to adapt to the curvature of the rotary cylinder. The mold cylinder comprises rectangular recessed panels which are oriented lengthwise along the length of the outer surface of the mold cylinder, and is arranged parallel to the horizontal axis of rotation. Air channels are connected to the back side of the recessed panels.

Fluid, usually a gas, is supplied to the channels from an external fluid source, and arrives at the surface of the recessed panels via a series of interconnected channels. A porous insert is disposed in the recessed panels. The cylindrical mold shell is disposed around the mold cylinder such that mold shapes, which are arranged in longitudinal rows along the circumference of the mold shell, are situated over the porous inserts that are in the recessed panels. The mold cavity is formed by the mold shape and the porous insert, such that the mold shape forms the configured side walls of the mold cavity, the thickness of the mold shell dictates the depth of the mold cavity, and the porous inserts serve as the bottom surface of the mold cavity. The mold cavities open radially.

In another aspect, the invention relates to a method of molding food patties comprising feeding pressurized food product to simultaneously fill a row of mold cavities. Mold cavities rotate from a filling position to an eject position where knock-out cups are used to eject the formed product without the need to stop or slow down the rotary mold.

The rotary molding system can comprise a feeder portion, a fill plate, a wear plate, a knock-out mechanism, and a rotary mold with mold shapes which form mold cavities when the mold shapes are rotated between the fill plate and the wear plate. The rotary mold comprises mold shapes disposed around the rotary mold. The rotary mold is a cylindrical shell with the thickness of the shell corresponding to the depth of the mold cavity. Mold cavities are rotated from a fill position to an eject position. As the rotary mold rotates into the fill position, the mold shapes become disposed between the fill plate and the wear plate, with the surface of the wear plate serving as the bottom surface to the mold cavities as the mold shape rotates through the region where the mold shape is in contact with the fill plate and the wear plate. The wear plate and the fill plate remain stationary as the mold shell rotates.

Once mold cavities are filled, the mold cavities are rotated to an eject position wherein knock-out cups are timed with the rotational movement of the rotary mold to knock out molded food products without the need to stop or slow the rotation of the rotary mold. The knock-out mechanism comprises driving gears which move a movement plate connected in off-center alignment with respect to driven gears. The off-center alignment of the movement plate provides a range of motion that is transferred to attached knock-out cups to provide a trajectory which allows ejection of the molded food product without reducing the rotational speed of the rotary mold. In one embodiment, the knockout cups are used in conjunction with a heating system prevent accumulation of by product such as animal fat, on the edge of the knock out cups.

Other methods of removing the molded food product from a mold cavity can also be used. In one embodiment, pressurized air in a pressurized air region in contact with the molded food product can be used to assist in ejection of the molded food product. The pressurized air can be supplied from an air pressure source, or can be generated by the sudden movement of a piston within an air pressure region to create a rapid increase or "burst" of pressure. Alternately, the molded food product to be ejected can be subjected to a negative pressure from a conveying surface located below the molded food product in its eject position.

In another embodiment, the rotary mold is used to generate molded food products with contoured sides. Portions of the fill plate and the wear plate provide the walls of the contoured mold cavity. As the rotary mold rotates into the fill station, the rotary mold comes into contact with the fill plate and wear plate which are contoured on the surface that comes into contact with the rotary mold. The contoured surface of the fill plate and wear plate, together with the mold cavities on the rotary mold, creates a contoured mold cavity. Once the mold cavities are filled, the contoured molded food product rotates from the fill station towards the knock out position, with contoured portions formed against the wear plate and fill plate extending above and below the rotary mold, wherein any of the ejection mechanisms can be used to remove the food patty from its mold.

In another embodiment, the rotary mold and the knock out cups comprise a smart tagging system such as the use of radio frequency identification (RFID) chips installed to ensure that the rotary mold is being used with the correct knock out cups. When the rotary mold and knock out cups do not correspond, the molding apparatus will not operate.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 3 is a perspective view of the interface plate.

FIG. 24 A, B illustrates a pivoting mechanism for the rotary mold.

FIG. 35E illustrates yet another embodiment for removing molded food products from the mold cavity.

FIG. 36 is a perspective view of an exemplary embodiment of a rotary molding apparatus for contoured food products.

FIG. 37 is a side view of the fill plate of FIG. 36.

FIG. 38 is a side view of the wear plate of FIG. 36.

FIG. 39 is a view of the rotary mold in FIG. 36 as seen along line 39-39.

FIG. 40 is a view of the rotary mold in FIG. 36 as seen along line 40-40.

FIG. 41 is a perspective view of a contoured molded food product.

FIG. 45A illustrates a top view of the embodiment of FIG. 45.

FIG. 47D is a top side view of the rotary food pump.

FIG. 49 is a perspective view of a rotary pump motor.

FIG. 50 is a side view of one exemplary embodiment of the meat accumulator.

FIG. 56 is a top view of the heating system of FIG. 55 illustrating one exemplary embodiment of the arrangement of the heating tubes.

FIG. 57D is an enlarged view of FIG. 57B.

FIG. 58 illustrates a side view of an air knife.

DETAILED DESCRIPTION OF THE PREFERRED EMBODIMENTS

Figure 1:
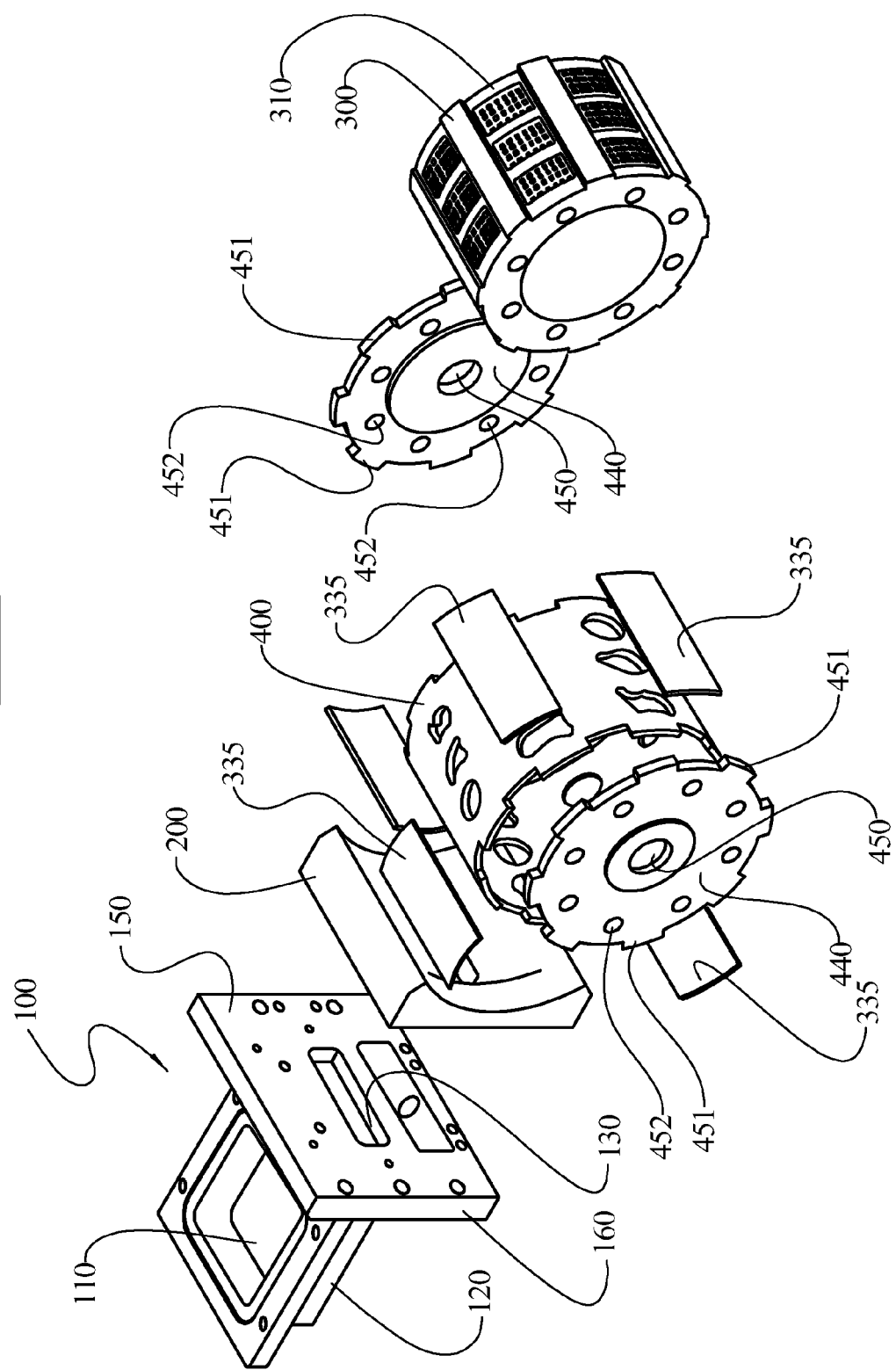
FIG. 1 is an exploded view of the rotary molding system of an exemplary embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates the primary components of an embodiment of a rotary molding system. The rotary molding system comprises a food feeder portion 100, an interface plate 200, a mold cylinder 300, and a mold shell 400. The food feeder portion 100 utilizes a pumping mechanism enclosed in a pump box 120 to feed pressurized food product though the feeder inlet 130 for deposition into the mold cavities. The interface plate 200 adapts the feeder portion 100 to the curvature of the rotary cylinder, which is comprised of the mold cylinder 300 and the mold shell 400.

The various components of the invention will now be discussed in detail.

The Feeder Portion

Figure 2:
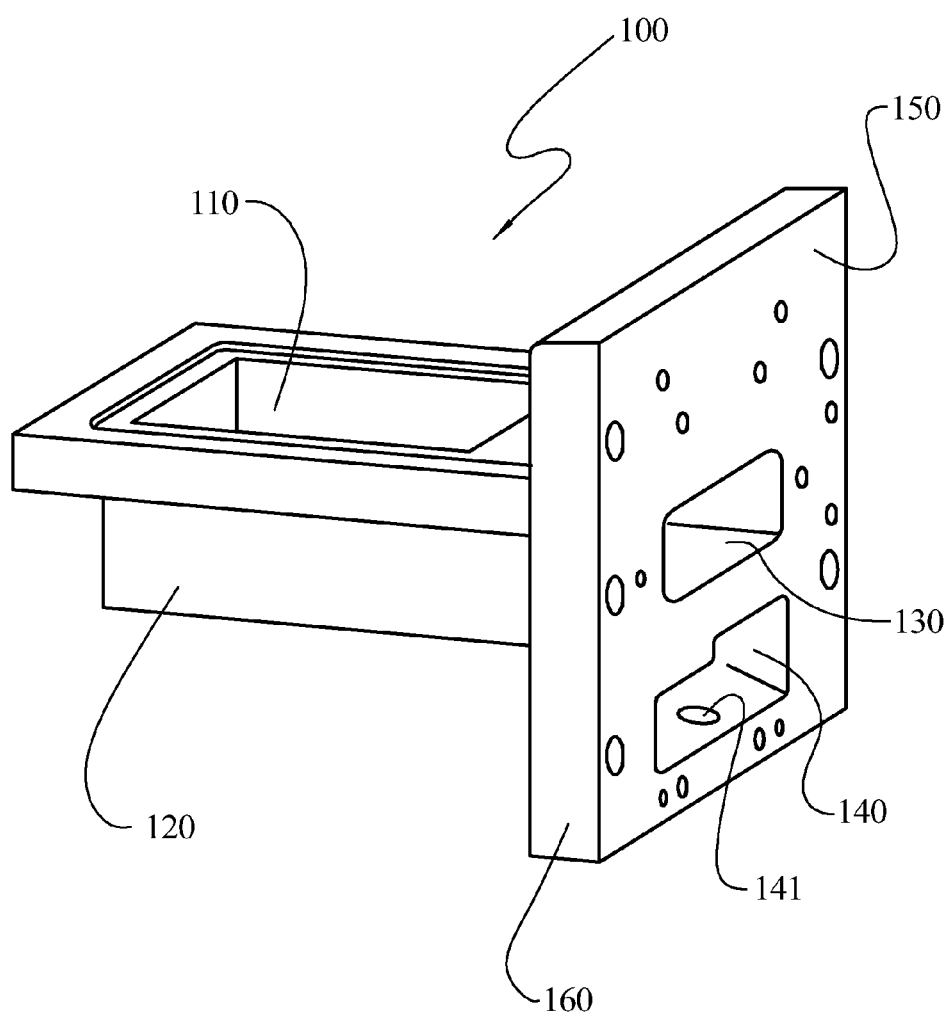
FIG. 2 is a perspective view of the feeder portion of an exemplary embodiment of the invention.

FIG. 2 illustrates the feeder portion 100 of the rotary molding system which is used to supply food product into mold cavities situated on the surface of a rotary cylinder. The feeder portion 100 comprises a food hopper 110 connected to a pump box 120. In the embodiment shown, the pump box 120 is situated below the food hopper. In other embodiments, the pump box can be in a different location such as, for example, behind, in front of, or adjacent to, the food hopper, depending on the configuration desired and the type of pumping mechanism used. In one embodiment food product is continuously delivered to the food hopper 110 such that the level of food in the food hopper is maintained constant, and allows for delivery of food product of a pre-determined pressure into the mold cavities. The pump box contains an extruder. Other suitable pumping devices can also be used.

Food product is pumped from the food hopper 110 to the feeder inlet 130. Food product can be pumped at a constant and continuous pressure as the mold cylinder rotates past a feeder inlet passage 210 (FIG. 3). Alternatively, the pumping mechanism can be controlled such that food product is only pumped through the feeder inlet passage 210 when at least a portion of the mold cavity has reached the feeder inlet passage.

The feeder portion 100 of the rotary molding system is made from a rigid material such as a metal or metal composition. The feeder inlet 130 is an opening in a feeder wall 160 which is rigidly connected to the pump box 120 and food hopper 110, and is situated generally perpendicular to the direction of food product flow.

The wall is of a thickness sufficient to support the weight of the food hopper 110, pump box 120, and food product, as well as withstand the force of the pressure of the food product being pumped through the feeder inlet 130. In one embodiment, the food hopper 110, pump box 120 and feeder wall 160 are made from one continuous piece of material. In other embodiments, the food hopper 110, pump box 120, and feeder wall 160, or a combination of thereof, are separately manufactured and connected. In the embodiment illustrated in FIG. 2, an air discharge outlet 140 is situated below the feeder inlet 130. The feeder inlet 130 and the discharge outlet 140 open onto a planar surface 150 on the side of the feeder wall facing away from the food hopper 110 and pump box 120. The discharge outlet 140 is connected to a discharge outlet channel 141 which diverts air away from the feeder portion. The feeder wall 160 is rigidly attached to the interface plate 200 via screws or other connecting mechanisms.

Figure 45:
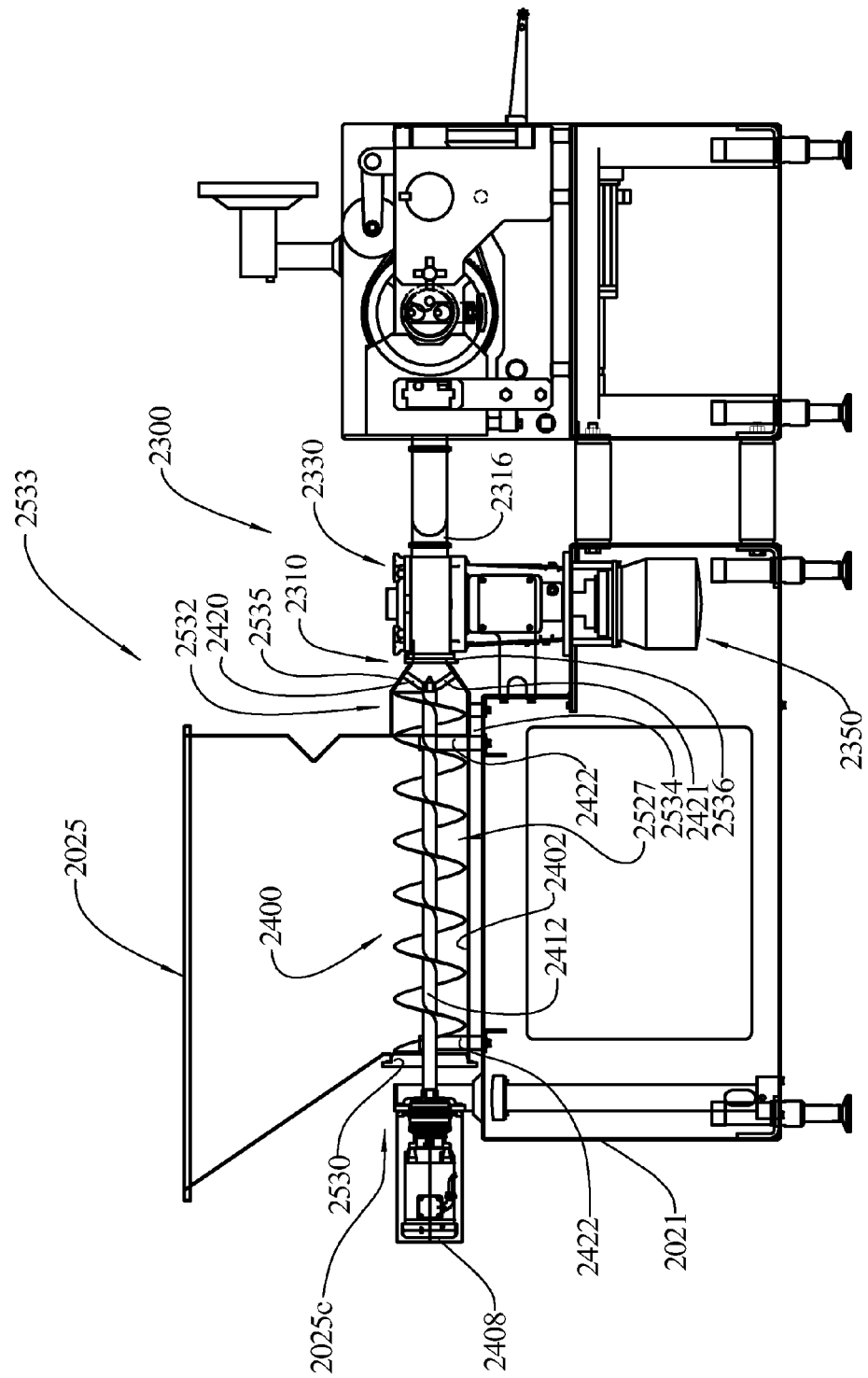
FIG. 45 illustrates a side view of one embodiment of the rotary molding system using a pair of feed screws to transport food product to a rotary food pump.

In one embodiment, as illustrated in FIG. 45, the feeder portion 2300 comprises a hopper 2025 and an auger system 2400 connected to a pump intake passage 2310, a rotary pump 2330, and a pump output passage 2316. A pump motor 2350 drives the pump 2330.

The auger system 2400 is located at the bottom of the hopper 2025. The auger system includes two feed screws 2402, 2404, and two feed screw drive motors 2406, 2408 (FIG. 45A). The feed screws 2402, 4204 each have a center shaft 2410, 2412. The center shafts are journaled in and supported by front and rear feed screw supports 2414, 2422. The feed screw supports extend vertically from and attach to the machine base 2021. The feed screws are located adjacent to one another and extend longitudinally along the bottom of the hopper. The center shafts are parallel to the bottom 2527 of the hopper.

As shown in FIGS. 45 and 45A, the rear 2025c of the hopper has an opening that is covered by a cap 2530. The cap 2530 has holes 2531 that the feed screw shafts are journaled to rotate therein on bearings. The shafts extend through the cap to connect to the motors 2408, 2406. The rear opening of the hopper has a vertical lip 2529a. The back of the cap has a recessed portion 2530a that mates with the lip 2529a. The cap also has a non-recessed portion 2530b that fits into the rear opening.

A hopper outlet 2532 is formed to or attached to the front 2533 of the hopper 2025. A portion of the outlet opening is aligned with the bottom floor 2527 of the hopper. The outlet extends forward of the main hopper body 2025a as shown in FIG. 45A. The outlet has a connecting section 2534 and a narrowing section 2535 that narrows to an outlet flange 2536 toward the food pump system 2300. The outlet has a width that is greater than its height. Upper and lower feed screw supports 2420, 2421 extend from the conical section 535 to a bearing head 2422a. The supports 2420, 2421 are perpendicular to the conical section 535 inside surface and extend therefrom to an elbow and bearing sleeves. The front of the shafts 2412, 2410 have a recessed portion 2425 that terminates in a conically reducing point end 2424. The point end 2424 extends beyond the bearing sleeves. The shafts 2410, 2412 are journaled to rotate at the front on the recessed portion 2425 in the bearing sleeves. As shown in FIGS. 45 and 45A, the front portion of the feed screws are enclosed by the outlet 2532 and extend beyond the main hopper body 2025a. The outlet 2532 is connected to the inlet of the pump.

Figure 46:
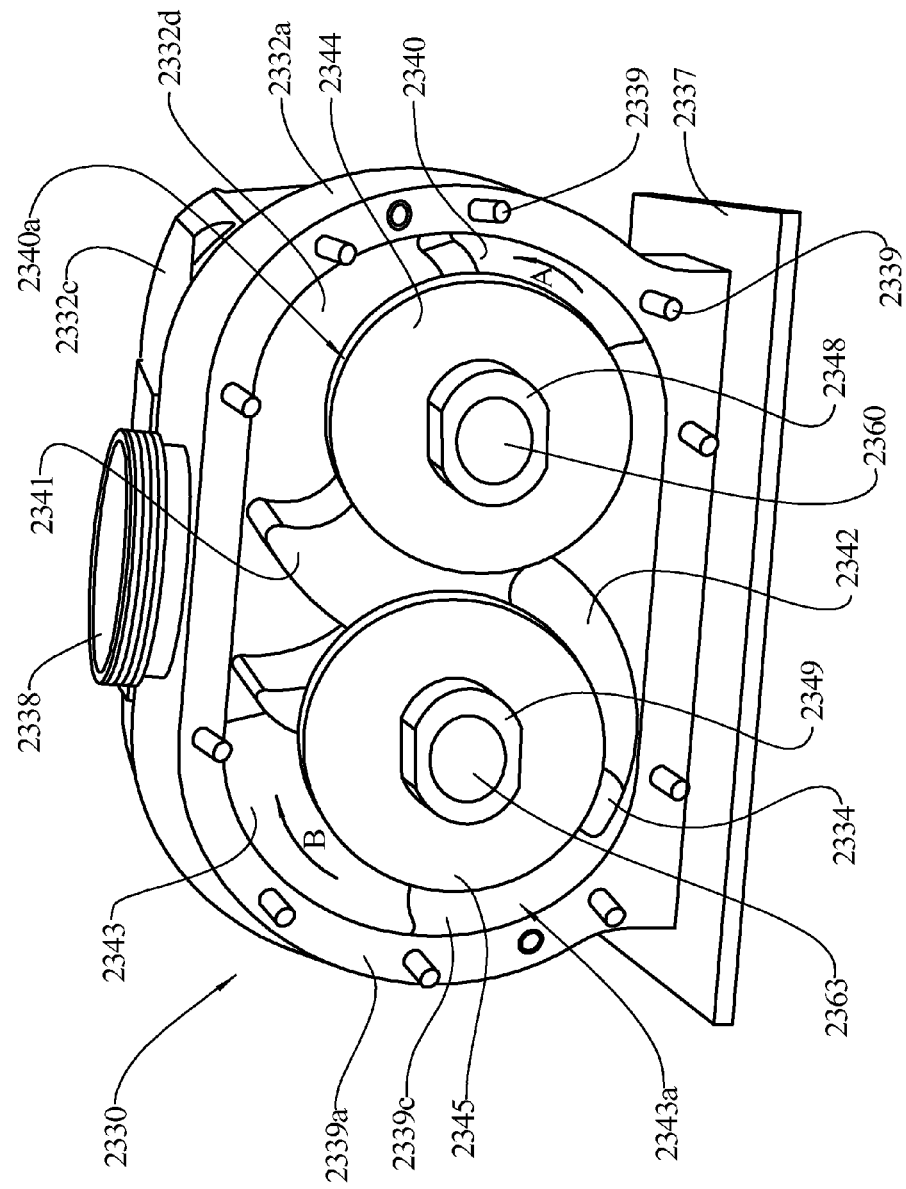
FIG. 46 is a top side view of the rotary pump with the face plate removed.
Figure 47A:
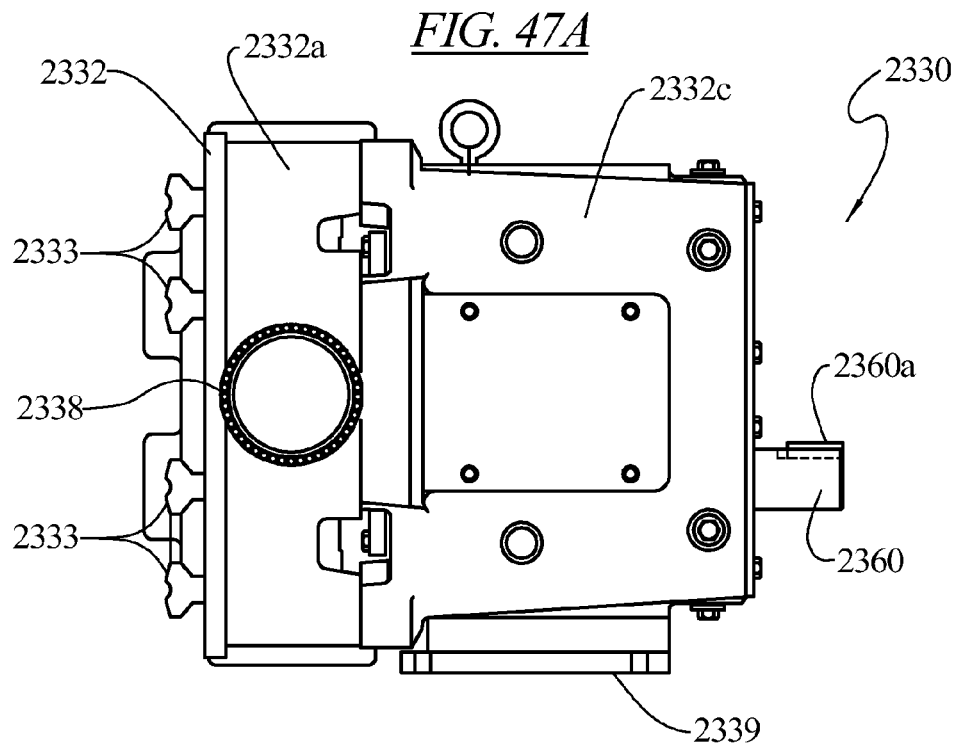
FIG. 47A is an inlet side view of the rotary food pump.
Figure 47B:
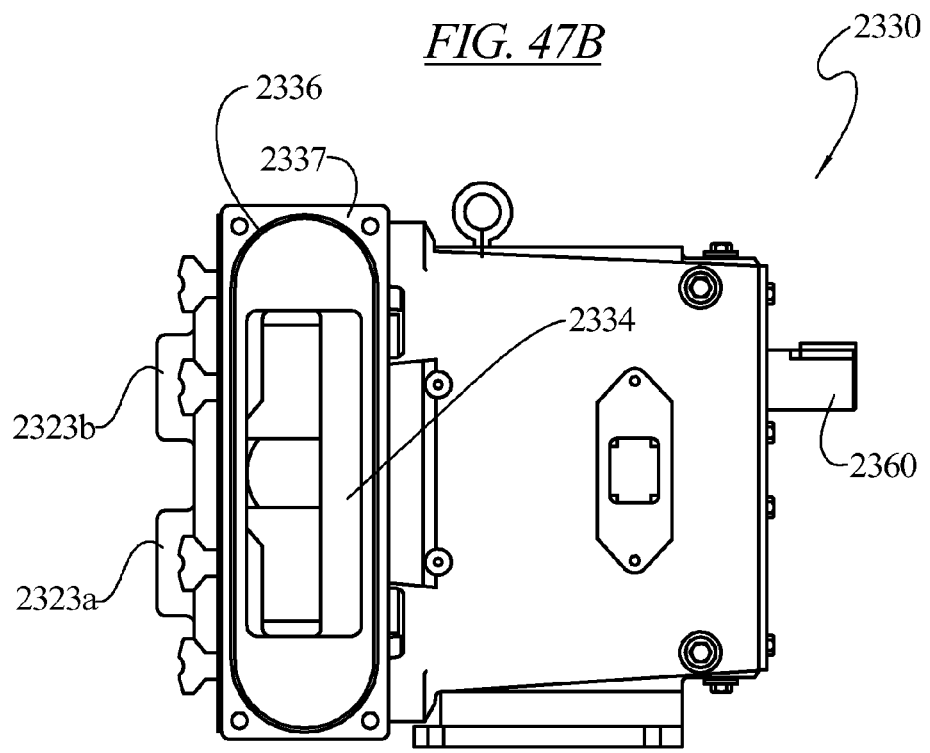
FIG. 47B is an outlet side view of the rotary food pump.
Figure 47C:
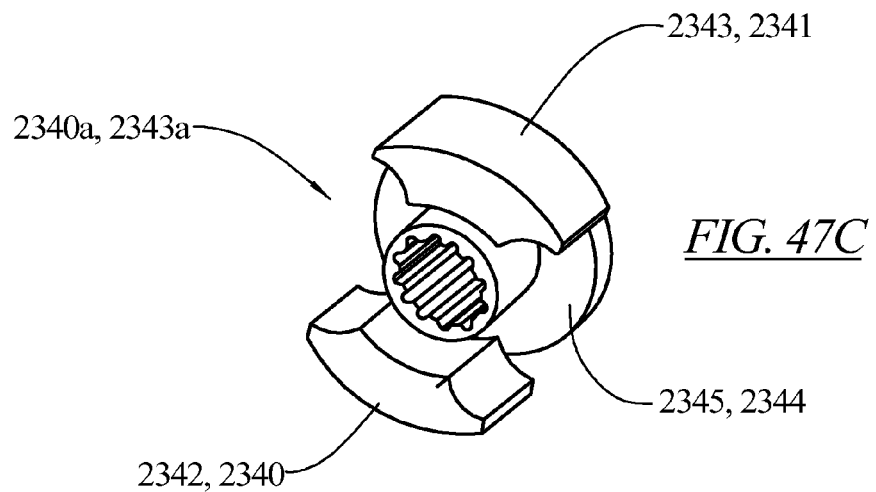
FIG. 47C is a perspective view of a rotor from the rotary food pump.
Figure 47F:
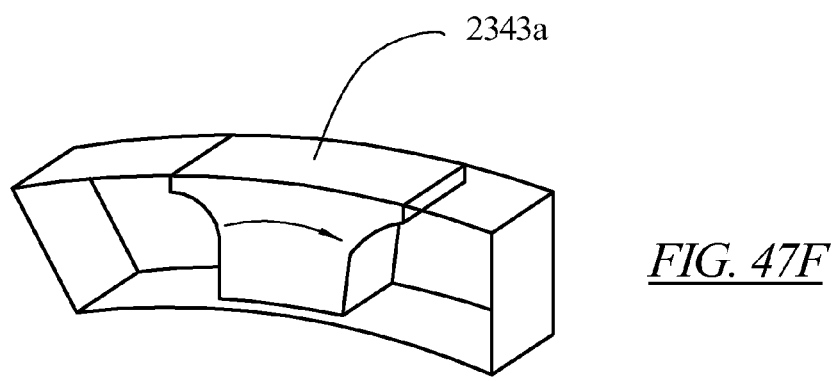
FIG. 47F is a wing of the rotor within a portion of its area in operation.
Figure 47E:
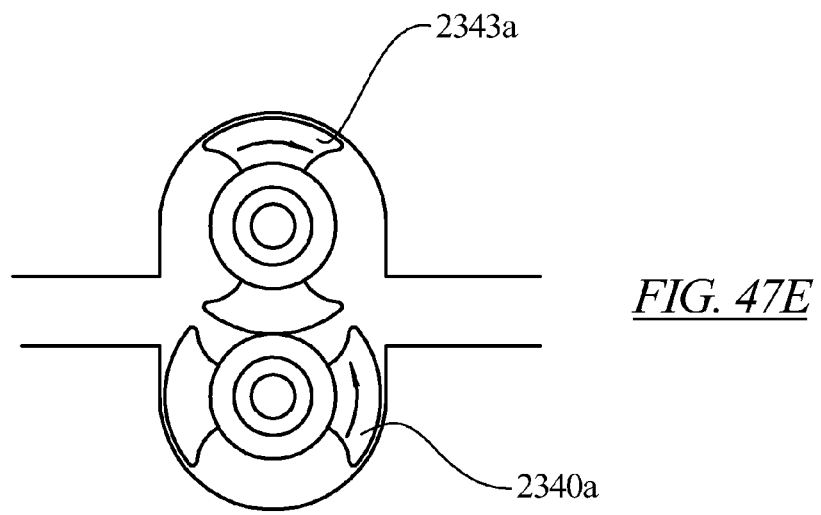
FIG. 47E is a schematic diagram of a portion of the rotary pump.
Figure 48:
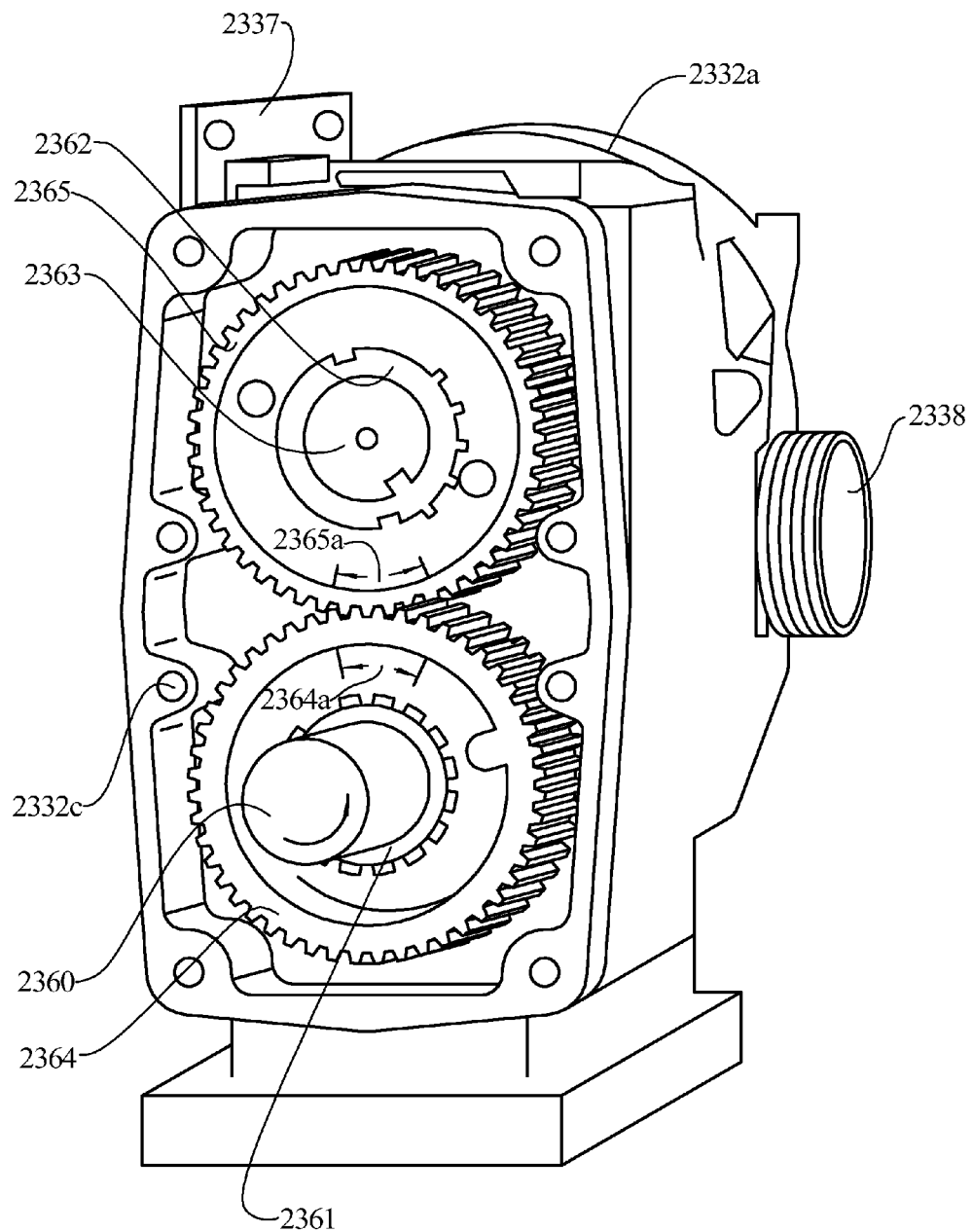
FIG. 48 is a bottom side view of the rotary pump with the back plate removed.
Figure 51:
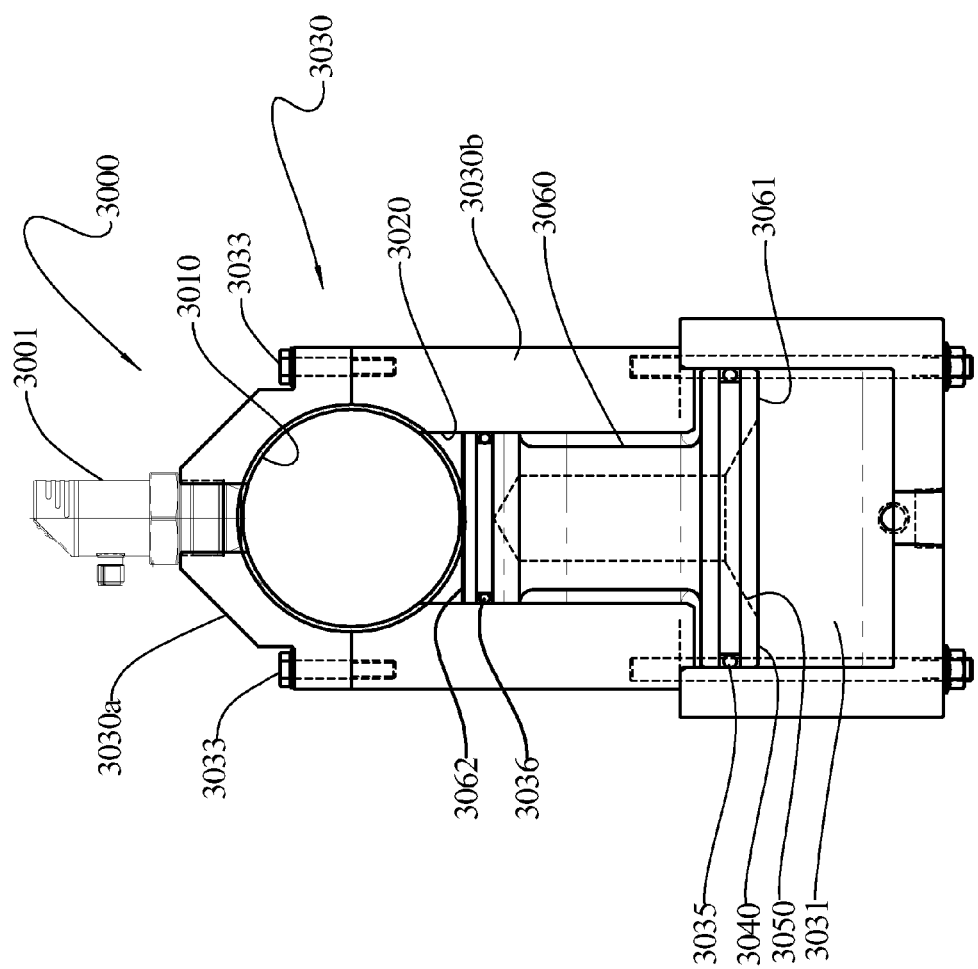
FIG. 51 is a cross sectional view of the meat accumulator of FIG. 50.

The rotary pump 2330 is show in detail in FIGS. 46-48. The rotary pump can be an Universal I Series Positive Displacement Rotary Pump, model number 224-UI with a rectangular outlet flange manufactured by Waukesha Cherry-Burrell, with a place of business in Delavan. Wis., and affiliated with SPX Flow Technology.

As shown in FIG. 46, the pump 2330 has a housing with a pump area 2332a and a gear area 2332c. The pump has an inlet 2334 and an outlet 2338 in communication with the pump area 2332a. The pump area is separated from the gear area by a wall 2332d. A portion of the gear area is shown in FIG. 48 were the back cover plate is removed. A drive gear 2364 and a driven gear 2365 are meshed across a meshed arch of each gear 2356a, 2364a. The drive gear is keyed to rotate in sync with the drive shaft 2360 at a first end of the drive shaft. The drive gear has a locking nut and lock washer 2361 that assists in securing the gear to the drive shaft. The driven gear is keyed to rotate the driven shaft 2363. The driven shaft has a locking nut and lock washer 2362 that assists in securing the gear to the driven shaft at a first end of the drive shaft. The driven and drive shafts are journalled through a support structure (not shown) in the housing to carry rotors 2340a, 2343a at second ends of the driven and drive shafts opposite the first ends. The support structure (not shown) in the housing contains high capacity, double tapered roller bearings that the drive and driven shafts rotate on. The rear cover plate (not shown) contains an opening to allow the drive shaft to extend outside of the housing to engage a drive source such as the motor 2350.

The second ends of the drive and driven shafts have a splined section (not shown). The rotors 2340a, 2343a have a splined opening that mates with the splined section of the drive and driven shafts respectively. Each rotor 2340a, 2343a has two lobes or wings 2340, 2341 and 2342, 2343, respectively. The wings have overlapping areas of rotation as shown in FIG. 47E. Each wing is located opposite the other wing on the rotor and gaps are located between the wings about the circumference of the rotor. The wings travel in annular-shaped cylinders 2339c (not labeled for rotor 2340a) machined into the pump body. The rotor is placed on the shaft with a plate portion 2344, 2345 outwardly facing. Nuts 2348, 2349 are screwed on a threaded end portion of the shafts to secure the rotor in place. The rotors have a close fit clearance between the outer surface of the wing 2343a and the corresponding wall faces 2339c of the pump area. As shown in FIG. 47E, the wing of one rotor will be located in the open area of the other rotor during a portion of an operation cycle. An operation cycle comprises a full 360 degree rotation of a rotor.

The splined mating of the rotors and shafts ensure that the rotors rotate in sync with the respective drive and driven shafts. The rotors are interference fitted in the pump area as shown by their overlapping areas of rotation. The gearing 2365a, 2364a prevents the rotors from contacting each other during operation.

When the drive shaft 2360 is rotated in direction C shown in Hg 48, the drive shaft rotates the first rotor in the same direction, direction A in FIG. 46. Simultaneously, as provided by the meshed gearing 2364, 2365 the second rotor is rotated in the opposite direction, as shown by direction B in FIG. 46, of that of the first rotor.

The pump area 2332a face 2339a is covered to enclose the pump area by a face plate 2332 (FIG. 47A). The face plate has raised areas 2323a, 2323b for accommodating space required for the shaft ends and the corresponding nuts 2348, 2349. The face has a plurality of holes corresponding to the studs 2339 that extend from the face 2339a. Face plate wing nuts 2333 secure the face plate to the face 2339a.

The outlet 2338 is a circular outlet and the inlet 2334 is a rectangular inlet. The inlet 2334 has corresponding rectangular flange 2337 with the oval seal or gasket 2336. The outlet let 334 connects pump output passage 2316.

The pump 2330 is driven by the pump motor 2350. The motor is shown in FIG. 49. In one embodiment, the motor 2350 is a servo rotary actuator, such as the TPM+ Power 110 Stage 2 series rotary actuator with brake manufactured by Wittenstein, Inc. with a place of business in Bartlett, Ill. In one embodiment motor 2350 is an electric servo rotary actuator, such as the model TPMP110S manufactured by Wittenstein, Inc. The servo rotary actuator comprises a combined servo motor and gearbox assembly in one unit. The servo rotary actuator has a high-torque synchronous servo motor. The configuration of the servo motor and the gearbox gearing provides the actuator with a reduced length. The actuator has a helical-toothed precision planetary gearbox for reduced noise and quiet operation.

Figure 45B:
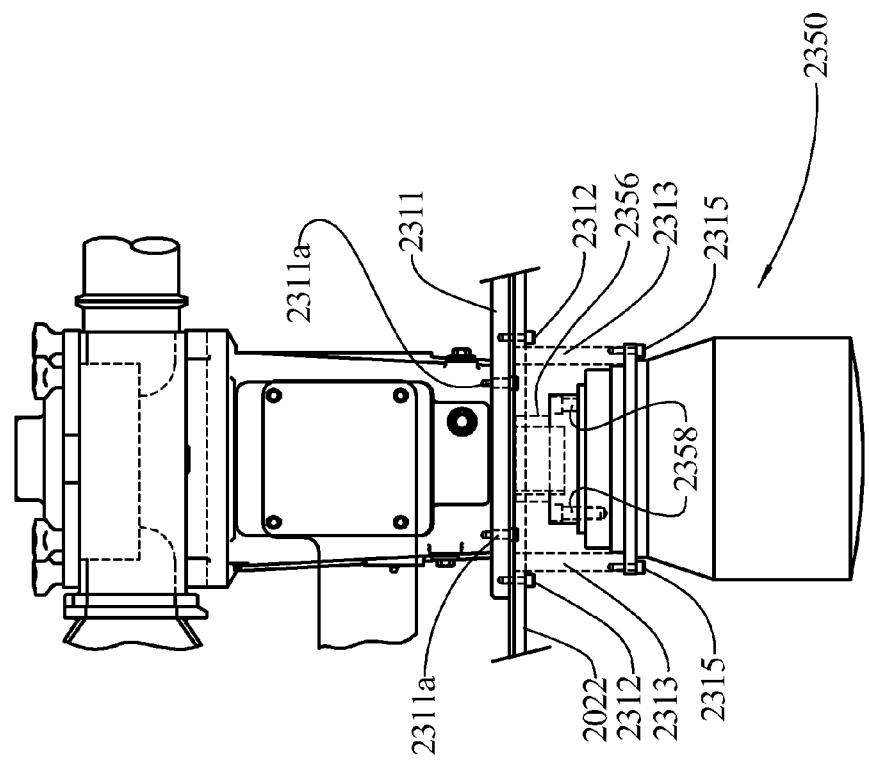
FIG. 45B is an enlarged side view of the pump of FIG. 45.

The motor 2350 has a housing 2351, an electrical connection 2351b, a mounting face 2315b, and an output coupling flange 2358b. The mounting face 2315b has a plurality of holes 2315a. As shown in FIG. 45B, the pump is secured to a mounting plate 2311 by a plurality of bolts 2311a which engage the back of the pump, such as by engaging threaded holes (not shown) at the back of the pump. The mounting plate 2311 is secured to the machine base 2022 by bolts 2312. A circular r counting member 2313 encloses the connection between the motor and the pump and attaches to the mounting plate 2311. Alternatively, the mounting member 2313 may connect directly to the machine base. The mounting member 2313 connects to the motor 2350 at the mounting face. A number of bolts 2315 secure the motor to the mounting member. A circular coupling 2356 is attached to the output coupling flange 358b by bolts 2358 threaded into the correspondingly threaded holes 358a of the output coupling flange 358b. At an opposite end, the coupling 2356 receives the drive shaft 2360 in an opening of the coupling 2356. The drive shaft has a key 2360a (FIG. 47A) that engages a corresponding slot of the opening of the coupling 2356 to lock the pump 330 to the coupling 2356, The motor is angled to align with the output shaft of the pump.

In operation, food product in the hopper 2025 is transported towards the pump 2330 via the pair of feed screws 2402, 2404. The pump 2330 and motor 2350 are disposed in vertical alignment with respect to the horizontal direction of travel of the food product from the hopper, to the food pump, and into the outlet passage towards the rotary mold.

The output passage 2316 of the pump is diverted into two branches 2316a, 2316b. The two branches 2361a, 2361b extend toward a feeder portion 2700 with two feeding channels 2710. Each branch 2361a, 2361b supplies a source of food product to a feeding channel 2710 through the feeding channel inlets 2706. The output passage 2316 may divert into more than two branches, to supply a source of food product to multiple feeding channels. Alternately, the output passage may be one continuous passage that supplies a source of food product to one feeding channel.

Pump Accumulator

In one embodiment of the food patty molding apparatus illustrated in FIG. 50, a pump accumulator system 3000 is disposed between the food pump 2330 and the feed plate 2703. The pump accumulator system 3000 comprises a passageway through which food product from the food pump 2330 passes to the feed plate for filling the mold is cavities. The passageway is a cylindrical chamber 3010 which connects the pump outlet channel 3011 to the feed plate inlet channel 3012. A portion of the exterior of the cylindrical chamber 3010 is surrounded by a housing structure 3030, generally located in the middle of the cylindrical chamber. The housing structure 3030 is a two piece structure comprising an upper housing 3030a and a lower housing 3030N arranged to fit about the curvature of the cylindrical chamber. The housing structure 3030 can be made from aluminum, or any other suitable metal, or plastic. The upper housing 3030a and lower housing 3030b are connected around the circumference of the cylindrical pathway by bolts 3033. The lower housing comprises a pressure channel 3020 in communication with the cylindrical chamber 3010, and extends perpendicularly downward from the cylindrical chamber 3010. A seal 3011, such as a rubber O-ring, is disposed at the intersection of the pressure channel 3020 and the cylindrical chamber 3010.

A pressure chamber 3031 is connected to the lower housing 3012 at the base of the lower housing. The pressure chamber 3031 can be made from a plastic material, or any other suitable material can also be used. A piston 3060 is disposed in connection with both the pressure chamber 3031 and the pressure channel 3020. Piston 3060 comprises a pressure chamber surface 3061 which moves within the pressure chamber 3060. Piston 3060 also comprises a pressure channel surface 3062 which moves within the pressure channel 3020. The surface area of the pressure channel surface corresponds to the cross sectional area of the pressure channel. The surface area of the pressure chamber surface corresponds to the cross sectional area of the pressure chamber. In the embodiment illustrated, the pressure chamber has a greater cross sectional area than the pressure channel. In one embodiment, the ratio of surface area of the pressure chamber surface to the piston channel surface is 3:1. Any other ratios can also be used to generate a greater pressure at the pressure channel surface.

The pump accumulator allows for the volume of food mass and/or the pressure of the food mass disposed between the food pump and the feed inlet to vary as needed. Food mass is pumped into the fill plate for filling the mold cavities at a desired pressure. Once filled, the mold cavities are rotated away such that the next row of mold cavities can be filled. In the time between the arrival of the next row of empty mold cavities, the pump continues to pump food mass into the region between the food pump and the feed inlet. Pending the arrival of the next row of empty mold cavities, the feed inlet is temporary not in communication with the mold cavities. As such, the region upstream of the feed inlet may experience intermittent, repetitive surges of pressure which can cause undue wear on the rotary pump over time.

In one embodiment, the pump accumulator allows for the absorption of the fluctuation in the pressure and/or volume of the food product as it is being fed from the pump into the mold cavities. The pump accumulator also serves as a reservoir for food mass and provides for increasing the fill pressure to the desired fill pressure as needed when a new row of empty mold cavities arrives at the fill position. By providing a reservoir volume of food mass on hand to minimize drops in pressure due to the arrival of an empty row of mold cavities, the pump accumulator assists in achieving the fill pressure in less time, thus enhancing the efficiency of the fill process.

The volume of food mass in the pump accumulator and/or the pressure of the food mass can be adjusted by moving the piston upwards or downwards within the pressure channel. Downwards movement of the piston increases volume in the pump accumulator due to the additional volume created in the pressure channel. Upwards movement of the piston within the pressure channel decreases the volume within the pump accumulator.

The position of the piston can be moved by increasing the pressure in the pressure chamber disposed below the piston. As pressure increases in the pressure chamber, the piston is urged upwards. To move the piston downwards, the pressure in the chamber is decreased to decrease the force exerted on the pressure chamber surface side of the piston. Pressure is exerted on the pressure chamber surface 3061 of the piston by the delivery of gas, such as air, or other fluid, into the pressure chamber 3031. Gas delivery into the pressure chamber 3031 is by way of an inlet channel 3063 which can be connected to a source of fluid, such as an oxygen tank. A pressure regulator 3600 (FIG. 52) regulates the delivery of gas into the pressure chamber. To maintain a tight seal between the piston and the pressure chamber, and between the piston and the pressure channel, seals 3035, 3036, such as rubber O-rings, can be used.

To gage the position of the piston, and thus the volume of food product within the pump accumulator, a linear displacement transducer can be used to determine the vertical position of the piston. The transducer 3070 comprises a stationary probe 3071 which senses the position of a magnet, such as a magnet 3072 disposed on the bottom of the piston just beneath the pressure chamber surface of the piston. The transducer 3070 senses the displacement of the piston along a distance "D" and communicates the displacement information to a computer or other control system component. The control system calculates the amount of food product accumulating in the pump accumulator and determines whether the volume of the food mass accumulating in the pump accumulator is within a desired range, at a given pressure. A pressure sensor 3001 is disposed on top of the pump accumulator, with access into the cylindrical chamber to determine the pressure of the food mass in the pump accumulator. The pressure sensor is secured in place within the upper housing.

Figure 52:
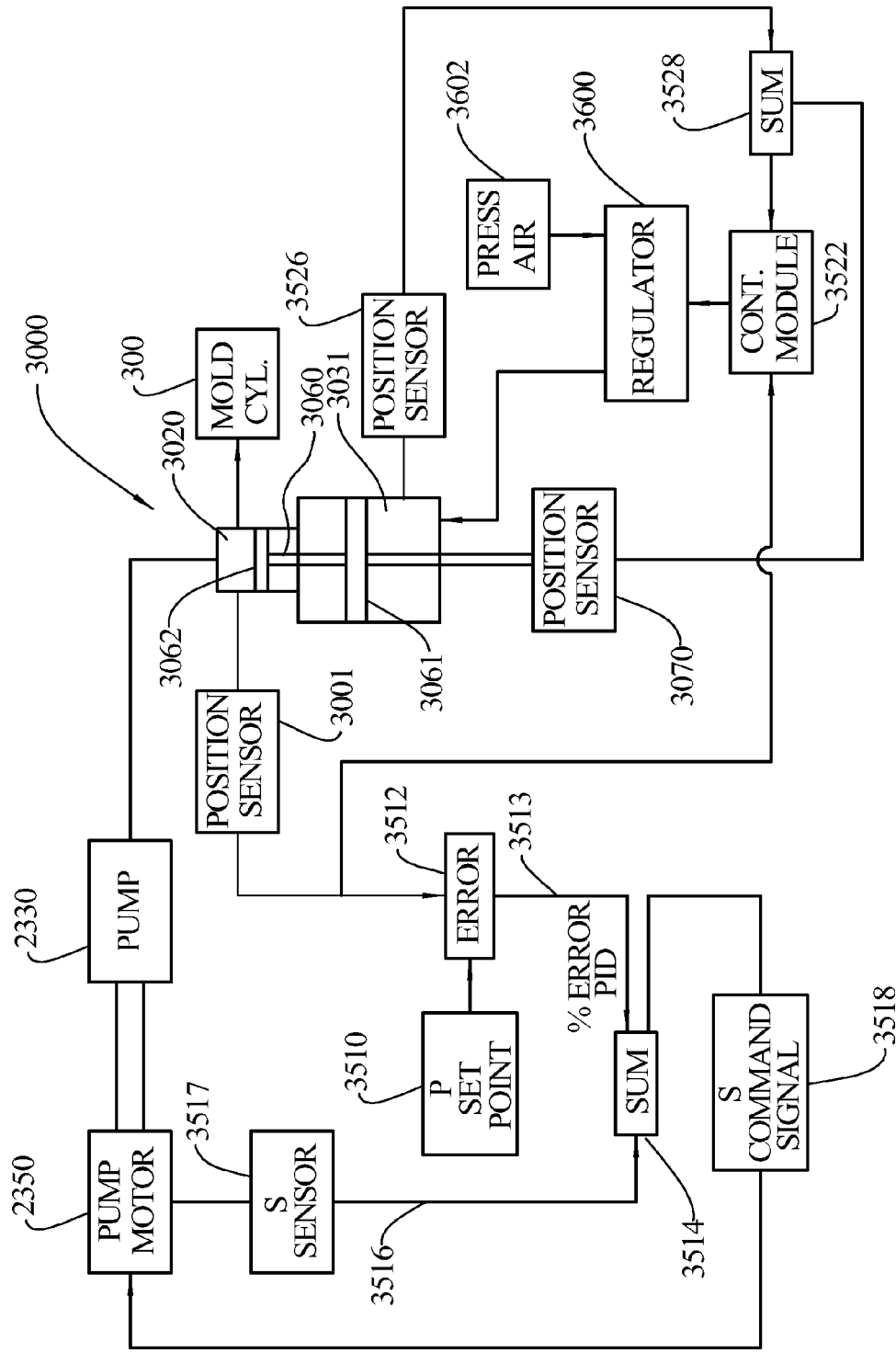
FIG. 52 is a schematic diagram of the signal control for the pump accumulator system

FIG. 52 illustrates in schematic fashion the control system of the pump accumulator system. The pump motor 2350 drives the pump 2330 to deliver pressurized product, such as ground or comminuted meat, into the accumulator and also into the mold cylinder 300. A pressure sensor 3001 located between the pump and the mold, such as on top of the accumulator sends a pressure signal. The pressure signal is compared to a desired product pressure setpoint 3510 that is pre-determined and input, at an error module 3512 of a central processing unit. The error module 3512 issues an error signal 3513 representative of the difference between the desired product pressure setpoint and the actual product pressure, using a percent error, PID correction calculation, to a summing module 3514. The summing module 3514 receives a speed signal 3516 from a pump motor speed sensor 3517 and issues a pump speed command signal 3518 based on the current speed of the pump motor and the error signal from the error module 3512. This control will adjust the pump motor speed to increase or decrease the pump output pressure of the product based on the actual product pressure sensed and the desired product pressure setpoint.

The product pressure signal from the pressure sensor 3001 is also sent to a control module 3522. Since the ratio between the areas of the pressure chamber surface 3061 and the pressure channel surface 3062 is a set value, the control module 3522 can use the product pressure signal to determine an equivalent air pressure setpoint within the pressure chamber 3031 based on the ratio of the piston areas.

However, according to the exemplary system, not only is pressure in the chamber controlled but also the position of the piston is controlled to set the piston sufficiently retracted, or low in the vertical arrangement shown, to ensure that sufficient product is contained within the pressure channel during operation to dampen pressure fluctuation due to the rapid depletion of the food product within the channel 3020 during mold cavity filling and subsequent closing of mold cavities as the rotary mold rotates. An air pressure signal from an air pressure sensor 3526 sensing pressure in the pressure chamber 3031 is sent to a summing module 3528. A piston position signal from the transducer 3070 is also sent to the summing module 3528. The control module 3522 sends a command signal to a pressure regulator 3600 that receives a source of higher pressure compressed air 3602 and throttles this air for delivery of pressure controlled, pressurized air into the chamber. The summing module 3528 executes a calculation to ensure that the position of the piston is within a desired range to ensure sufficient product within the accumulator and then ensures a corresponding correct pressure within the chamber to ensure minimal fluctuation in product pressure during filling/non-filling of the rotating rotary mold.

The modules referred to above can be: an application-specific integrated circuit (ASIC) having one or more processors and memory blocks including ROM, RAM, EEPROM, Flash, or the like; a programmed general purpose computer having a microprocessor, microcontroller, or other processor, a memory, and an input/output device; a programmable integrated electronic circuit; a programmable logic device; or the like. The modules can be incorporated into the central machine controller.

Interface Plate

Figure 4A:
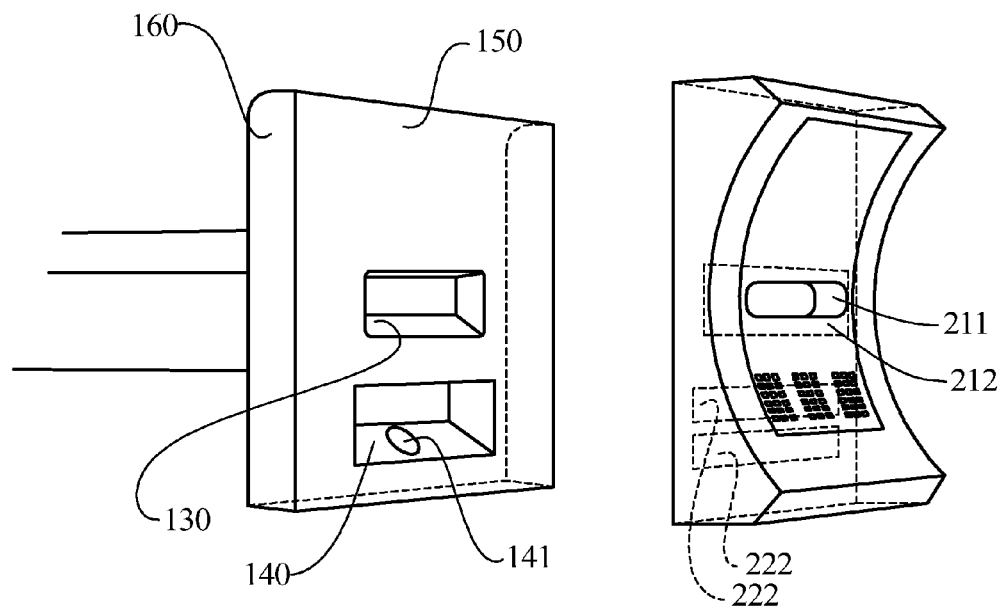
FIG. 4A is a perspective view of the interface plate and the feeder portion illustrating the back portion of the interface plate.
Figure 6:
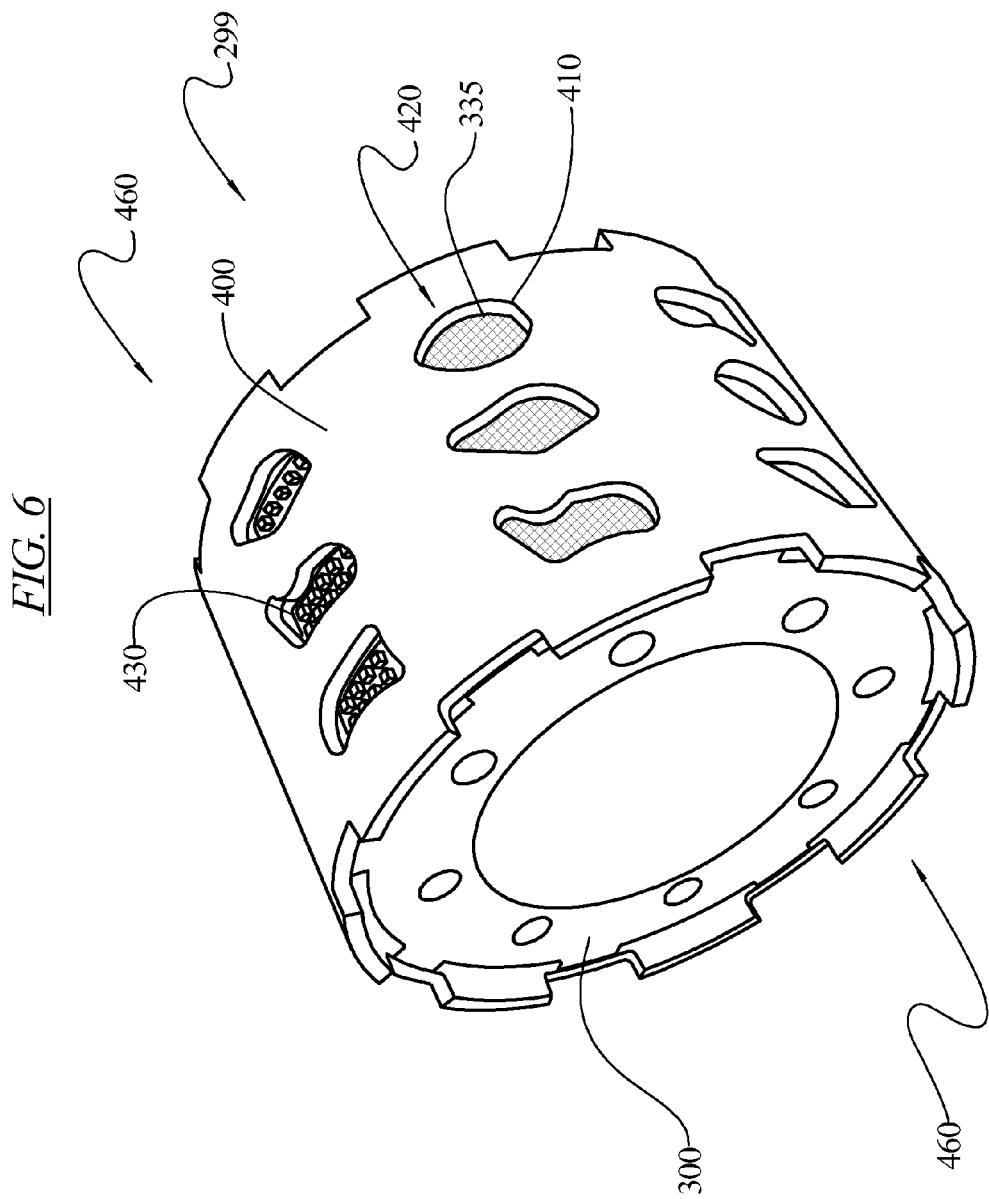
FIG. 6 is a perspective view of the rotary cylinder.

The interface plate 200 in FIG. 3 adapts the flat surface 150 of the feeder wall 160 to the curvature of the rotary cylinder 299 shown in FIG. 6 so as to allow the food product to be deposited into the mold cavities as the rotary cylinder rotates. As illustrated in FIG. 3, the interface plate comprises the feeder inlet passage 210 and air discharge regions 220. As illustrated in FIG. 4A, the feeder inlet passage 210 has a front opening 211 which comes in contact with the rotary cylinder, and a back opening 212 which comes in contact with the planar surface 150 of the feeder wall 160. In some embodiments, the feeder inlet opening 130 is substantially the same width, height and shape as the back opening 212 of the feeder inlet passage 210, as shown in FIG. 4A. The front opening 211 can be smaller than the back opening 212, as shown in FIG. 4A. In other embodiments, the back opening of the feeder inlet passage can be smaller, larger, or of a different shape than the feeder inlet 130, and the front opening 211 and back opening 212 can be of the same, smaller, larger, or of a different shape from one another, depending on the desired pressure of the food product and other processing parameters.

In one embodiment as illustrated in FIG. 3, the air discharge region 220 comprises an arrangement of holes. The holes allow for air to escape the mold cavity as food product fills the mold cavity and displaces the air. The holes are arranged in rows which form three columns, with each column corresponding to the position of the mold cavities on the rotary cylinder. Other arrangements of the holes of the air discharge region can be used to suit various mold cavity arrangements.

Figure 4B:
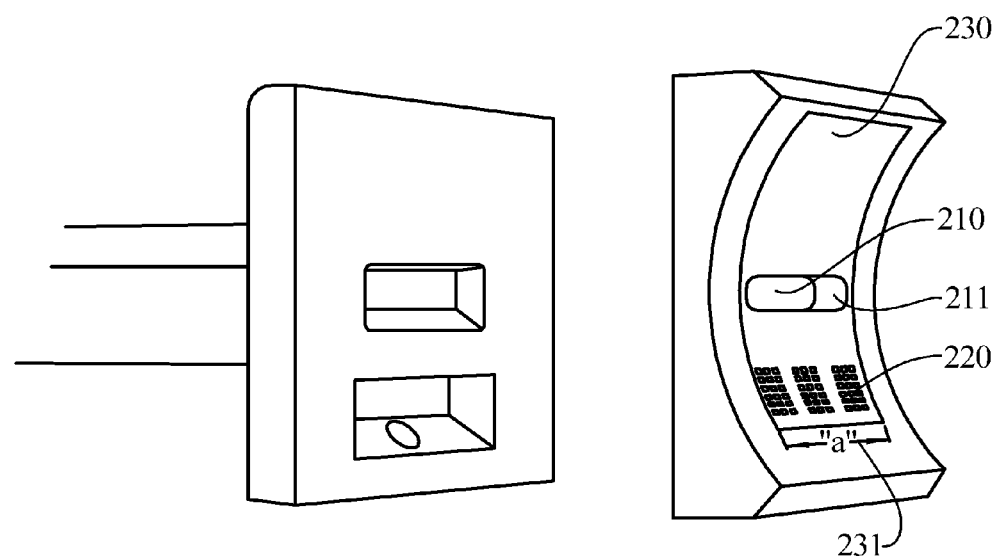
FIG. 4B is a perspective view of the interface plate and the feeder portion, illustrating the front portion of the interface plate.

In the embodiment illustrated in FIG. 3 and FIG. 4B, the interface plate comprises a central region 230. The front opening 211 of the feeder inlet passage 210, and the air discharge region 220 are situated within this central region. The central region is a generally rectangular region on the interface plate that spans a length "a" 231 across the interface plate, and length "h" 232 along the curved surface of the interface plate, and protrudes from the interface plate. The protruding, curved central region protrudes from the curved interface plate in a direction towards the rotary cylinder, and is the portion of the interface plate that comes in contact with the rotary cylinder. Providing a protruding region in contact with the rotary cylinder allows for the apparatus to minimize friction, by ensuring that only the components on interface plate necessary for filling the mold cavities during the operation of the apparatus, such as the feeder inlet passage and the air discharge region, is in contact with the rotary cylinder. The length "a" 231 of the central region 230 of the interface plate generally corresponds to the distance a row of mold cavities spans along the length of the mold cylinder 300. In other embodiments, the central region does not protrude, and the entire interface plate comes in contact with the rotary cylinder.

Figure 5:
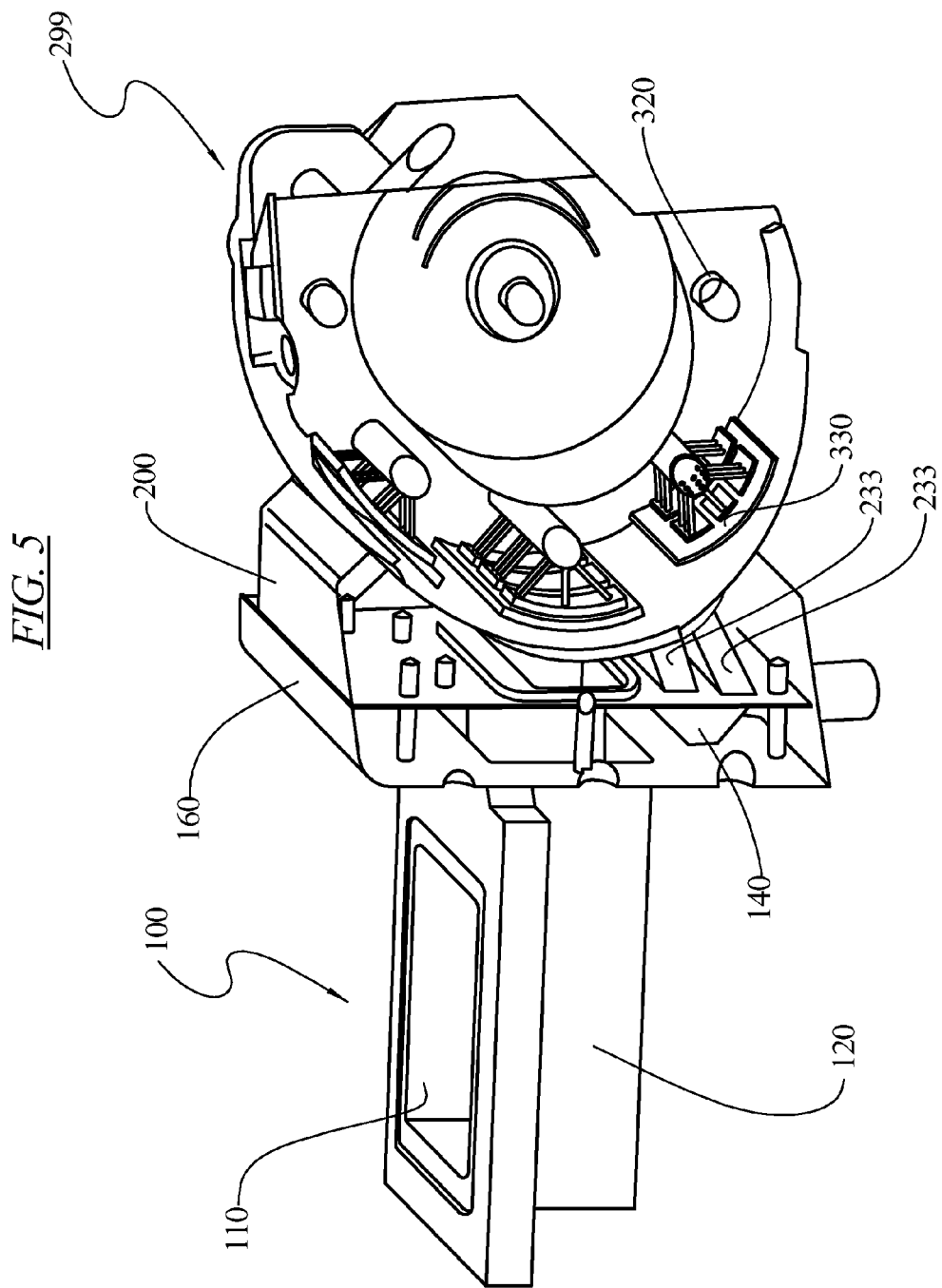
FIG. 5 is a perspective view illustrating the cross section of the feeder wall, interface plate, and the rotary cylinder.

FIG. 5 illustrates two air discharge channels 233 connected from behind, to the holes in the air discharge region 220 such that discharged air flows through the air discharge channels 233 in the interface plate 200 and exits the interface plate 200 via two back openings 222 illustrated in FIG. 4A. The back openings 222 are situated such that when the planar surface 150 of the feeder wall is in contact with the interface plate 200, air exiting from the back openings 222 flows into the discharge outlet 140, where it leaves the feeder portion via the discharge outlet channel 141 (FIG. 4A). Other arrangements of air channels can be used, to provide for adequate structural support of the interface plate at the air discharge region 220 to prevent structural deformations or other issues due to pressure at the air discharge region 220.

The thickness of the interface place at the air discharge region 220 is of sufficient thickness to withstand pressure from air and feeder product, for example, generally $\frac{1}{8}"$ to $\frac{1}{4}"$, with thickness varying with the type of material used. The holes are of suitable size and allow air to escape the mold cavity, and yet prevent significant amounts of food product from passing through the holes. As illustrated in FIG. 4A, the surface on which the front opening 211 of the feeder inlet passage 210 and the air discharge region are situated is a curved surface, with the curvature of the surface corresponding to the curvature of the rotary cylinder.

The air discharge region 220 and feeder inlet passage opening 211 are situated at a distance such that portions of the mold cavity can be in contact with the feeder inlet passage opening 211 and the air discharge region 220 simultaneously. In operation, the rotating mold rotates in a direction such that the mold cavities first come in contact with the air discharge regions 220, and then with the feeder inlet passage opening 211. As the mold cavity rotates past the feeder inlet passage opening, food product simultaneously fills the mold cavity and displaces the air remaining in the mold cavity. Because a portion of the mold cavity is still in contact with the air discharge region as the mold is being filled with food product, the displaced air leaves the mold cavity via the holes in the air discharge region 220. The displaced air flows through the holes in the discharge region 220, and into the air discharge channels 233, where it is connected to the discharge outlet 140 and exits the apparatus via the discharge outlet channel 141. As the mold cavity passes the feeder inlet passage opening 211 which fills the mold cavity, the mold cavity rotates past an area of the interface plate that allows the mold cavity to close at least partially, if not entirely, and allows the patty to settle and form its shape. The mold is filled with food product at a sufficient pressure such that the application of fixing pressure is optional, but not necessary.

FIG. 5 illustrates an embodiment where the feeder portion 100 is situated to the side of the rotary cylinder 299, such that the mold cavities are filled when the mold rotates to approximately the nine 'o clock position. In alternate embodiments, the mold can be filled when the mold cavities are in a different position, such as when the mold cavities are in the twelve 'o clock position. The feeder portion can be situated anywhere relative to the rotary cylinder, for example, such as above the rotary cylinder, to fill the mold cavities from above the rotary cylinder. Alternatively, the feeder portion can be situated horizontally adjacent to the rotary cylinder, yet adapted to feed food product into the mold cavity from above the rotary cylinder.

The position on the rotation where the mold cavity is filled can be dependent on various factors with which persons skilled in the art would be familiar, such as the type of the food product to be molded, the fixing time of the food product, the amount of time the product should remain in a closed food cavity, and where along the rotation the product is to be ejected.

FIG. 5 also illustrates an embodiment of the rotary molding apparatus wherein the interface plate is in contact with a portion, for example 25%, of the surface of the rotary cylinder. After passing the feeder inlet passage, the interface plate can provide additional contact with the rotary cylinder so as to allow the mold cavity to remain fully closed for a desired duration of time. In other embodiments, the interface plate can come in contact with a higher percentage of the surface of the rotary cylinder, such as about 30% to 50%, depending on the shape of the mold cavities, or depending on whether mold cavities need to remain closed for a longer amount of time as the pressurized food product is fixed in the mold cavities.

In one embodiment, the interface plate can provide more than a feeder inlet passage, an air discharge outlet, and temporary mold closure. The interface plate can also cover a greater portion of the rotary cylinder so as to provide additional processes, such as feeding an additional layer into the mold cavity, providing a surface treatment, cleaning, or pretreating the mold cavity surface prior to filling the mold cavity. The percentage of rotary cylinder surface in contact with the interface plate can be optimized by taking into consideration the desired functions as well as the increased friction as a result of an increase in surface area contact.

Mold Cylinder

Figure 7:
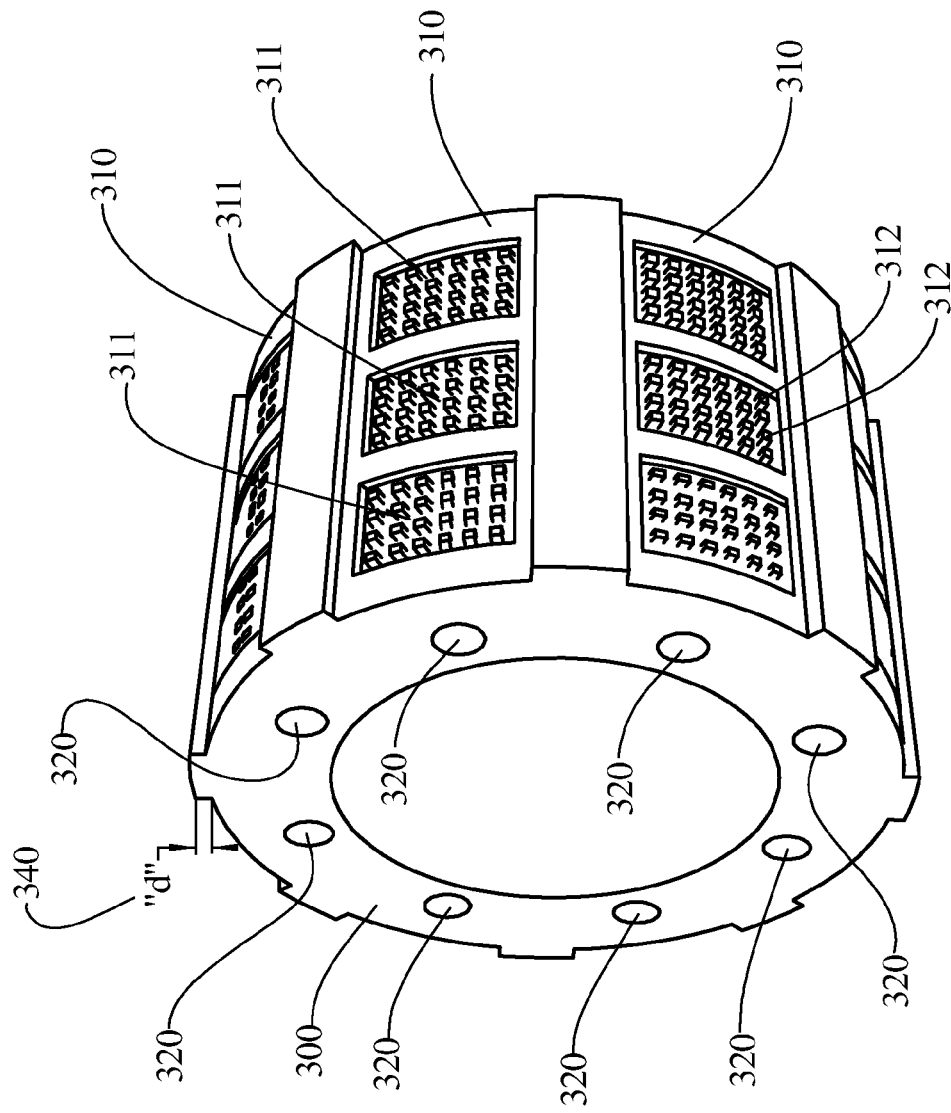
FIG. 7 is a perspective view of the mold cylinder.

The rotary cylinder 299 as seen in FIG. 6 comprises the mold cylinder 300 and the mold shell 400. The mold cylinder 300, as illustrated in FIG. 7, comprises rectangular recessed panels 310 which are oriented lengthwise along the length of the mold cylinder parallel to a horizontal axis of rotation (not shown).

Figure 8:
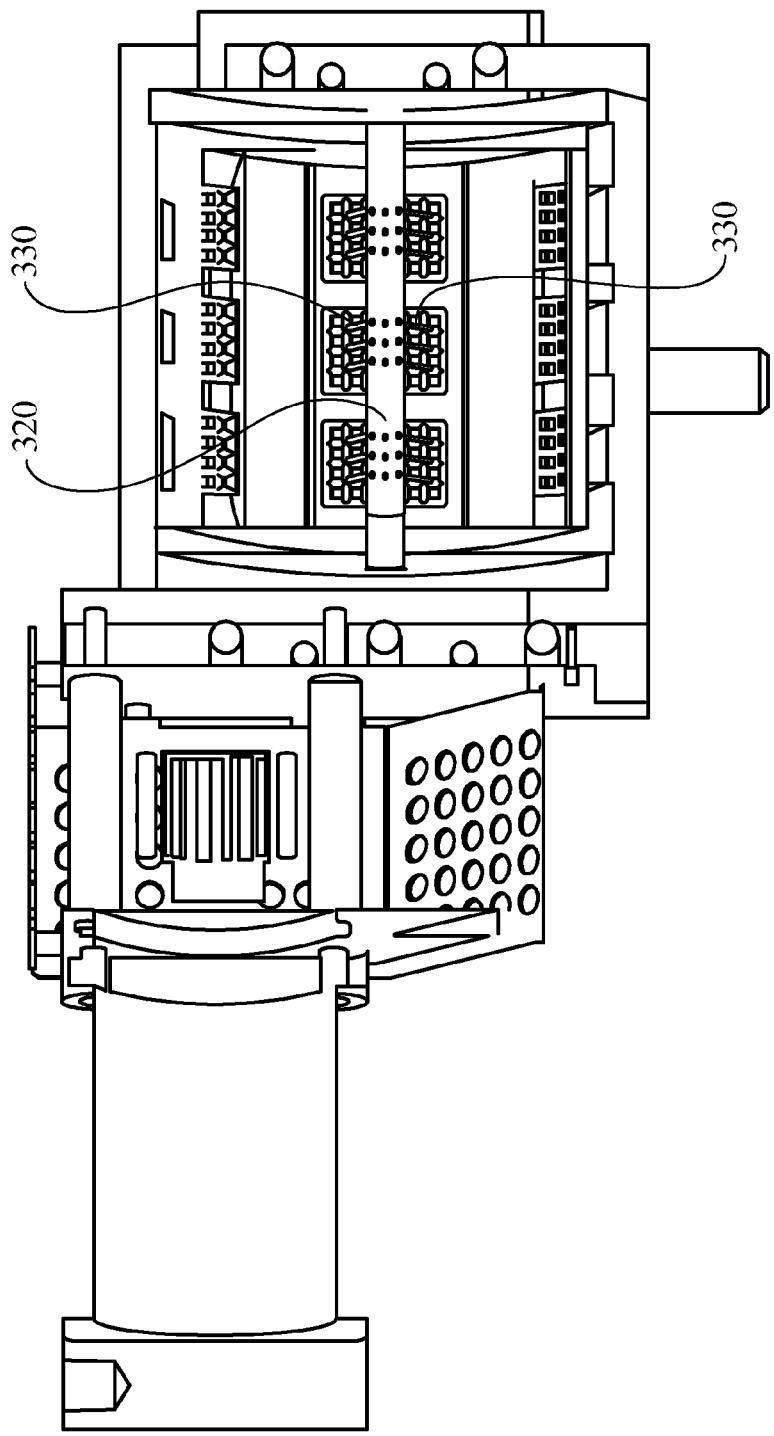
FIG. 8 is a perspective view of the cross section of the rotary cylinder along its length.
Figure 9:
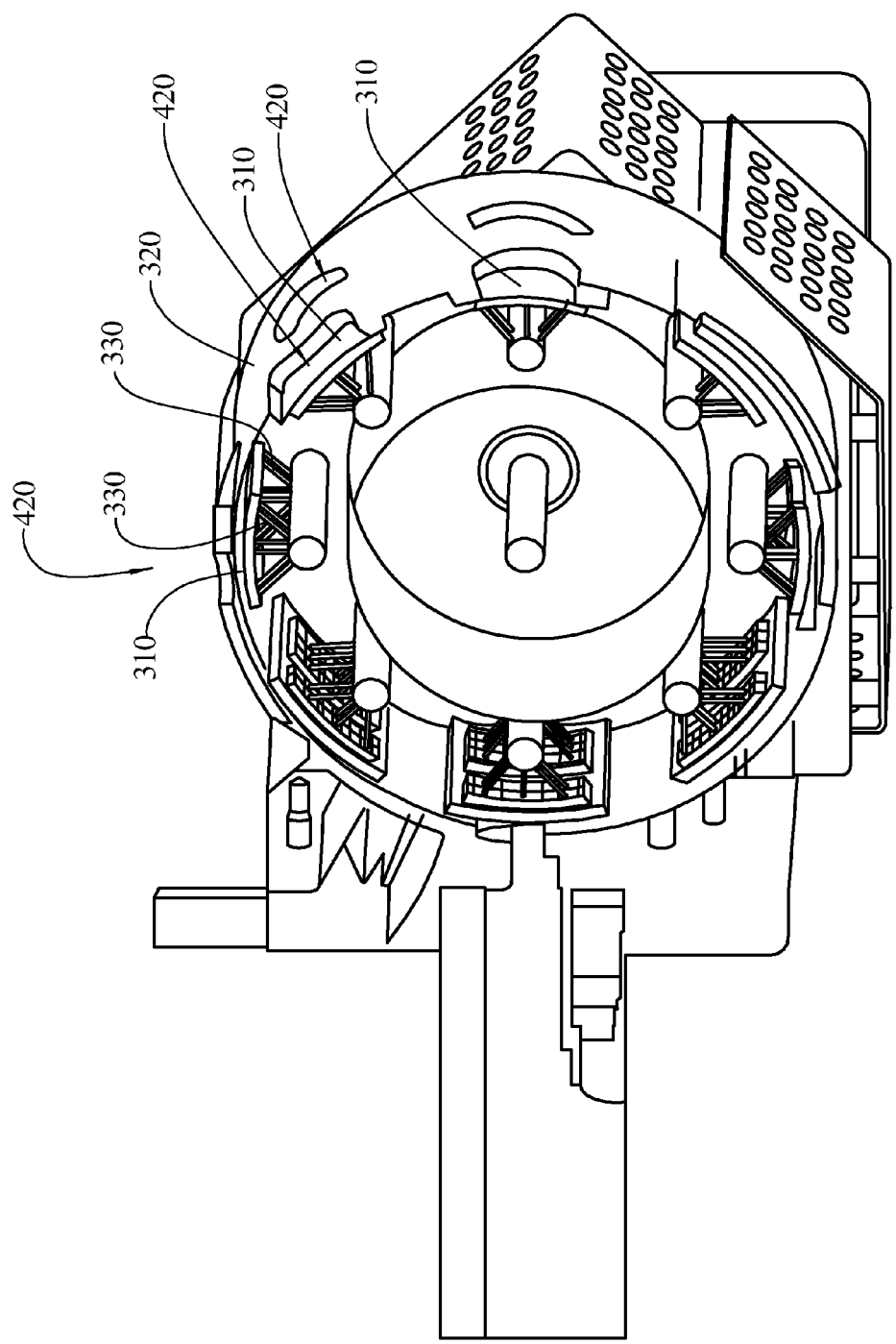
FIG. 9 is a perspective view of the cross section of the rotary cylinder along its width.

Fluid, usually gas such as air that is preferably compressed, is supplied from an external fluid source. Fluid is delivered to the surface of the recessed panels 310 via a series of interconnected channels comprising main channels 320 which branch off into smaller channels 330, as illustrated in FIGS. 8 and 9. The smaller channels 330 are of suitable channel diameter, length, and angle to deliver desired levels of fluid at appropriate pressure to the recessed panels 310. In other embodiments, the smaller channels can be further branched so that additional channels are delivering fluid to the recessed panels.

Figure 15:
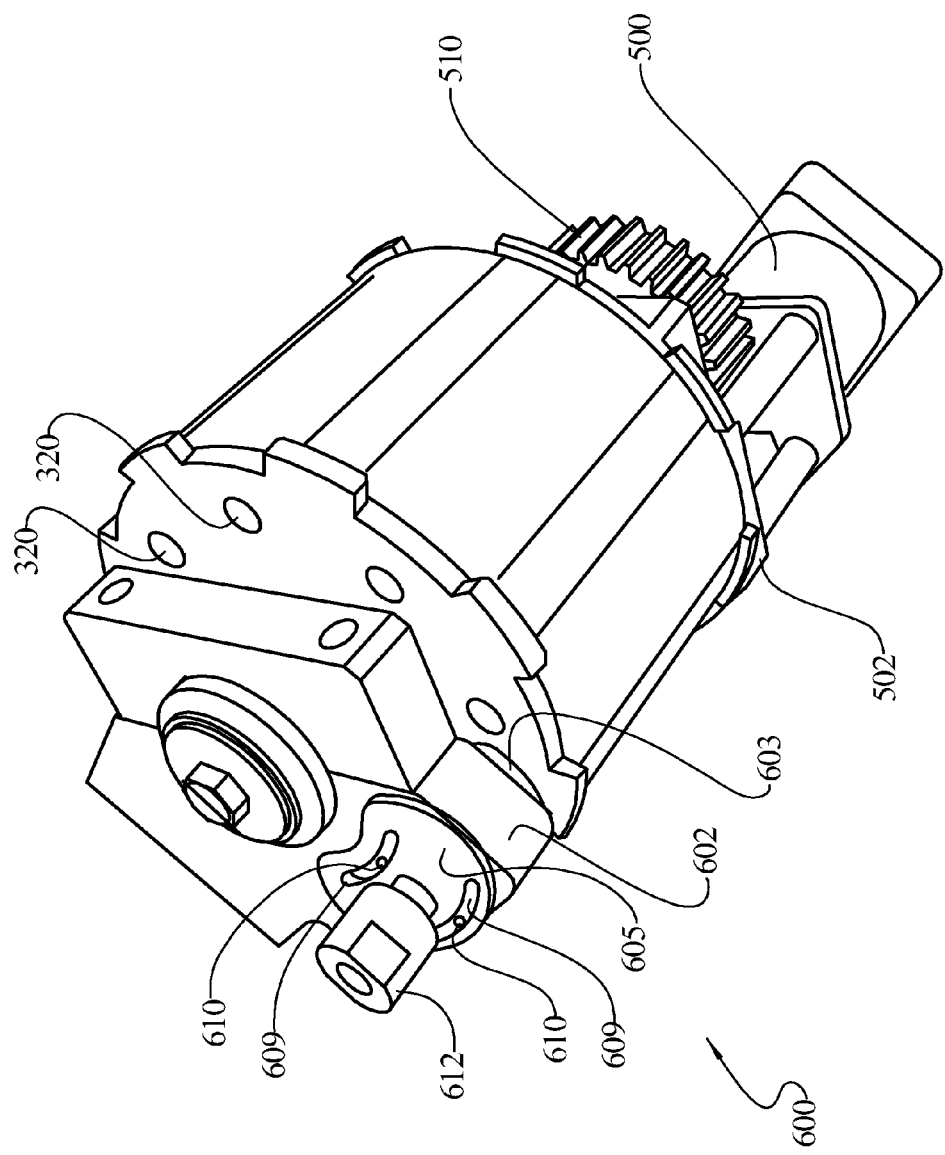
FIG. 15 is a perspective view illustrating the air inlet region
Figure 16:
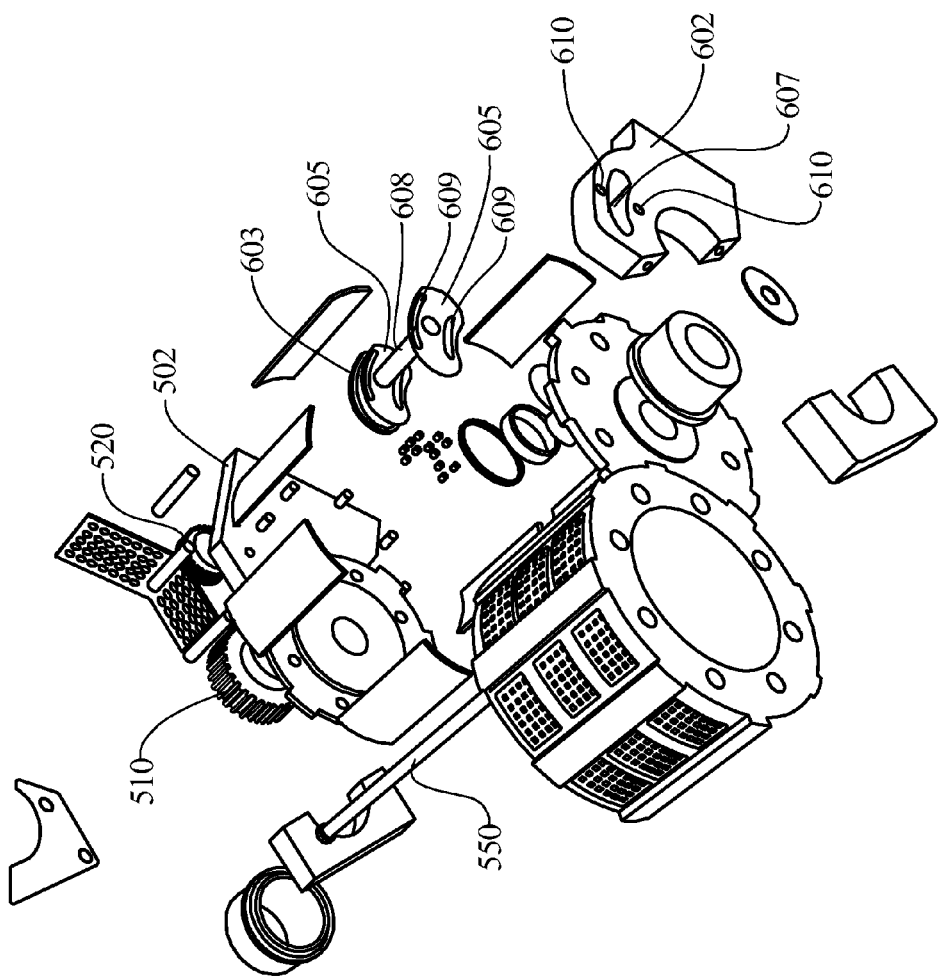
FIG. 16 is an exploded view of the air inlet end of the rotary cylinder.

The main channels 320, as illustrated in FIG. 8, are situated lengthwise, and in parallel to a horizontal axis of rotation of the rotary cylinder. Air is delivered to the main air channels by providing an air inlet region 600 that is stationary relative to the rotary cylinder 299, as illustrated in FIG. 15. The air inlet region 600 comprises a supporting plate 602, two brackets 605 (FIG. 16), an air inlet tube 608, an air hub 612, and a bracket retainer 603 as illustrated in FIGS. 15 and 16. The supporting plate 602 comprises a curved channel 607 (FIG. 16) through which the air inlet tube 608 passes. The air inlet tube 608 passes through the curved channel 607 and is held in position so as not to slide along the curvature of the channel 607 by brackets 605. Brackets 605 have a round opening to fit the air inlet tube 608. To adjust the position of the air inlet tube 608 along the curvature of the curved channel 607 (FIG. 16), the brackets 605 have two curved openings 609 to accommodate fasteners (not shown), such as a screw, which is used to connect the brackets 605 to either side of the support plate 602 (FIGS. 15 and 16) in various positions such that the air inlet tube 608 can be in various positions guided along by the curvature of the curved channel 607. Support plate 602 has threaded holes 610 through which screws can be used to fasten the brackets 605 and the bracket retainer 603 to the support plate, and accordingly, position the air inlet tube 608. The curvature of the curved channel 607 shares the same radius of curvature as the main air channels positioned around the mold cylinder 300, such that main air channels will be able to come into contact with the air inlet tube 608 when the air inlet tube 608 is positioned anywhere along the curved channel 607. This allows an adjustment of the position along the rotation where air enters the main air channels 320 from, for example, the six o'clock position to the eight o'clock position. Accordingly, the position along the path of rotation where molded products are ejected can be varied.

On the mold side of support plate 602, bracket 605 is situated between the support plate and the bracket retainer 603, which is a shaped ring corresponding to the perimeter of the brackets 605. The end of the air inlet tube 608 which presses against the mold cylinder 300 as it rotates comprises of a plastic lip 613 pushed against the rotating mold cylinder by the use of a coiled spring (not shown) coiled around the air inlet tube 608, and situated between the bracket 605 and the plastic lip 613.

The recessed panels 310, illustrated in FIG. 7, are on the outer surface of the mold cylinder 300. The number, shape, and size of the recessed panels can vary depending on the desired shape of the final food product. The panels 310 are recessed a depth "d" 340, as illustrated in FIG. 7, which corresponds to the thickness of porous inserts 335 disposed in the recessed panels, illustrated in FIG. 11. In the embodiment illustrated in FIG. 7, the recessed panels contain further recessed panels 311. In the embodiment shown, three further recessed panels 311 are arranged in a longitudinal row along the outer circumference of the mold cylinder 300, each corresponding to the position of mold cavities arranged in longitudinal rows. The further recessed panels 311 contain raised supports 312 which are illustrated in FIG. 7 as rectangular.

Figure 10:
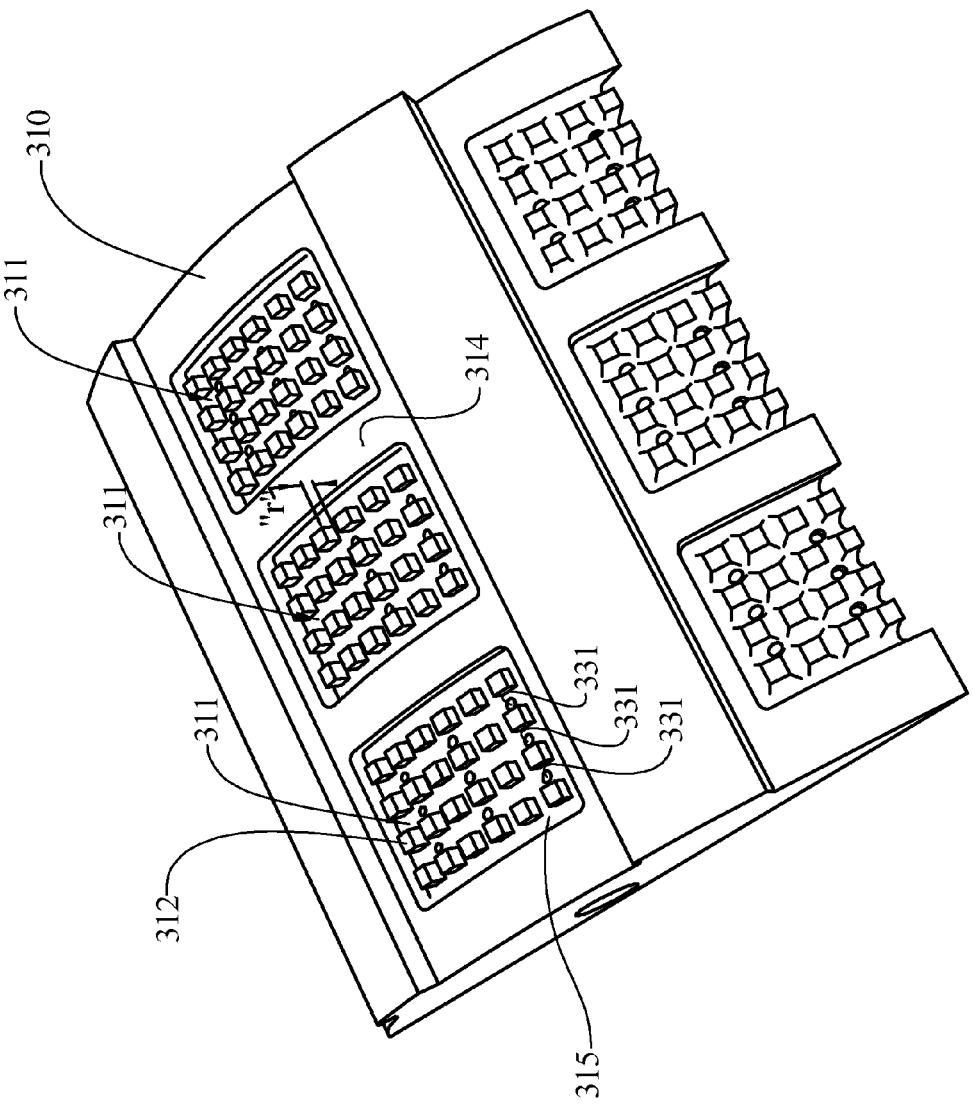
FIG. 10 is a perspective view of the outer perimeter of the mold cylinder.

The smaller channels 330 in FIGS. 8 and 9 supply air to the further recessed panels 311 illustrated in FIG. 10 at the base 315 of the further recessed panel 311 from which raised supports 312 protrude. The smaller air channels 330 terminate at air channel outlets 331 on the base 315 of the further recessed panels 311. The raised supports rise from the base 315 of the further recessed panel a height "r" 314 which corresponds to the depth of the further recessed panel.

In other embodiments, the raised support 312 can be of a different shape, and of a height less than the depth "r" of the further recessed panel 311 to generate a desired fluid circulation or flow pattern behind the porous inserts 335. While not being bound by any particular theory, it is believed that the further recessed panel 311 allows for fluid to gather after being carried into the recessed area from the channels, and provides for a more uniform delivery of fluid to the porous insert 335.

Figure 11:
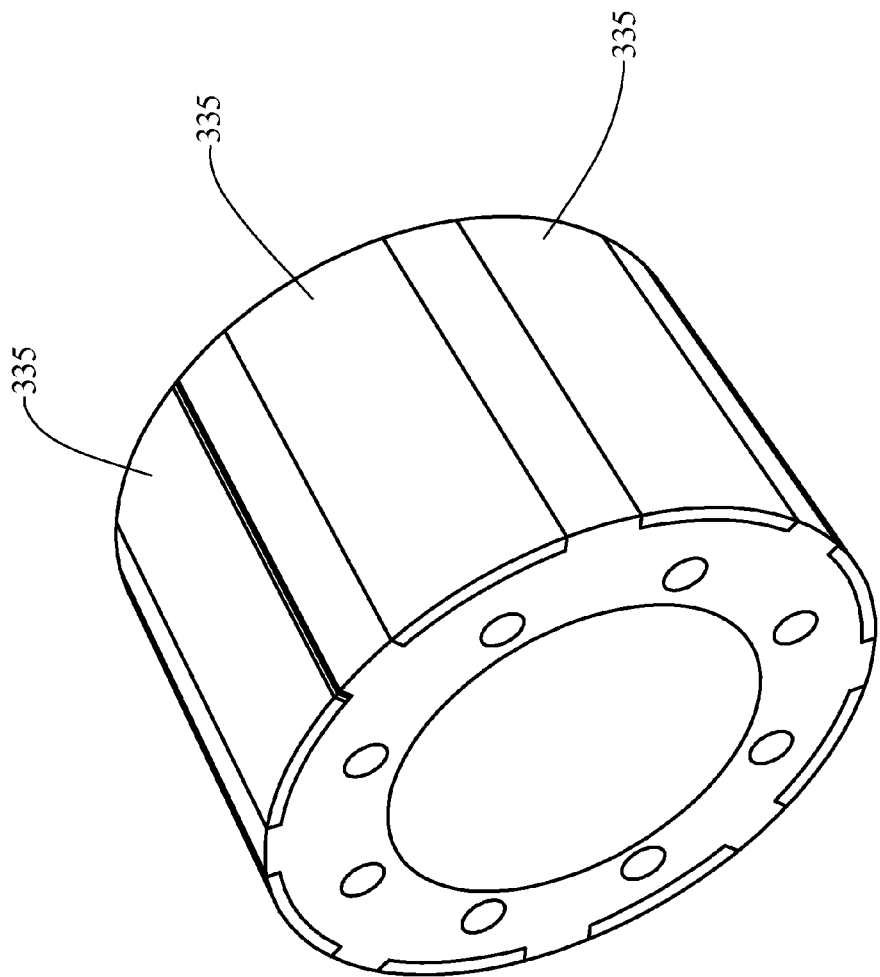
FIG. 11 is a perspective view of the mold cylinder with porous inserts disposed in recessed panels.

Porous inserts 335 are disposed in the recessed panels as illustrated in FIG. 11. The porous inserts 335 are pervious to fluids such as gas or liquid, or both. The porous inserts 335 can be made from non-ferrous or ferrous sintered metal, such as stainless steel, synthetic materials, such as tetraflouroethylene, ceramics, or a combination or composite thereof. Other suitable materials can also be used to manufacture the porous insert. Suitable porous materials are further discussed in U.S. Pat. Nos. 3,427,649, 4,212,609, and U.S. Patent Application 2005/0220932, which are herein incorporated by reference. The porosity of the inserts allow fluid, usually air, that is delivered from the underside of the inserts via the smaller channels 330, to reach the mold cavity 420 and assist in ejecting the molded food product from the mold cavities 420, as illustrated in FIG. 9.

Pore sizes should be of sufficient size to allow for the desired delivery of fluid to the mold cavities, and small enough to be able to provide enough support and withstand mold pressure at the bottom of the mold cavity. Pore sizes can range, for example, in one embodiment, from 0.5 to 100 micrometers. Different types of porous structures and interconnection of porous passage ways are also possible to provide desired fluid flow through the porous inserts, as well as to prevent mold product from being deeply embedded in the porous bottom wall. Various pore shapes and structures, such as, for example, irregular shapes and channels that interconnect at sharp angles, are less likely to allow for mold product to be embedded.

The porous inserts 335 are designed so that they can be easily removed for cleaning, or replaced by other porous inserts with different characteristics to suit the type of food product being molding. Having removable and replaceable porous inserts allows for more efficient cleaning, repair and maintenance, as well as providing a molding apparatus that is highly versatile.

Mold Shell

Figure 12:
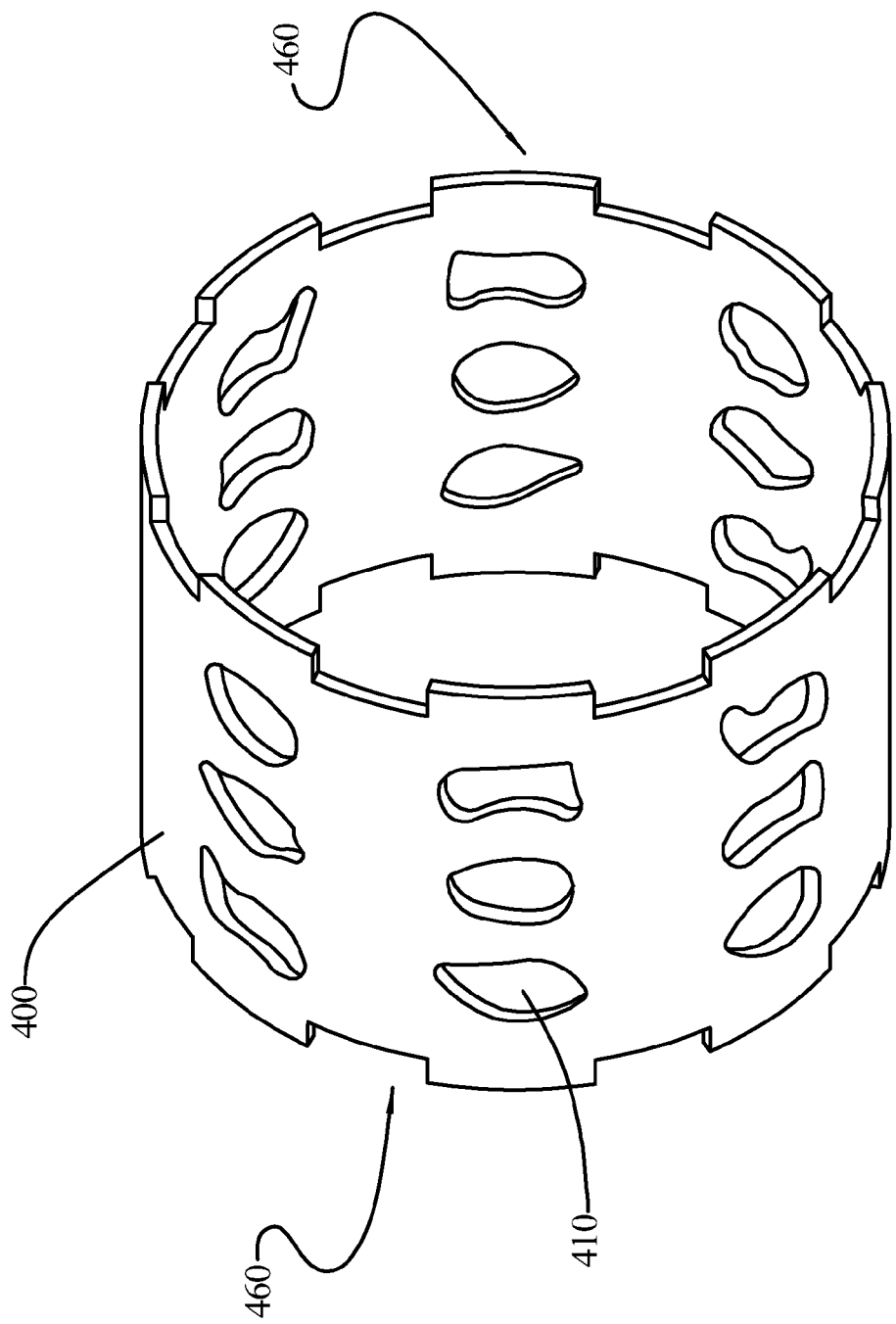
FIG. 12 is a perspective view of the mold shell.

The cylindrical mold shell 400, illustrated in FIG. 12 comprises mold shapes 410 arranged in longitudinal rows along the length of the cylindrical shell. In other embodiments, each row may have the same or a different number of mold shapes which form a mold cavity when a bottom surface is present, or the cavities on the mold shell may be staggered to allow the pump to move product constantly and/or to maintain constant pressure while filling the mold cavities.

The cylindrical mold shell 400 is disposed around the mold cylinder 300 such that the mold shapes 410 are situated over the porous inserts 335 in the recessed panels. The mold shapes 410 provide configured side walls to the mold cavity 420. FIG. 6 illustrates the configuration of the rotary cylinder 299, with the mold cavity 420 being formed by the mold shape 410 and the porous insert 335 as the bottom of the mold cavity. The mold cavity 420 is formed by the mold shape 410, wherein the thickness of the mold shell corresponds to the depth of the side walls of the mold cavity 420. The mold cavity 420 opens radially.

A mold cavity 430 with the insert which functions as the porous bottom wall of the mold cavity is removed in FIG. 6, to clarify the configuration of the mold cavities, wherein each of the mold shapes 410 is situated over a further recessed panel 311. In other embodiments, porous inserts can be disposed over recessed panels without a further recessed panel below.

The mold shell can be easily removed for cleaning and/or repairs, as well as easily replaced by mold shells with other shapes to suit the food product shape desired. Because the mold shell and the porous inserts, which are all removable, are the only portions of the rotary cylinder that come in contact with food product, the rotary molding apparatus allows for a versatility and efficiency not seen in prior art molding devices.

Figure 13:
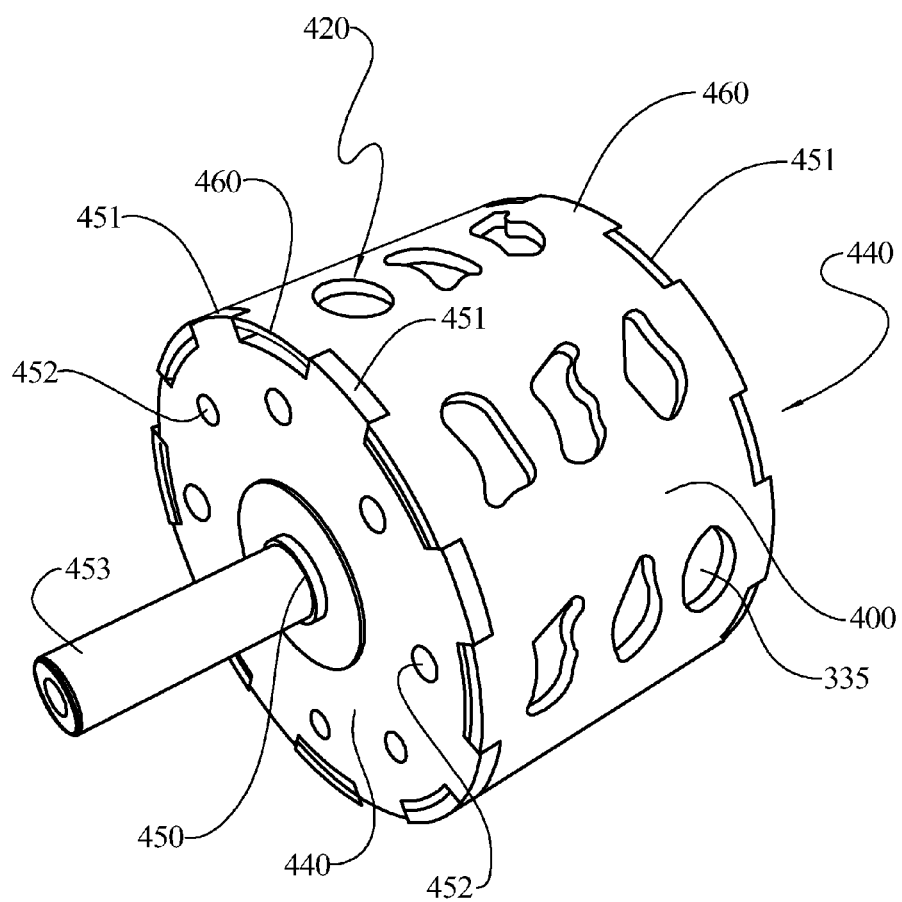
FIG. 13 is a perspective view of the rotary cylinder with base ends and a shaft.

The mold shell 400 is held in place over the mold cylinder 300 with base members 440, illustrated in FIGS. 1 and 13, on either end of the rotary cylinder 299 to prevent the mold shell 400 from sliding off the mold cylinder 300, as illustrated in FIG. 13. The cylindrical mold shell 400 in FIGS. 12 and 13, has top and bottom edges 460 which are keyed so as to interlock with the flanges 451 on the base members 440 when the cylindrical mold shell 400 and the base members 440 are engaged. The base members 440 comprise a central opening 450 for a shaft 453 which provides the axis of rotation. The base member 440 comprises air channel holes 452 which allow for an external source of fluid to reach the main air channels 320.

Fluid flow through the porous bottom wall assists in the ejection of the molded food product from the mold cavity. In one embodiment, where air is forced through the porous bottom walls to eject the mold product from the mold cavities, the air flow through the main air channels is controlled such that only the main air channels supplying the fluid to the row of molds ready for ejection receives air flow sufficient to eject the mold. This can be achieved, for example by having an external fluid source situated at a location where the main air channel corresponding to a particular row of molds ready to be ejected comes into contact with the external fluid source once it reaches a set point on the rotation. For example, an air supply source can be provided at the six o'clock position, where the mold cavities that rotate along a horizontal axis open downwards so as to allow gravity to assist in the ejection. An air source can be situated at the six 'o clock position to continuously provide a stream of pressurized air such that any main channel rotating past the position will receive a stream of air flow so as to allow fluid to pass through the porous bottom walls and eject the molded product.

In one embodiment, the fluid flow through the porous bottom wall can be continuous, so that fluid is passing though the porous walls even during the filling process. The fluid is forced through the porous walls at a pressure less than the filling pressure of the food product being fed into the mold cavity to ensure that the mold cavity can be filled. As the rotary molding apparatus provides for an air discharge outlet, the fluid, usually air, is not entrapped in the mold cavity. The pressure from the fluid can also assist in exerting additional pressure on the food product in the mold cavity when the mold is in its closed position.

Figure 29:
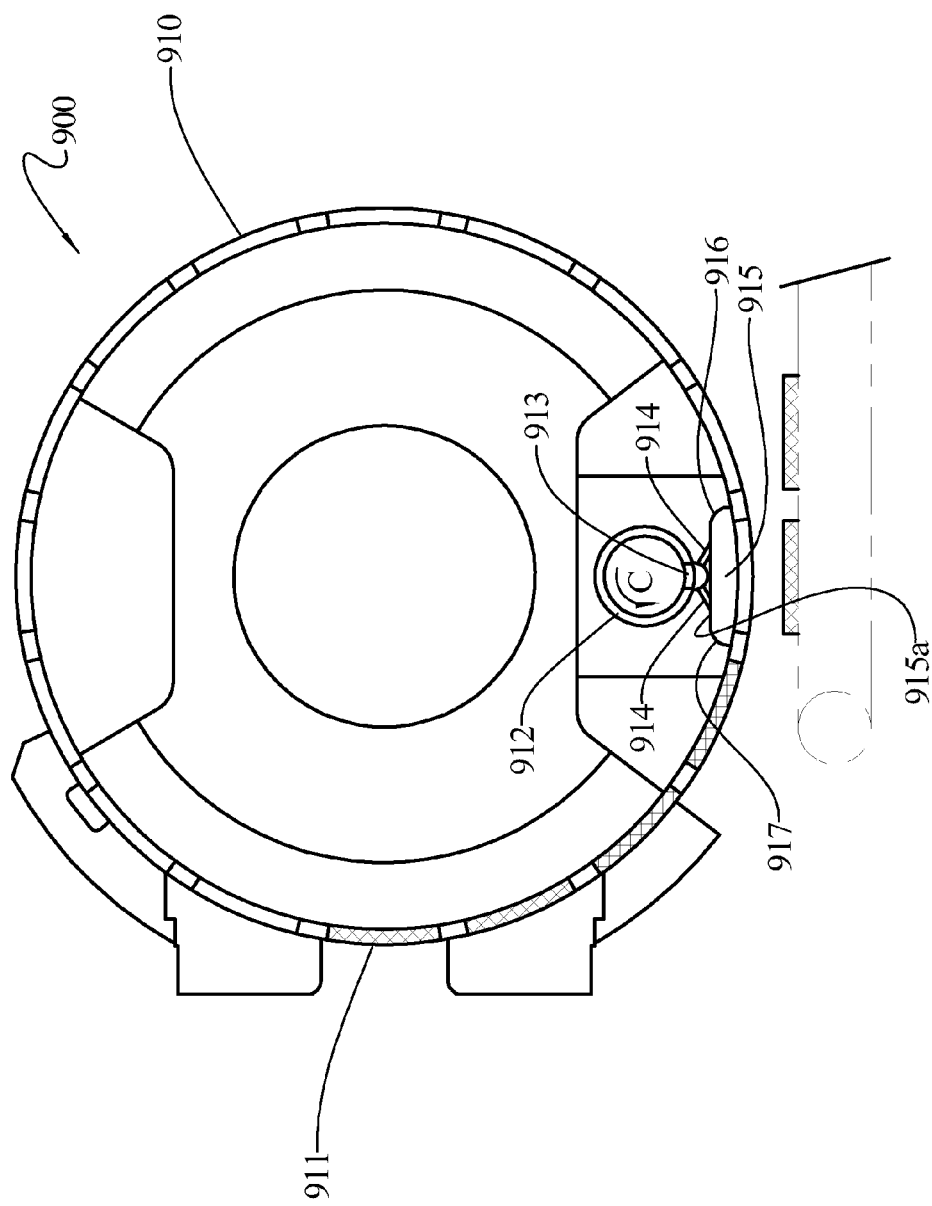
FIG. 29 illustrates a cross sectional view of an alternate embodiment of using pressure to remove a molded food product.

In another embodiment, illustrated in FIG. 29, a mold shell 900 allows mold cavities 910 to be rotated from a fill position at approximately a nine o'clock position to an eject position at approximately a six o'clock position. At the eject position, the food product 911 within the mold cavity 910 is ejected using a stream of fluid such as air. Air in a main air channel 912 flows into a series of smaller channels 914 which are in communication with an air pressure region 915. Air pressure region 915 allows air exiting the smaller channels 914 to exert pressure more evenly on the food product 911 to eject the food product. The flow of air into the air pressure region 915 is regulated using an air port 913. When the main air channel is oriented such that the air port 913 is in communication with the smaller channels 914, pressurized air flows into the air pressure region 915 to eject the food product. To restrict the flow of air from the main air channel 912, the main air channel is rotated in a direction "C" as indicated by the arrow such that the air port 913 is not aligned in communication with the smaller channels 914. The air pressure region 915 spans a distance wider than the width of the mold cavity 910, such that the entire mold cavity 910 may be in contact with the air pressure region 915. Once the food product 911 has been rotated to a desirable ejection position, for example where the food product is at its lowest position, as illustrated in FIG. 29, such that air pressure exerted on the food product will be exerted downwards, the air port 913 is aligned such that the air channel 912 is in communication with the smaller channels 914 which allow a flow of air to eject the food product. The air port 913 may remain out of communication with the smaller channels 914 until the leading edge of the mold cavity has rotated to just before the front region 916 of the air pressure region 915. The duration of air flow is adjusted depending on the mold shape and size, and may be optimized by one skilled in the art. By having an air pressure region 915, various shapes of molded food product maybe ejected from the mold so long as the shaped cavities are within the area defined by the air pressure region 915.

Figure 29A:
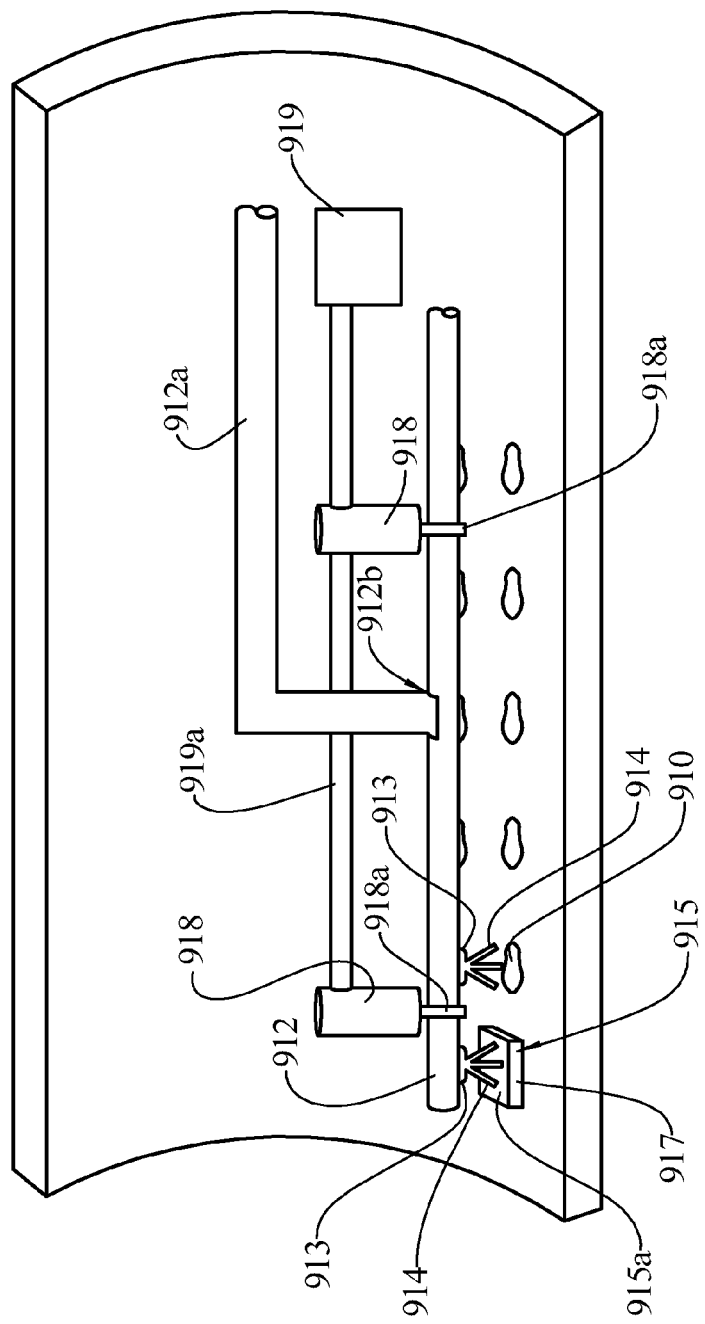
FIG. 29A illustrates a perspective view of implementing the method illustrated in FIG. 29, with portions removed for clarity.

FIG. 29A illustrates one method of implementing the pressurized fluid ejection system of FIG. 29. An air source channel 912a supplies air to the main air channel 912. Multiple air source channels can also be used. The intersection of the air source channel 912a and the main air channel 912 is a sealed rotary connection 912b (shown schematically) such that the main air channel 912 can rotate at the intersection 912b and receive pressurized air from the channel 912a for periodic ejection of air through the air port 913. The rotations of the main air channel 912 can be actuated by a series of gears. Gear 918a is driven by a gear train 918, schematically illustrated, which is rotated by a common shaft 919a driven by a motor 919. The rotation of the main air channel 912 connects and disconnects the source of air into the air pressure region 915. The air pressure region 915 is a rectangular shaped chamber connected at the top surface 915a to the smaller channels 914. The bottom perimeter 917 of the air pressure region 915 preferably forms a seal against the rotating mold. As illustrated in FIG. 29A, the air pressure region is disposed over the mold cavities 910, and is capable of ejecting irregular shaped food patties formed by mold cavities 910 which fit within the bottom perimeter 917 of the air pressure region 915.

Figure 19:
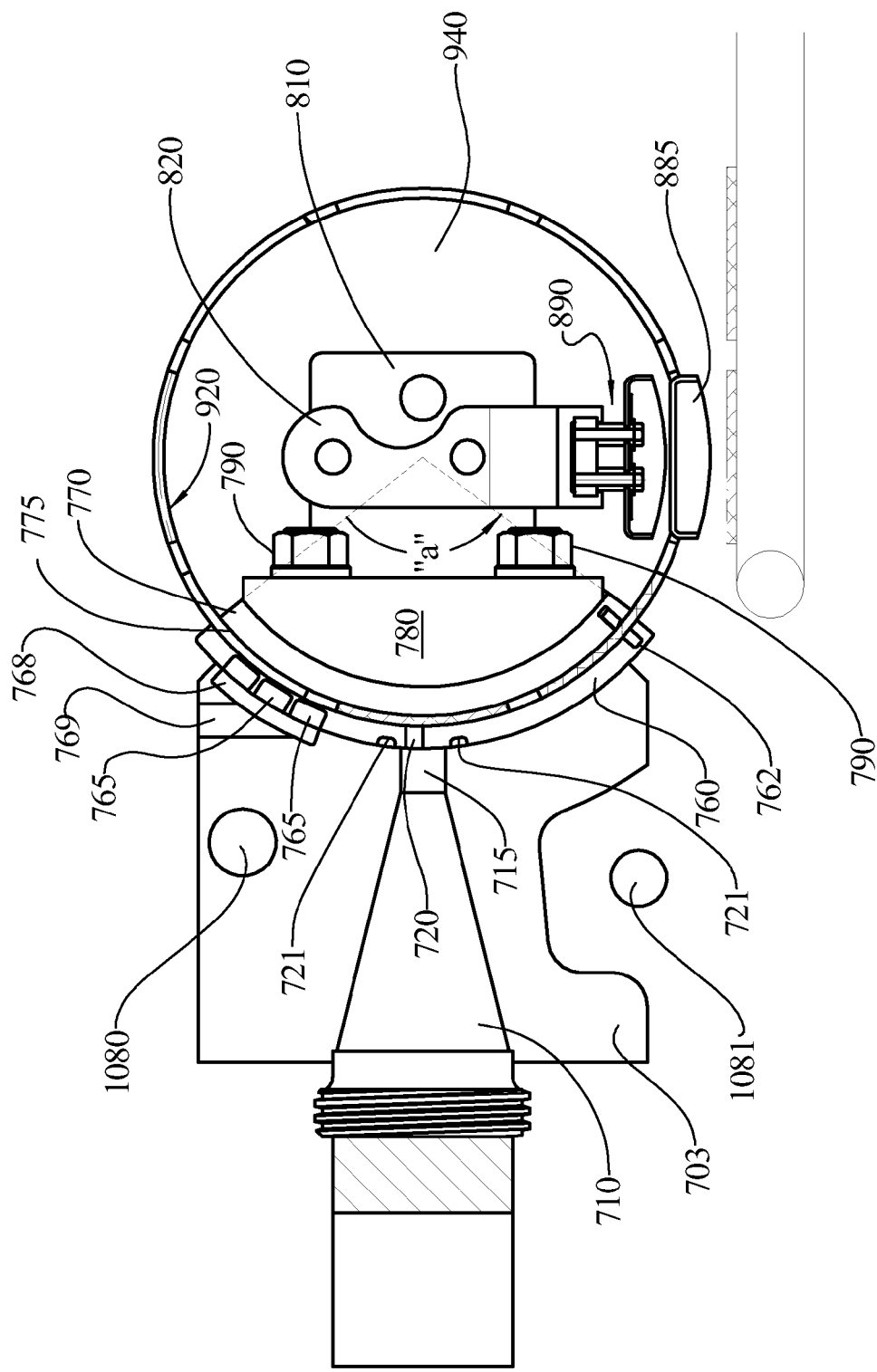
FIG. 19 is a cross sectional view of the rotary molding ding apparatus with parts removed for clarity.
Figure 19A:
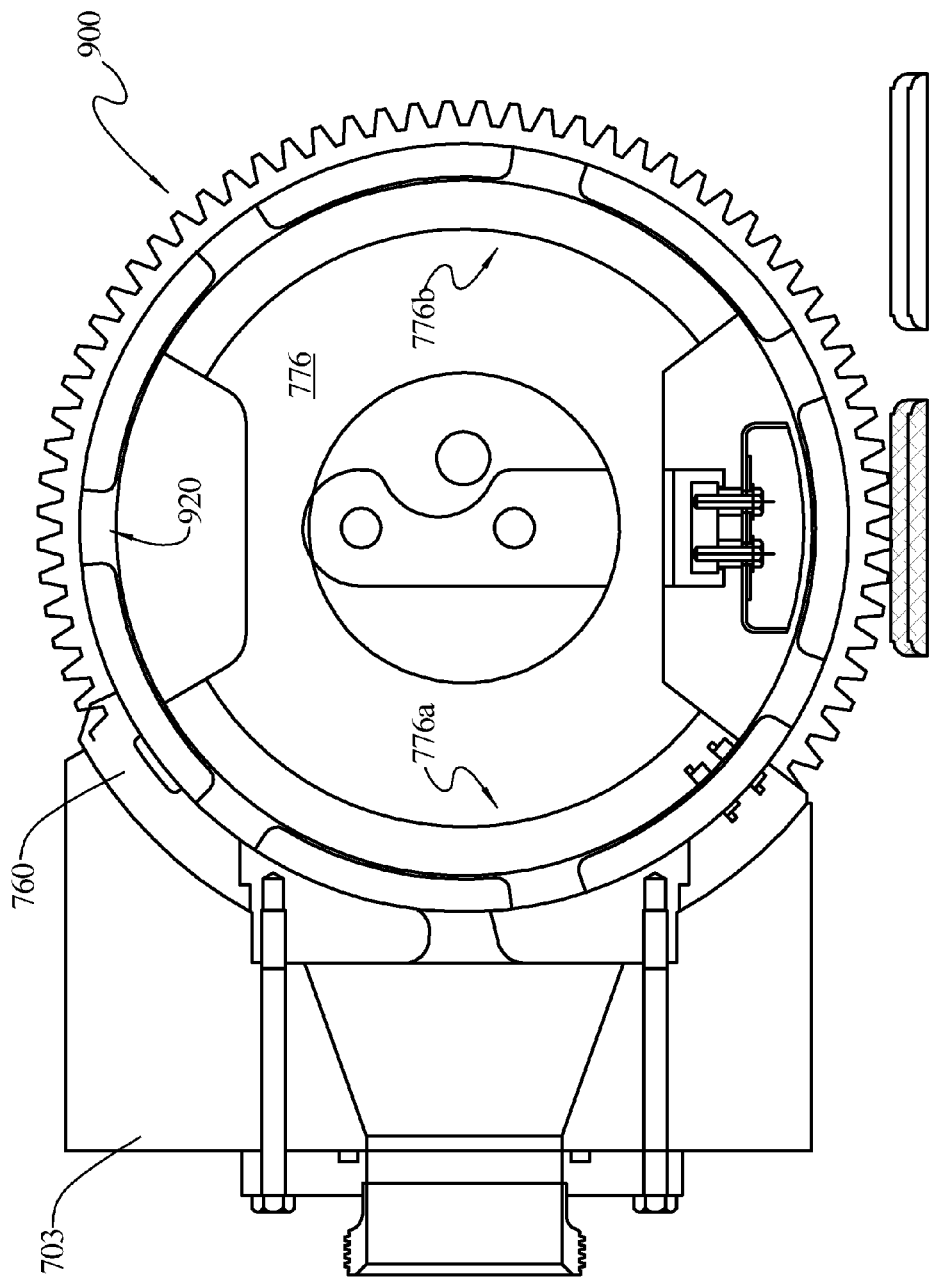
FIG. 19A is a cross sectional view of an alternate embodiment of the rotary molding apparatus.

Air pressure region 915 and connected smaller channels 914, as well as main air channel 912 and air source channel 912a, may be supported in place by securement to a stationary surface or support structure within the rotary mold. Such a stationary surface or support structure may be a mandrel 776 as illustrated in FIG. 19A.

Figure 14:
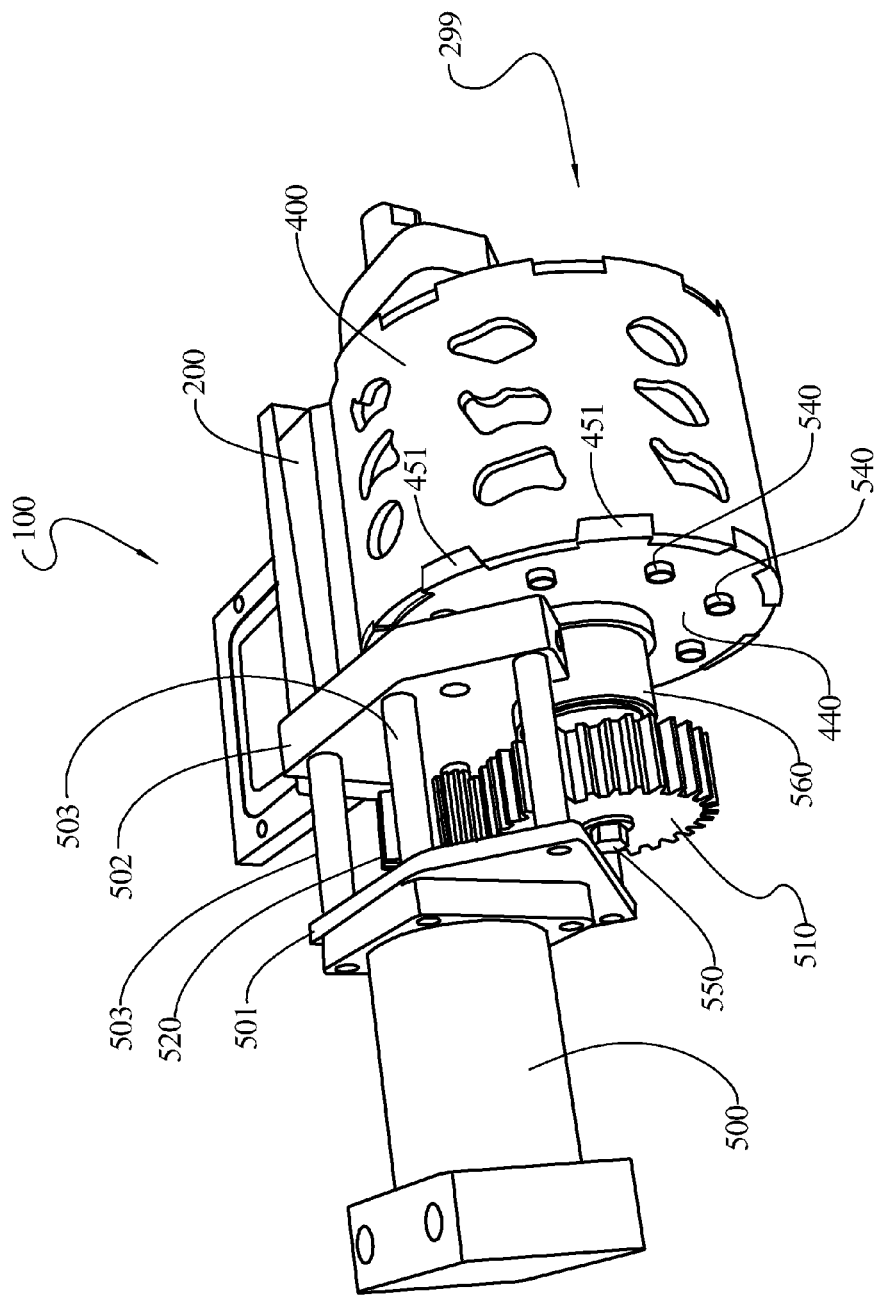
FIG. 14 is a perspective view illustrating the motor attached to the molding apparatus.
Figure 17:
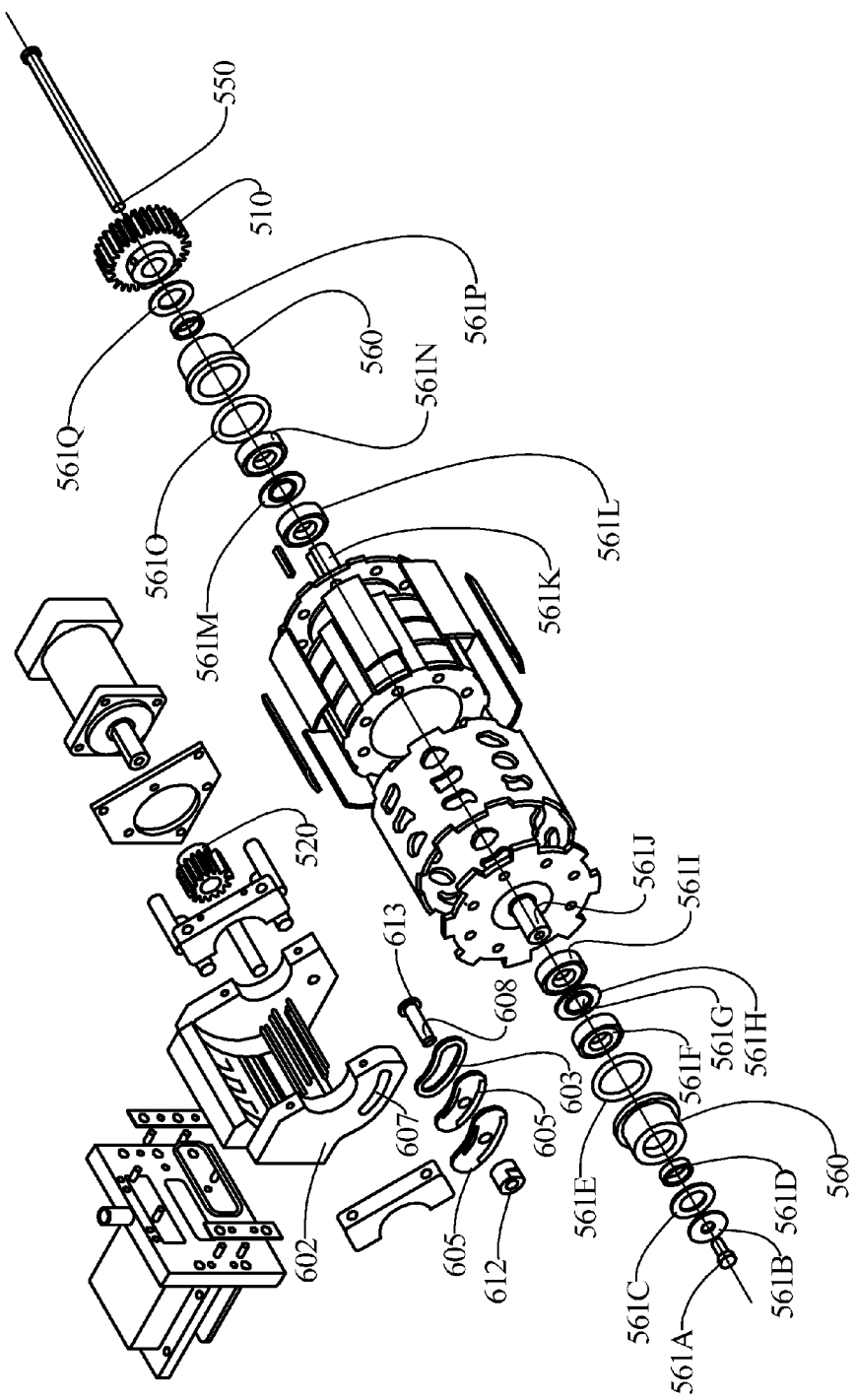
FIG. 17 is an exploded view of the rotary molding system or an exemplary embodiment of the invention.

In another embodiment, the rotary cylinder 299 is operated by a motor 500 as illustrated in FIG. 14, which is attached to a motor adaptor plate 501. The motor adaptor plate 501 is attached to a supporting plate 502 by gear spacers 503. The motor 500 drives the drive gear 520 which is situated between the motor adaptor plate 501 and the supporting plate 502. The drive gear 520 is adjacent to, and drives the driven gear 510. The driven gear 510 is attached to a shaft 550 with an axis around which the rotary cylinder 299 rotates. The cylindrical mold shell 400 and the mold cylinder 300 (FIG. 1) rotate together as a result of the cylindrical mold shell 400 and the mold cylinder's 300 engagement with the base members 440. The cylindrical mold shell 400 has edges 460 (FIGS. 12 and 13) that are keyed so as to interlock with the flanges 451 on the base members 440 when the cylindrical mold shell 400 and the base members 440 are engaged. The base members engage the mold cylinder through the use of hollow dowels 540 which come in contact with the main air channels 320 (FIG. 7). Housings 560, and various other components such as washers, spacers, seals, pins and bearings 561A to 561Q, as shown in FIG. 17, that would be known to one skilled in the art, connects the shaft 550 to the base members 440, allowing the base members 440 to rotate in accordance with the driven gear 510.

FIGS. 18 to 21 illustrate an alternative embodiment of a rotary molding system comprising a knock-out mechanism. The rotary molding system comprises a feeder portion 700, a fill plate 760, a wear plate 770, a knock-out mechanism 800, and a rotary mold 900 comprising mold cavities 910. The feeder portion 700 provides a steady stream of food product to the fill plate 760 for deposition into the mold cavities 910. The wear plate 770 acts as a bottom surface to the mold cavities 910 when the mold cavities are rotated into position over the wear plate 770 when being filled. When the filled mold cavities 910 are rotated to their eject position, the knock-out mechanism 800 operates to eject the molded food product from the mold cavities onto a roving surface positioned below the eject position.

Feeder Portion 700

Figure 18:
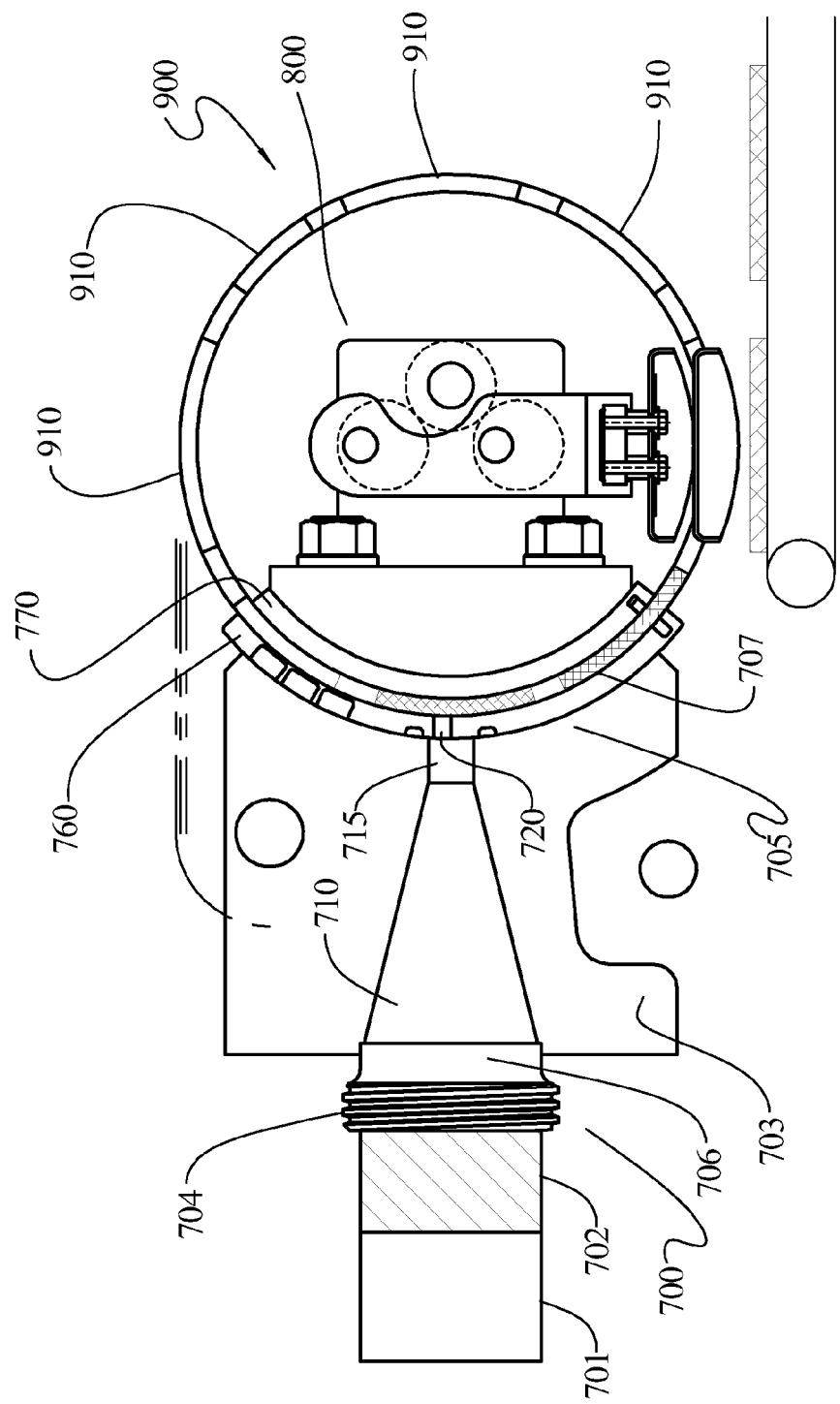
FIG. 18 is a cross sectional view of the rotary molding apparatus of an exemplary embodiment of the invention.

FIG. 18 illustrates the feeder portion 700 of a rotary molding system of another embodiment of the present invention. The feeder portion comprises a feeding channel 710 within a feed plate 703. The feed plate 703 comprises a curved portion 705 which is adapted to complement the curvature of the rotary mold 900.

Figure 20:
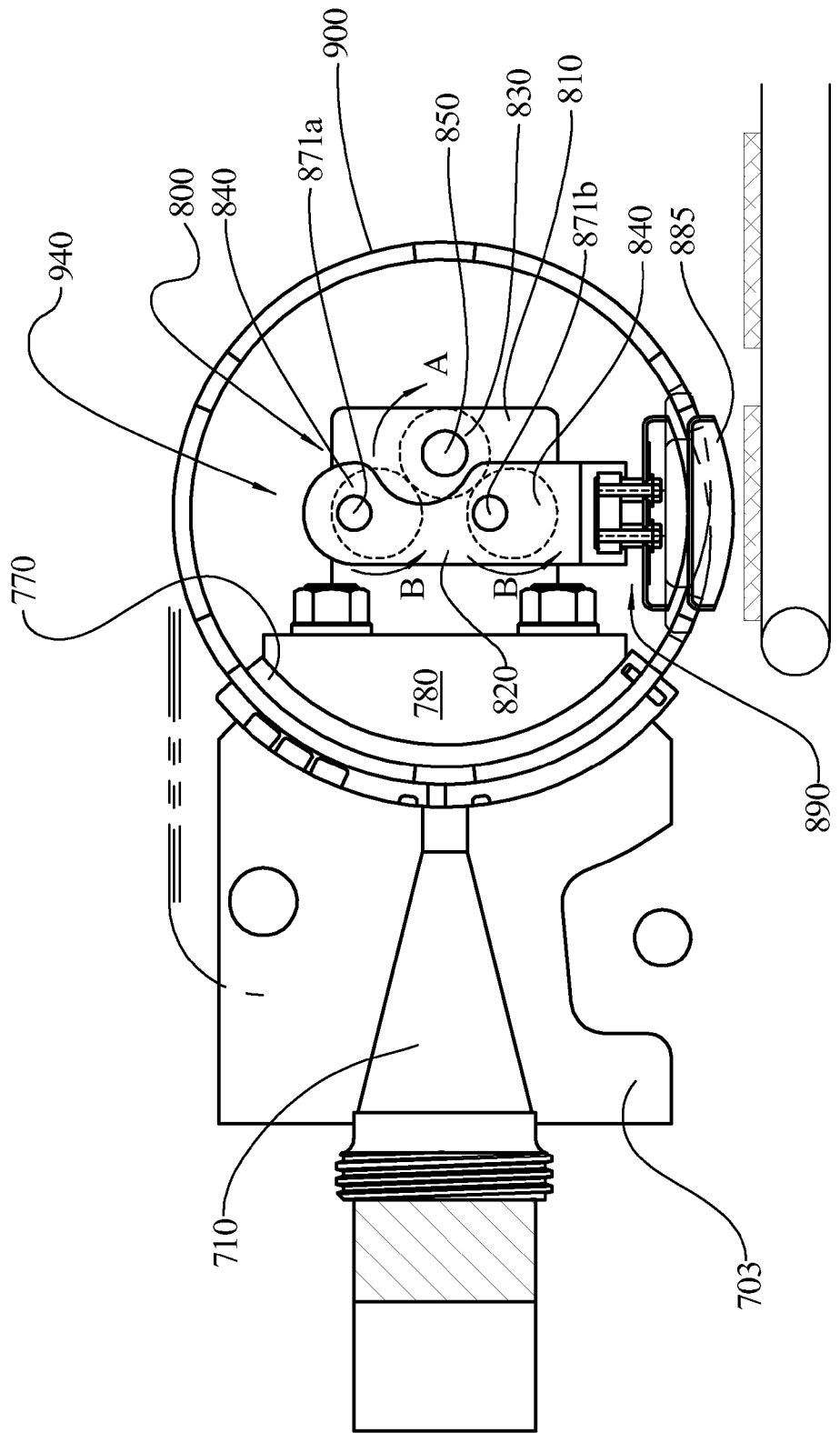
FIG. 20 is a cross sectional view of the rotary molding apparatus.
Figure 23:
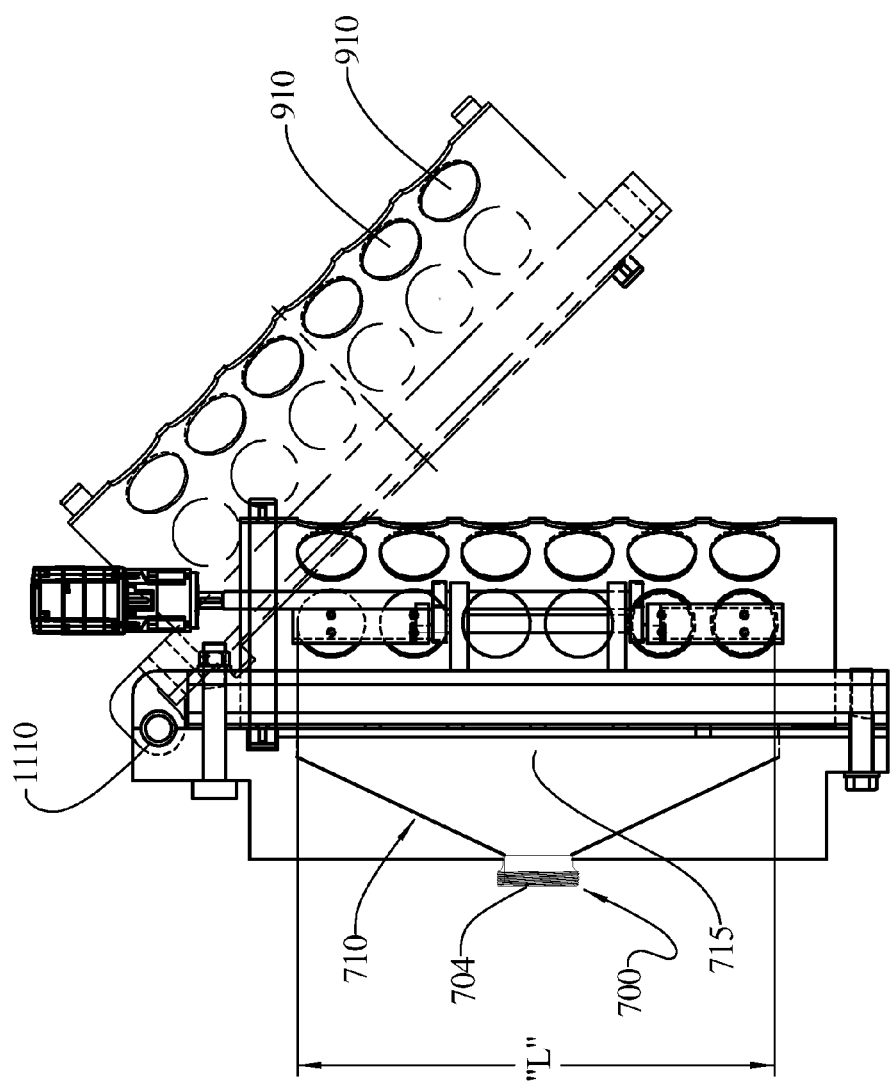
FIG. 23 illustrates a pivoting mechanism for the rotary mold.

The food product enters the feeding channel 710 at a feeding channel inlet 706 located generally in the central region of the feed plate 703 as illustrated in FIG. 18. From the channel inlet 706, the food channel 710 gradually fans out to a length "L," corresponding approximately to the distance spanned by a longitudinal row of mold cavities, to ensure delivery of food product to all mold cavities within a longitudinal row (FIG. 23). The feeding channel 710 has a frustoconical cross section, as illustrated in FIGS. 18 to 20, which assists in gradually increasing the pressure of the food product as the food product moves toward the rotary mold for injection into mold cavities 910.

A feeding channel adaptor 704 is used to connect the feeding channel to a source of pumped food product. Food product is moved into the feeding channel 710 from a food hopper 701 using a pump 702 as discussed above with respect to the previous embodiment of the invention.

The feeding channel 710 is connected to an outlet portion 715 at the end of the feeding channel 710 closest to the curved portion 705. The outlet portion 715 is a channel with a rectangular cross section which spans a length "L" corresponding approximately to the distance spanned by a row of mold cavities, as illustrated in FIG. 23. The outlet portion 715 is in communication with the fill plate 760.

Figure 30:
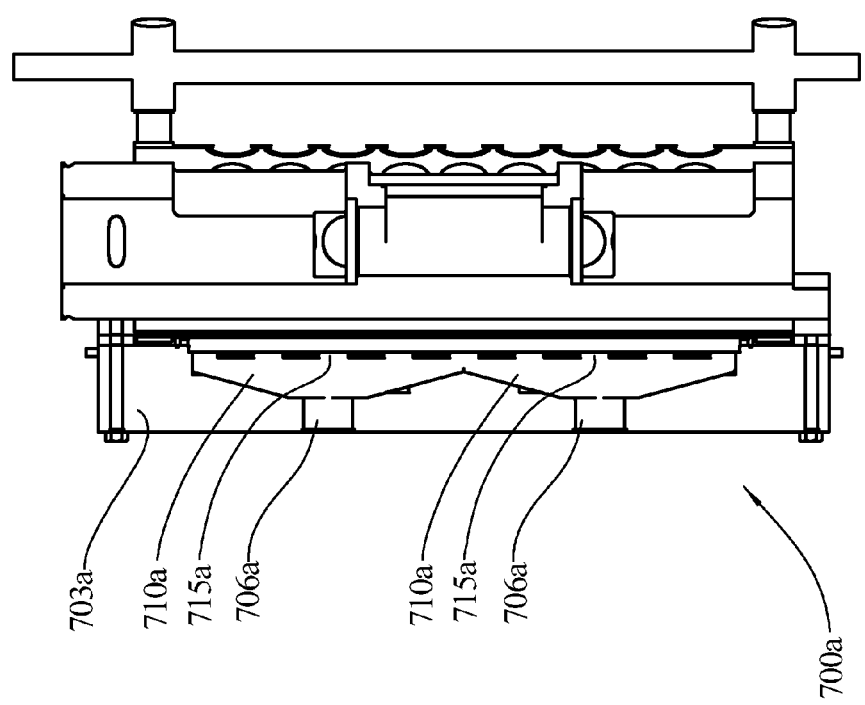
FIG. 30 illustrates a top view of an exemplary embodiment of a fill plate comprising two feeding channels.

In another embodiment, illustrated in FIG. 30, the feeder portion 700a comprises two feeding channels 710a within feed plate 703a. The product enters the feeding channels 710a via feeding channel inlets 706a, which are generally evenly spaced within the feed plate 703a. Like the feeding channel 710 described above, each feeding channel 710a gradually fans out, and is in communication with each other at the outlet portion 715a of the feeding channel 710a. The outlet portion 715a spans a length corresponding approximately to the distance spanned by a row of mold cavities. In other embodiments, more than two feeding channels can be used in a similar fashion to encourage food product to spread evenly through the feeder portion and to minimize the distance food product travels from the channel inlets 706a.

Fill Plate 760

Figure 26:
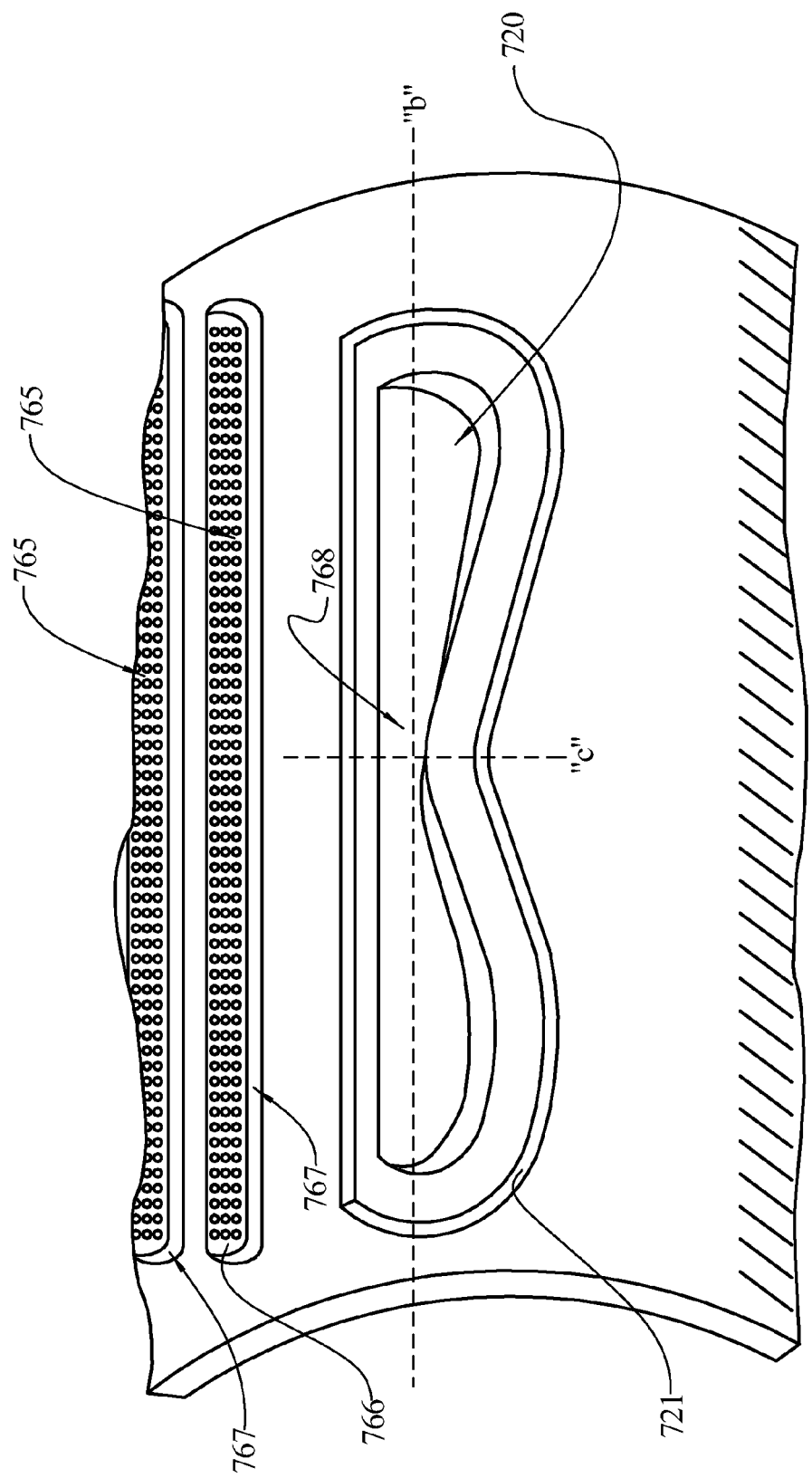
FIG. 26 illustrates the fill plate.

The fill plate 760, as illustrated in FIG. 26, is a curved plate disposed in contact with the curved portion 705 of the feed plate 703 (FIGS. 18-20). The fill plate 760 is disposed between the rotary mold 900 and the curved portion 705 of the feed plate 703. The fill plate 760 comprises a feeder inlet passage 720 through which the food product passes to enter the mold cavities 910. The feeder inlet passage 720 may continuously span a length "L", corresponding approximately to the distance spanned by a row of mold cavities, as illustrated in FIG. 23, or alternatively, be distinct openings in the fill plate 760 which are not connected continuously.

As illustrated in FIG. 26, the feeder inlet passage 720 is asymmetrical along its longitudinal axis "b," and symmetrical on either side of axis "c." The feeder inlet passage 720 has a narrower central portion 768, which gradually expands with increasing distance from central axis "c." Feeder inlet passage 720 is narrower in the central portion to allow for more uniform filling of each mold cavity within a row, regardless of their proximity to the feeding channel inlet 706. Without being regulated by the feeder inlet passage 720, the mold cavities 910 in the center of the rotary mold which are closest to the feeding channel inlet would be filled with food product at a higher pressure and/or a greater flow rate as a result of its proximity to feeding channel inlet 706, than mold cavities 910 situated near the end of the rotary mold 900.

Other mechanisms for evenly distributing the filling pressure at the inlet passage 720 can be used. For example, distinct openings which may be uniform in size, or which increase in size, as the distance from the central region 768 increases can also be used to evenly fill the mold cavities.

The fill plate 760 comprises breather regions 765 which are perforated with air channels (not shown) whose outlets 766 are shown in FIG. 26. The breather region 765 comprises elongated recessed grooves 767 which do not penetrate the entire thickness of the fill plate 760. The channels are of a depth spanning the remaining thickness of the fill plate 760 in the grooves 767, and is in communication with the surface of the rotary mold 900, or a mold cavity 910, as the rotary mold rotates past the breather regions 765. The breather regions span a length "L", corresponding approximately to the distance spanned by a row of mold cavities, as illustrated in FIG. 23. The breather regions allow for displaced by the incoming food product in the mold cavity 910 to exit the mold cavity as it is increasingly filled with food product. The breather regions 765 and feeder inlet passage 720 are situated at a distance such that portions of the mold cavity can be in contact with the feeder inlet passage 720, and the breather regions simultaneously. In operation, the rotating mold rotates in a direction such that the mold cavities first come in contact with the breather regions, and then with the feeder inlet passage 720. As the mold cavity 910 rotates past the feeder inlet passage 720, food product simultaneously fills the mold cavity and displaces the air remaining in the mold cavity. Because a portion of the mold cavity 910 is still in contact with the breather regions 765 as the mold is being filled with food product, the displaced air leaves the mold cavity 910 via the air channels in the breather region 765.

The air channels are preferably of a suitable size to allow for displaced air to exit the mold cavity 910, while preventing food product from entering the air channels. However, it is often the case that small portions of food product are squeezed into the air channels. Displaced air from each of the breather regions 765 is collected in a displaced air chamber 768 disposed in contact with the breather regions 765 (FIG. 19). The air in the displaced air chamber 768 is connected to an air discharge channel 769 which can transfer the discharged air, along with any food products, back towards the food hopper 701. The fill plate 760 may comprise a scraper or wiper 762 to channel food products which end up in the clearances, towards the hopper. Food products captured by the scraper or wiper 762 are in connection with air channels which transport the food products back towards the hopper 701.

The fill plate 760 further comprises an overflow groove 721 disposed around the perimeter of the feeder inlet passage 720 as illustrated in FIGS. 26 and 19. The overflow groove 721 is a recessed groove in the fill plate disposed around the feeder inlet passage 720. The overflow groove 721 captures food product, which when exiting the outlet portion 715 at high pressure, may be forced between the feed plate 703 and the fill plate 760. The overflow groove 721 can be of other suitable shapes, such as a rectangle, around the feeder inlet passage 720.

Because the fill plate 760 is in contact with a continuously rotating rotary mold 900, the fill plate 760 comprises sealing mechanism or layer 707 disposed on the rotary mold side of the fill plate to ensure adequate close contact with the rotary mold and prevent food product from leaking from the mold cavities 910 once the mold cavities 910 are filled (FIG. 18).

Figure 21:
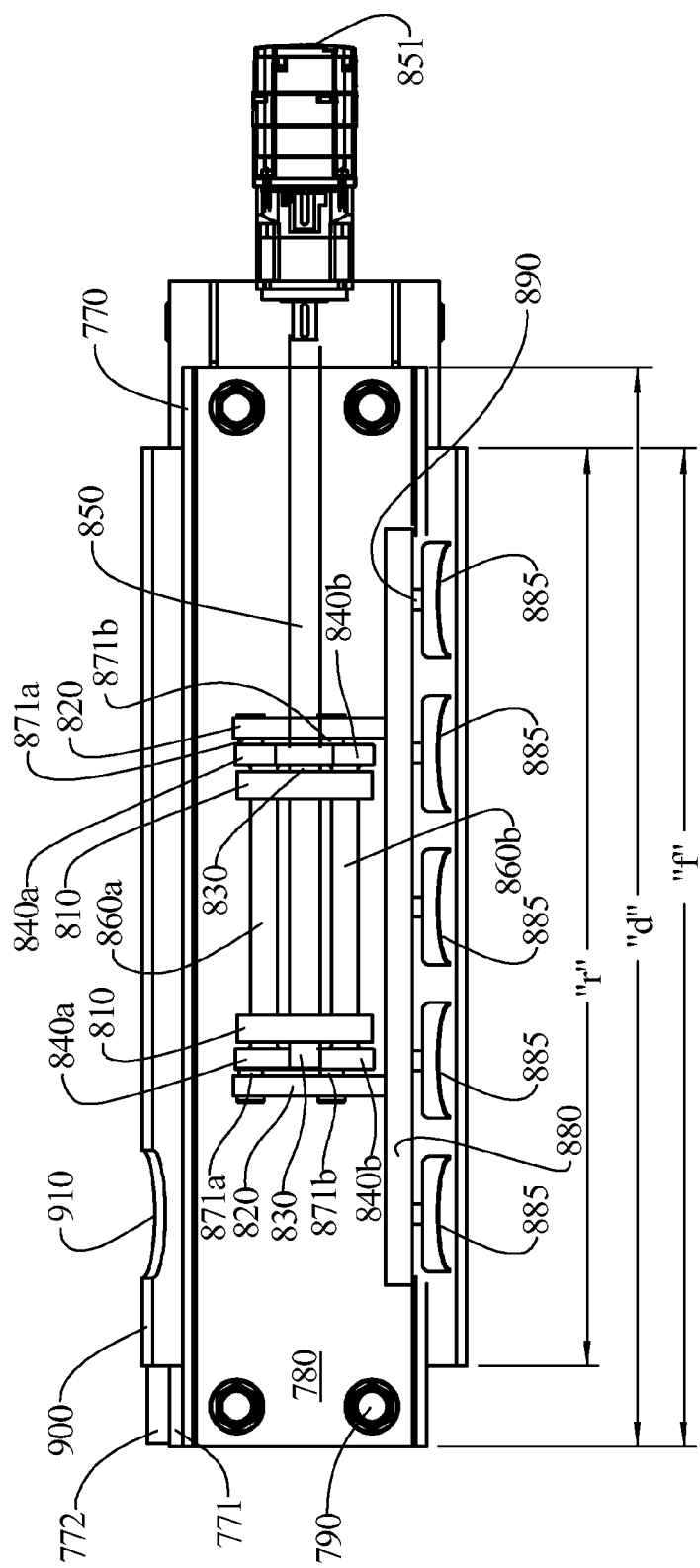
FIG. 21 is a cross sectional view taken along the length of the rotary remolding apparatus

The fill plate is in contact with a portion of the rotary mold 900 defined by the intersection of an angle "a" with the rotary mold 900, as illustrated in FIG. 19, and extends for a length L," which corresponds approximately to the distance spanned by a row of mold cavities, as illustrated in FIG. 23, or just slightly greater than length "L." The fill plate can extend a length "d" as illustrated in FIG. 21, which extends beyond the length of the rotary mold, extend a length "r" corresponding to the length of the rotary mold, or a length "f" wherein the fill plate extends beyond the rotary mold on one end, or any other suitable length.

Figure 31:
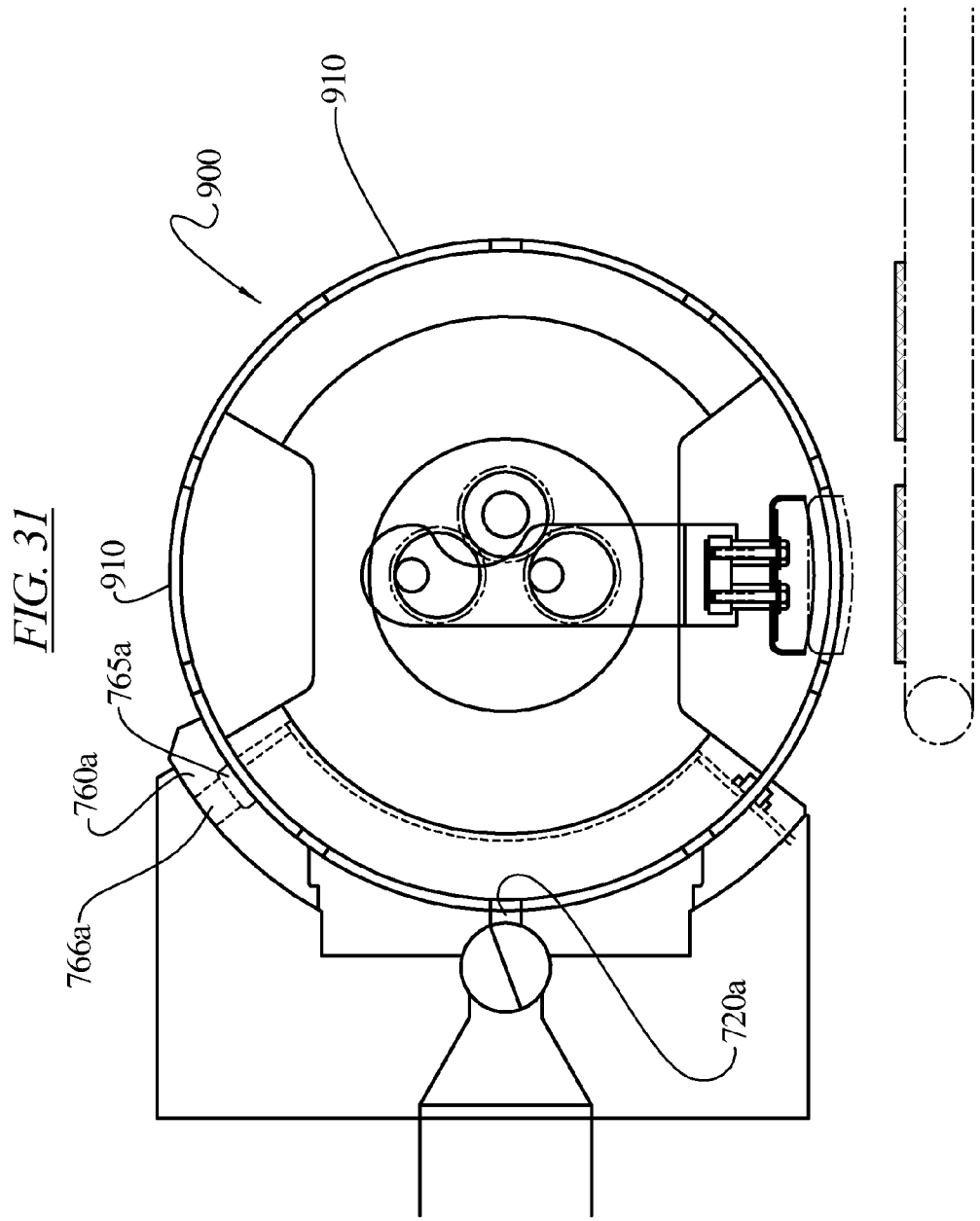
FIG. 31 illustrates a cross sectional view of an exemplary embodiment of a rotary molding system where the mold cavities are subjected to a low pressure region prior to filling.

In another embodiment, the fill plate 760a (FIG. 31) comprises a vacuum region 765a connected to a vacuum channel 766a. The vacuum region 765a is situated upstream of the feeder inlet passage 720a. In operation, the rotating mold rotates in a direction such that the mold cavities first come in contact with the vacuum region 765a, and then the feeder inlet passage 720a wherein the mold cavities 910 are filled with food product. In this embodiment, the vacuum region 765a and the feeder inlet passage 720a are not spaced such that a portion of the mold cavity can be simultaneously in communication with both the vacuum region 765a and the feeder inlet passage 720a. As the mold cavity 910 rotates past the vacuum region 765a, air trapped in the cavity that would otherwise take up space in the mold cavity and prevent the mold cavity from filling evenly, is removed.

In an alternate embodiment, the vacuum region 765a and the feeder inlet passage 720a may be situated such that a portion of the mold cavity 910 is in contact with the vacuum region 765a as the mold is being filled with food product. The vacuum force assists in removing the displaced air.

A vacuum pump can be used to provide the source of vacuum for the vacuum region 765a, or alternatively, low pressure regions in the rotary molding machinery may be used to provide a source of vacuum.

Figure 32:
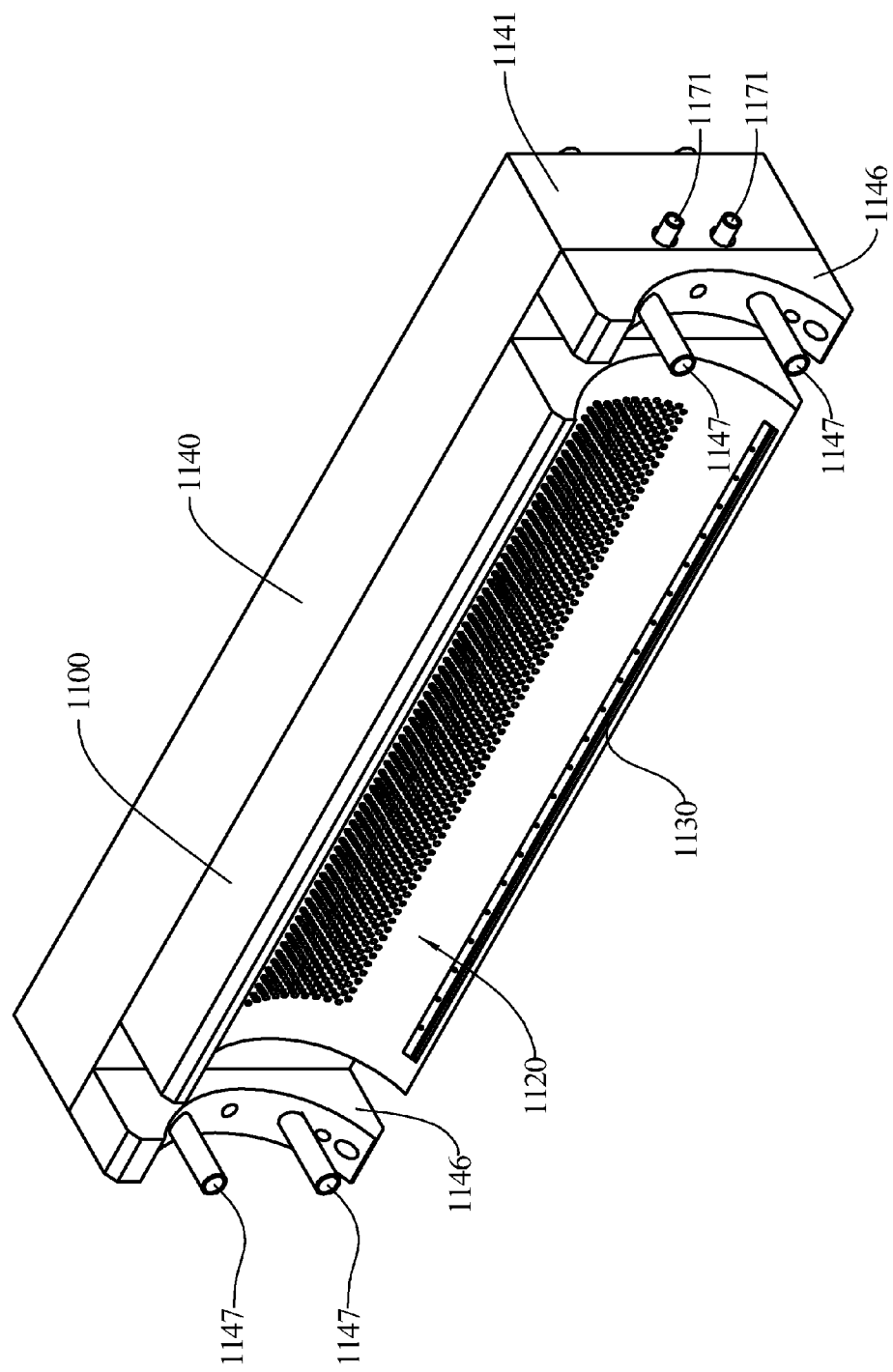
FIG. 32 illustrates a perspective view of an alternative embodiment of a fill plate comprising perforations.

In yet another embodiment, a fill plate 1100 as illustrated in FIG. 32 can be used with the rotary mold. The fill plate 1100 has a perforated region 1120 wherein food product is passed through to provide a different texture to the food product than achieved through using a fill plate 760 with a fill slot. The fill plate 1100 is curved in accordance with the radius of curvature of the rotary mold on one side, and substantially flat on the opposite side such that it may be disposed in contact with the feed plate 1140. Disposed behind the fill plate 1100 is the feed plate 1140 which channels food product toward the fill plate 1100. The fill plate 1100 has a scraper or wiper 1130 to retrieve food products which are on the surface of the rotary mold and not within the mold cavities.

Figure 33:
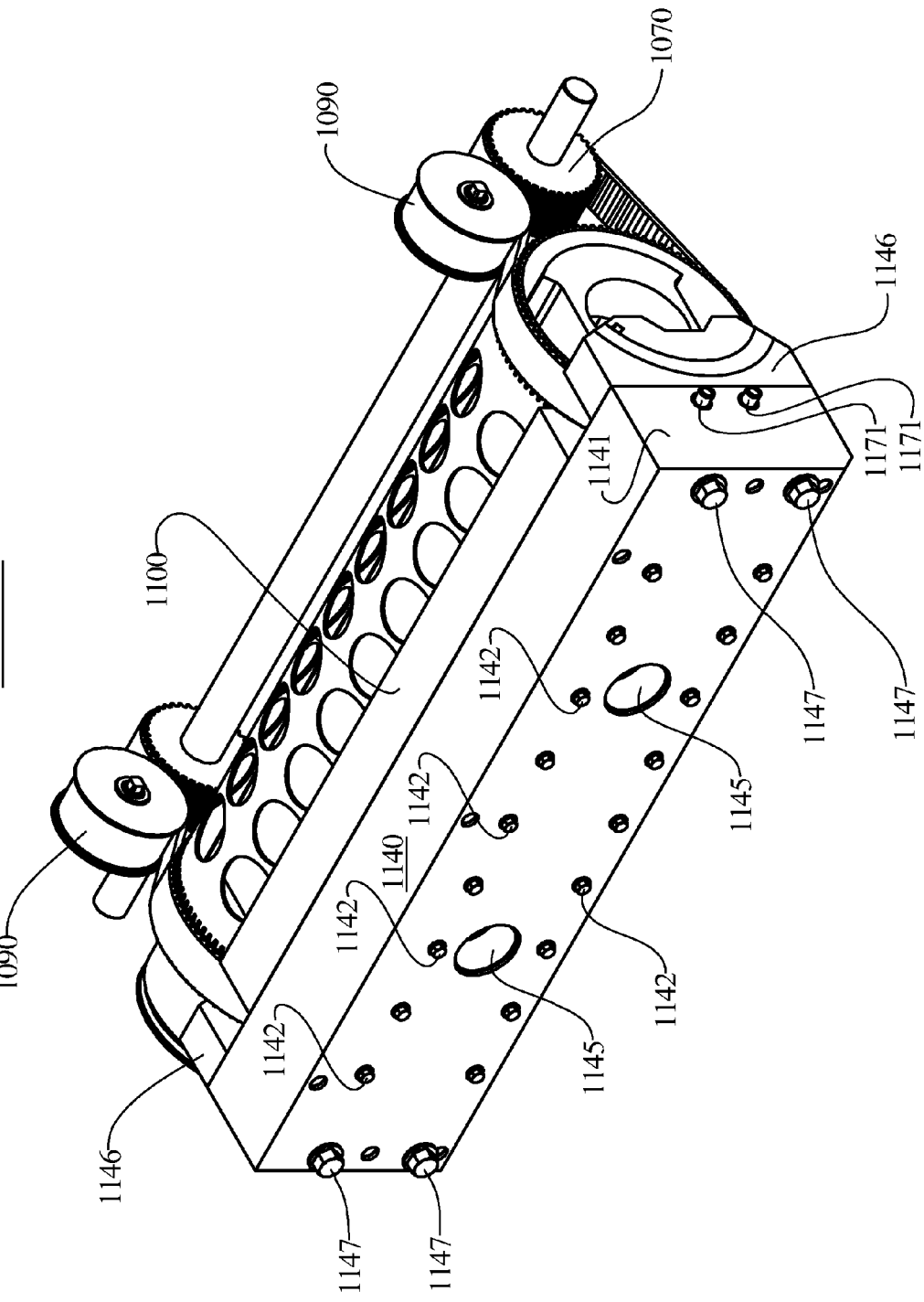
FIG. 33 illustrates an alternate perspective view of the embodiment of FIG. 32.
Figure 34:
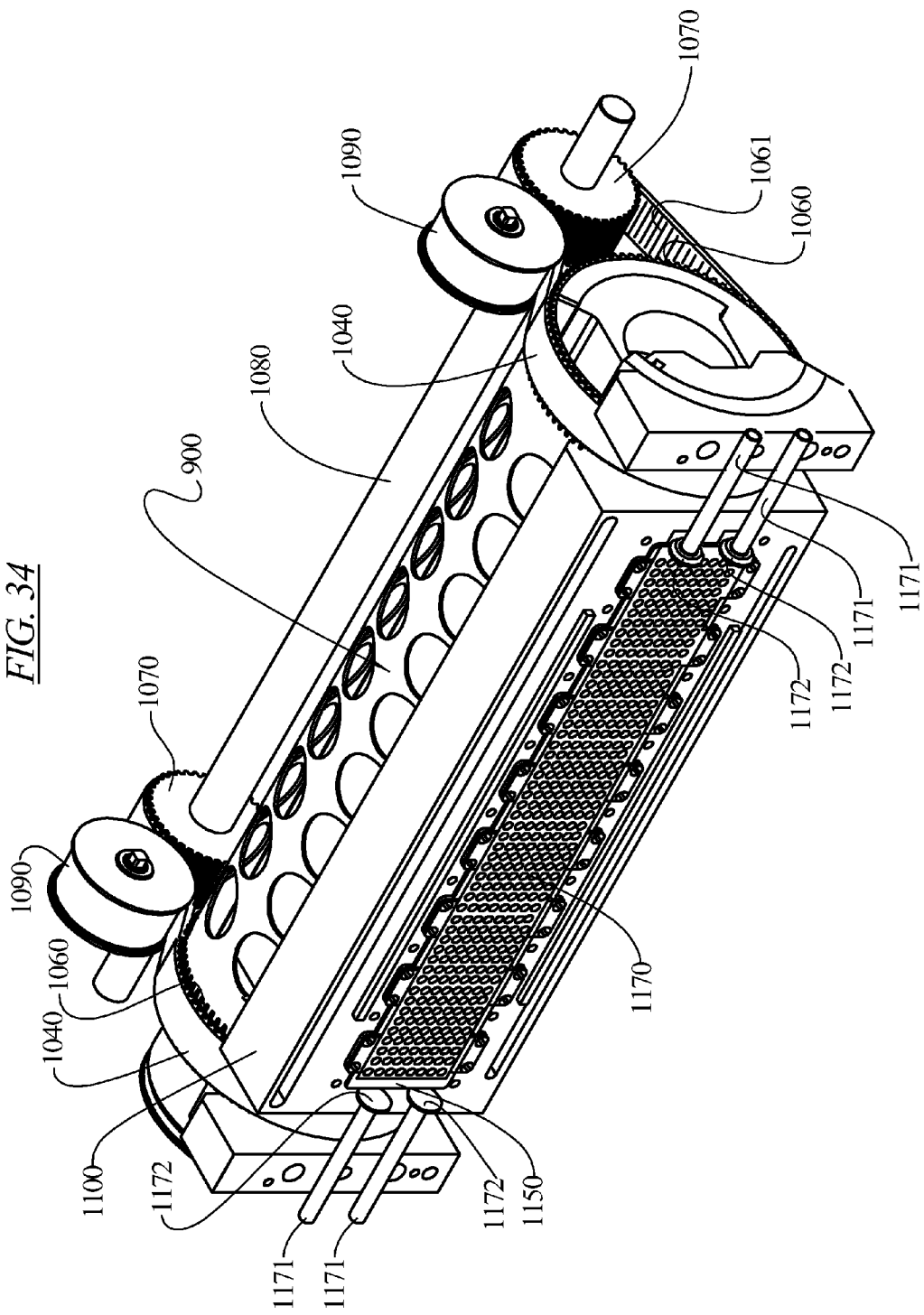
FIG. 34 illustrates the view of FIG. 33 with parts removed for clarity.

FIG. 33 illustrates an alternate perspective view of the feed plate 1140 and fill plate 1100 of FIG. 32. Feeding channel inlets 1145 which allow food product to enter the fill plate 1100 are on the side of the feed plate 1140 opposite from the fill plate. FIG. 34 is a perspective view of FIG. 33, with the feed plate 1140 removed for clarity. A stripper plate 1150 is disposed between the fill plate 1100 and the feed plate 1140 (FIGS. 32 and 33). A stripper plate 1150 is preferably used with a perforated fill plate 1100 as food product or food product fibers are more prone to be caught within the perforations than within a fill slot. The stripper plate 1150 comprises a perforated region 1170. The holes or perforations of the stripper plate 1150 are preferably the same size opening as the perforations in the fill plate 1100. The stripper plate 1150 slides across the side of the perforated region closest to the feed plate to sever any residual food product fibers which may be caught in the perforations after each time the food product is passed through the perforated region. The operation of the stripper plate is discussed in further detail in U.S. application Ser. No. 11/408,248, published as U.S. Patent Application Publication 2007/0098862.

As illustrated in FIG. 34, each side of stripper plate 1150 has two push rods 1171 that abut the stripper plate. The rods 1171 have disk shaped heads 1172 that are in contact with the edge of the stripper plate. The heads allow for an eccentric arrangement of the rods 1171 with regard to the stripper plate 1150. Rods 1171 extend through the side wall 1141 of the feed plate 1140 (FIGS. 33 and 34) and are connected to a drive mechanism, preferably one or more hydraulic cylinders (not shown). This arrangement allows the stripper plate 1150 to slide back and forth across the back of the fill plate 1100.

The feed plate 1140 is fastened to the fill plate 1100 via a plurality of screws 1142 across the top and bottom of the feed plate 1140. The feed plate is also attached to support plates 1146 on either side of the rotary mold via bolts 1147.

Figure 34A:
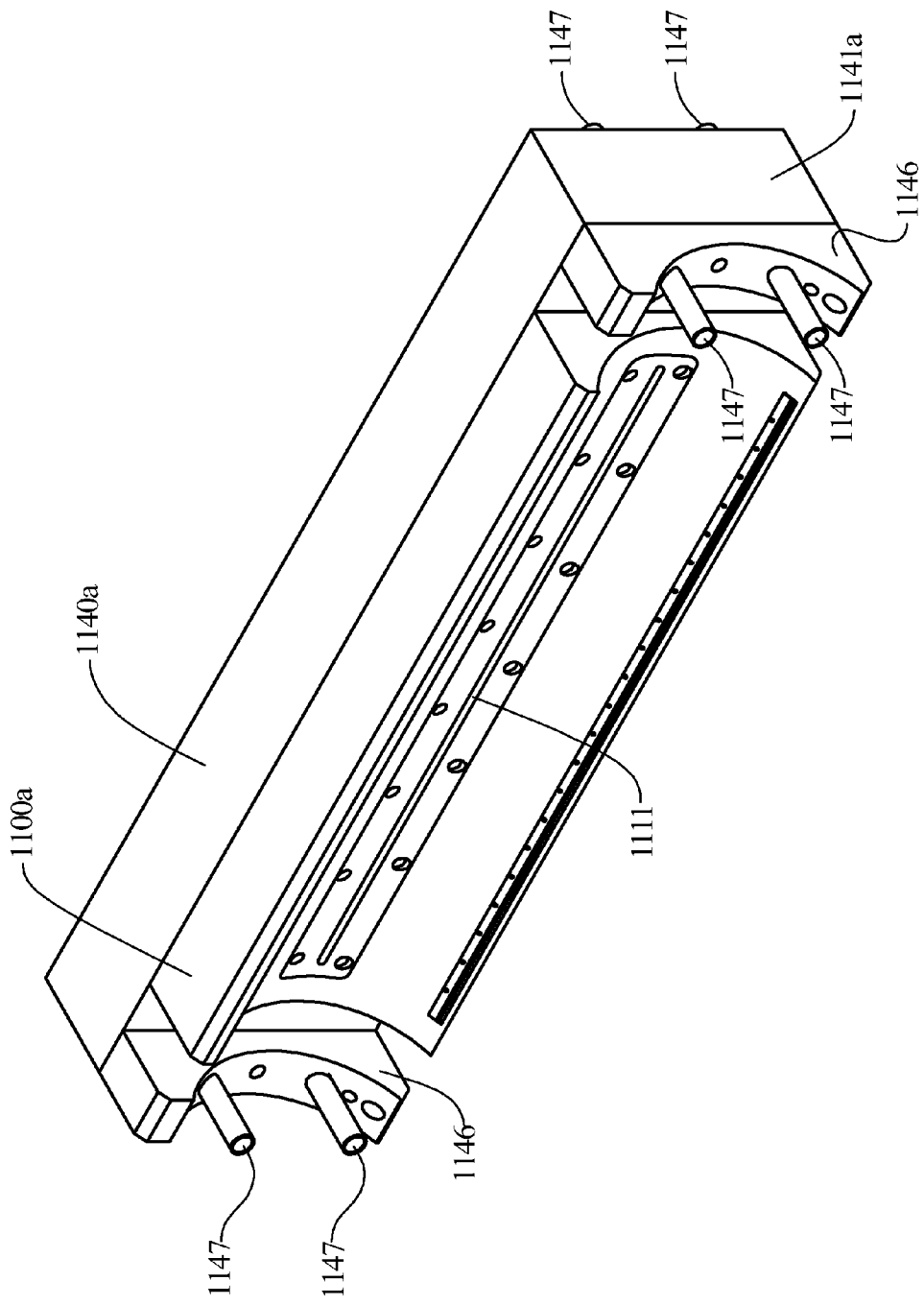
FIG. 34A illustrates a perspective view of a fill plate comprising a fill slot.
Figure 34B:
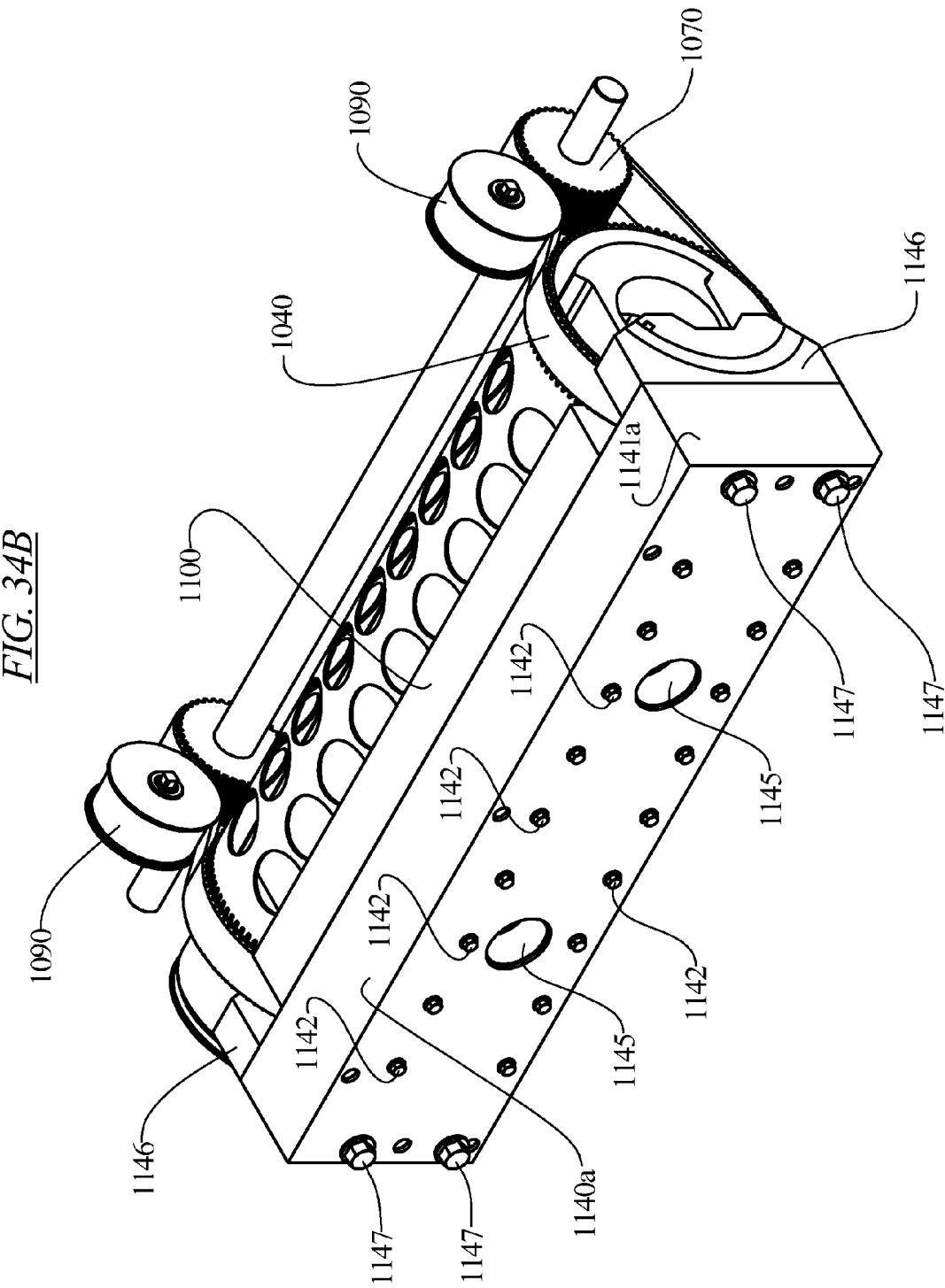
FIG. 34B illustrates an alternate perspective view of the embodiment of FIG. 34A.

A standard fill plate 1100*a* with one fill slot 1111 can also be used with the rotary mold by exchanging the perforated 1120 fill plate 1100 with a standard fill plate 1100*a* and its associated feed plate 1140*a* (FIGS. 34A, 34B). The feed plate 1140*a* is attached to the support plate via bolts 1147, and is attached to the fill plate 1100*a* via a plurality of screws 1142. The use of the standard fill plate 1100*a* with one fill slot 1111 in this embodiment does not use a stripper plate, and thus does not require channels on the side walls 1141*a* for accommodating the stripper plate rods. By having easily interchangeable parts for forming the desired type of food patty, the versatility of the rotary molding system is increased.

Rotary Mold 900

The rotary mold 900 comprises mold cavities 910 (FIGS. 18-21 and 23) disposed around the rotary mold. The rotary mold 900 is a cylindrical shell with the thickness of the shell corresponding to the depth of the mold cavity 910. Mold cavities 910 are rotated from a fill position to an eject position. In the embodiment illustrated in FIGS. 18-20, the mold cavity is filled with food product when it rotates counter clockwise to the 9 o'clock position where the outlet portion 715 of the feeding channel is located, and food product is ejected, with the assistance of gravity, when the mold cavity rotates to the 6 o'clock position.

The number of mold cavities around the circumference of the mold cavity can vary. An eight row rotary mold comprising eight mold cavities spaced around the circumference of the rotary mold in each row is illustrated in FIG. 18 while a six row rotary mold is illustrated in FIG. 20.

The rotary mold 900 can be operated by a motor 1000 as illustrated in FIGS. 24A and 24B. The rotary mold 900 has base members 940 and edges 960 on either end of the rotary mold. The base members 940 have flanges 951 which extend radially, such as show in FIG. 1. The edges 960 of the rotary mold 900 are keyed such that the edges can interlock with the flanges 951 on the base members 940 when the rotary mold 900 and the base members 940 are engaged. The motor 1000 is connected to a motor shaft 1010 which spans the entire length of the rotary mold as illustrated in FIG. 24, and is received on the distal end of the rotary mold 900 by an outboard bearing 952. The motor shaft 1010 is connected to at least one of the base members 940 such that the rotation of the shaft 1010 rotates the base members 940 which in turn rotate the rotary mold 900 as a result of the engagement of the base member flanges 951 and the keyed edges 960 of the rotary mold 900. One skilled in the art would recognize that other embodiments where the shaft 1010 does not span the entire length are possible.

Figure 28:
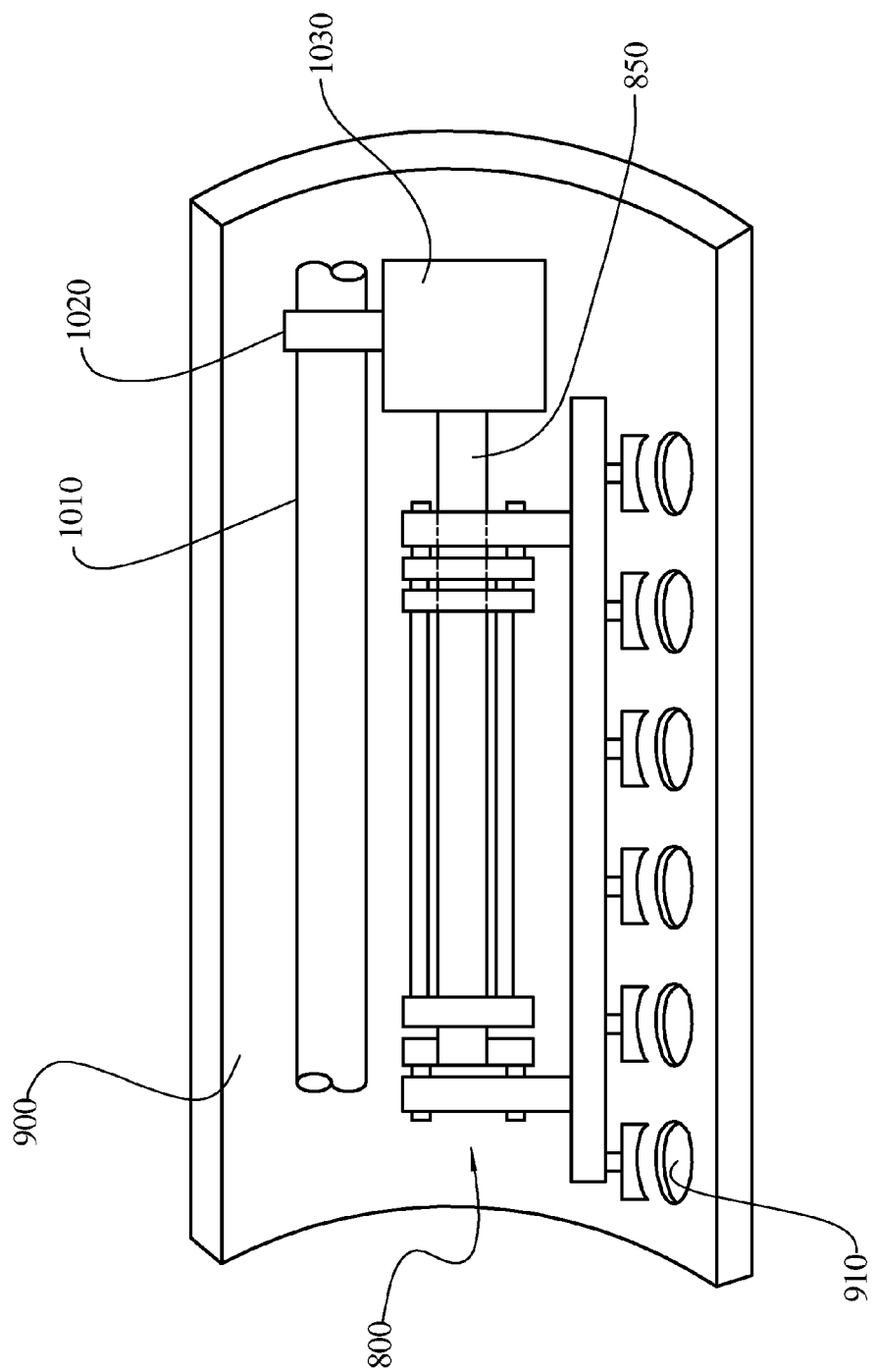
FIG. 28 illustrates the knock out mechanism within the rotary mold when a motor is used to rotate the mold.

When the rotary mold is operated by a motor 1000, the knock out mechanism 800 can be disposed and operated within the rotary mold as schematically illustrated in FIG. 28. The common shaft of the knock out mechanism 850 is disposed off center of the rotary mold 900 as a result of its arrangement with respect to the motor shaft 1010. Because the timing of the knock-out mechanism depends on the position of the mold cavities, and thus the rotation of the mold, appropriate timing for the knock-out mechanism is achieved by coupling the knockout mechanism 800 with the rotation of the motor shaft 1010. Coupling the knockout mechanism 800 with the movement of the motor shaft 1010 is achieved through the use of a plurality of gears. For example, a gear 1020 disposed for rotation with the motor shaft 1010 is coupled to a gear train 1030 which drives the knock out mechanism 800. Alternately, a separate motor can drive the knock out mechanism.

Figure 27:
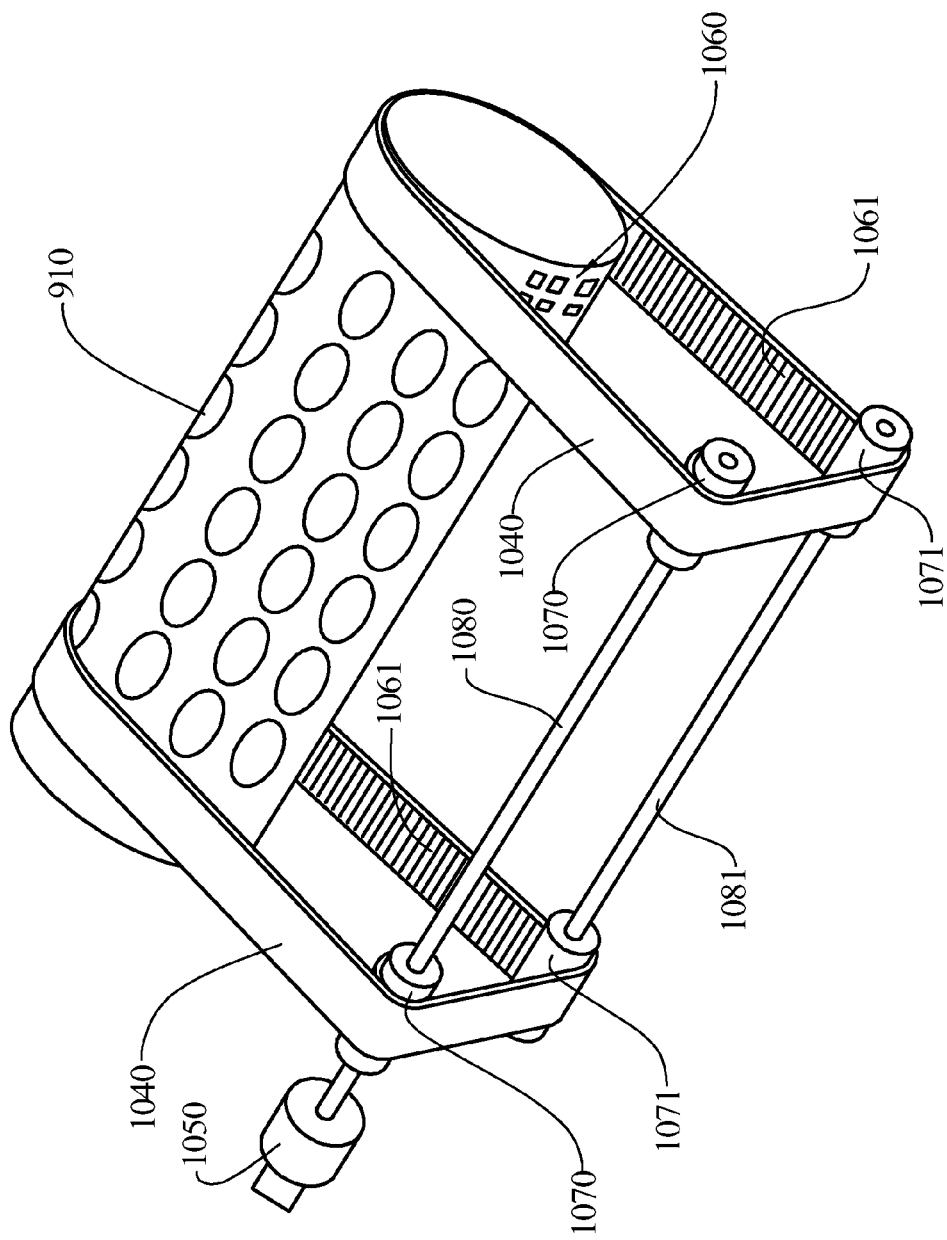
FIG. 27 illustrates another embodiment of the rotary mold being rotated using a belt.
Figure 34C:
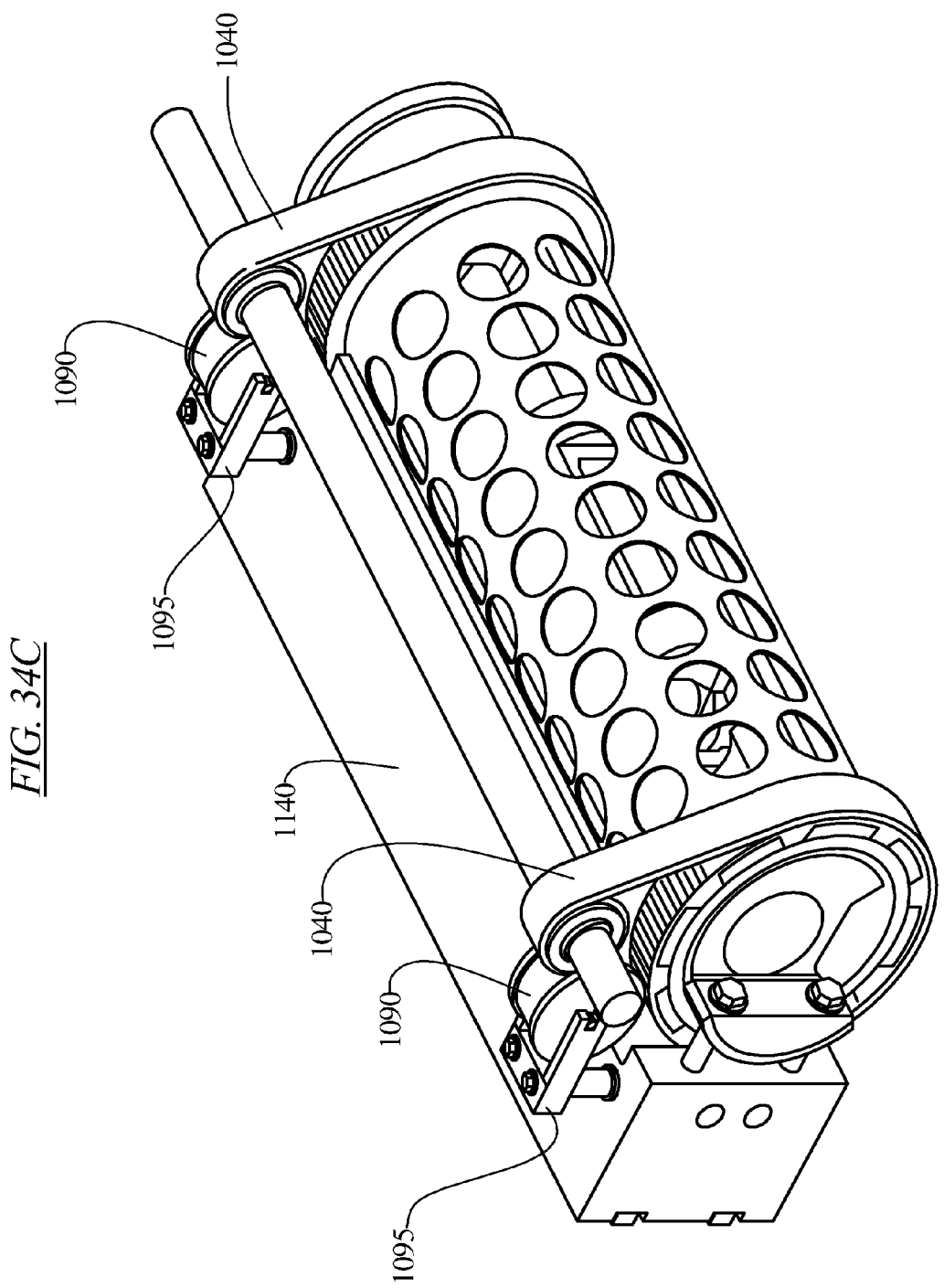
FIG. 34C illustrates an exemplary embodiment of the rotary molding system comprising tensioners.

In are alternative embodiment, the rotary mold is operated by toothed endless belts 1040 as illustrated in FIG. 27. The rotary mold comprises a toothed gear ring 1060 about the circumference of the rotary mold 900 at each end of the rotary mold. The toothed gear ring 1060 engages with a toothed endless belt 1040 which contains a toothed surface 1061 with which the toothed gear ring engages. Each belt 1040 is driven by rollers 1070 which are connected via a common shaft 1080. A motor 1050 drives the rollers 1070. The belts are further supported by idle support rollers 1071 connected via a common shaft 1081. The rollers 1070, 1071 can optionally comprise a toothed ring. In an alternative embodiment, support rollers and their common shaft 1081 can be removed depending on the desired configuration, such that the belt only wraps around one set of rollers 1070. FIGS. 34B and 34C illustrate the toothed endless belt 1040 wrapped around one set of rollers 1070. The endless drive belt 1040 system further comprises tensioners 1090 disposed against the belt 1040. The tensioners are held against the belt to allow the belt 1040 to engage more tightly to the toothed gear ring 1060 and the rollers 1070. In FIG. 34C, the tensioners 1090 are held in place against the belt 1040 to provide the desired degree of tension by supports 1095 mounted to the feed plate 1140.

Figure 34D:
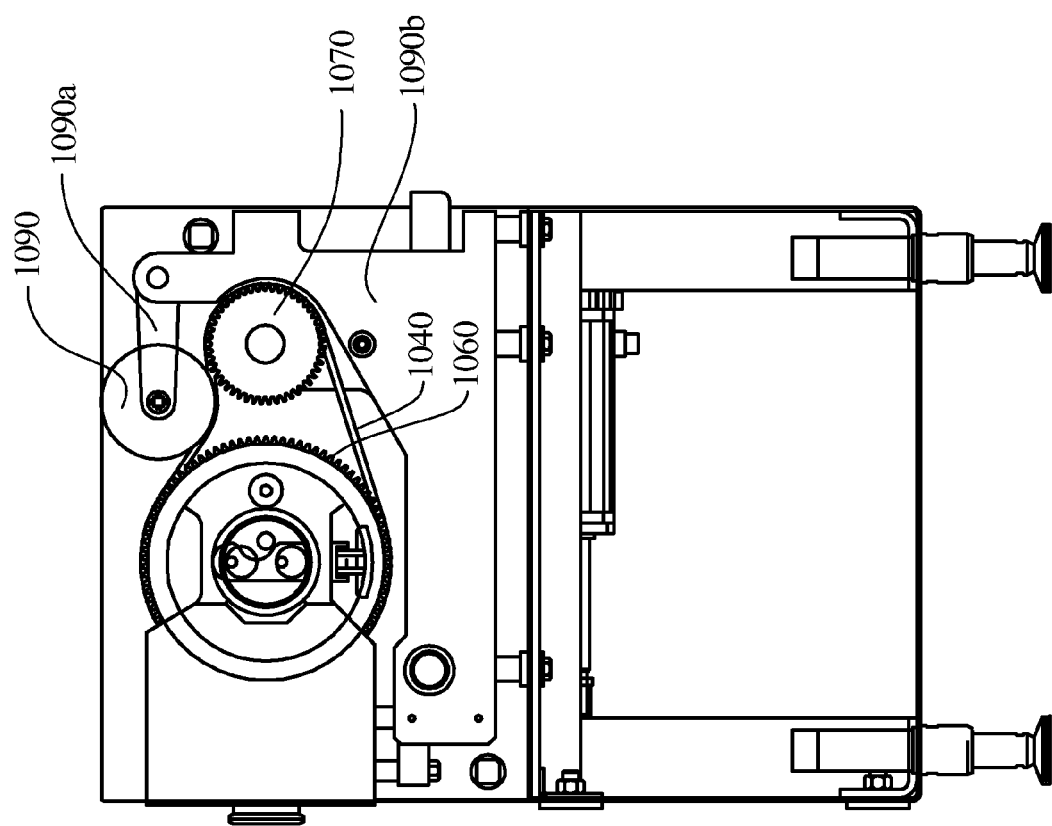
FIG. 34D is an elevation view of an exemplary rotary molding machine showing tensioners held in place by supports, which are supported by a support frame.

Alternatively, the rollers 1070 and the tensioners 1090 can be positioned further away from the feed plate 1140 as illustrated in FIG. 34B. The tensioners 1090 can be held in place by supports 1090*a* which can be mounted to a support frame 1090*b* as illustrated in FIG. 34D, or any other mechanism. The tensioners 1090 can be placed anywhere along the belt 1040 to encourage a tighter engagement of the belt 1040 and its driving components.

The supports 1095 can be one time adjusted and set to exert the desired belt tension or can include springs or pressure actuators to exert a resilient force of the tensioners against the belt 1040.

Wear Plate 770

As illustrated in FIG. 19, the rotary mold system comprises a wear plate 770 with an outer surface 775 disposed in contact with the inner surface 920 of the rotary mold 900. As the rotary mold 900 rotates into the fill position, the rotary mold 900 becomes disposed between the fill plate 760 and the wear plate 770, with the outer surface 775 of the wear plate 770 serving as the bottom surface to the mold cavities 910 as the mold cavity rotates through the region where it is in contact with the fill plate and the wear plate. The wear plate 770 remains stationary as the rotary mold rotates past the wear plate 770.

A D-shaped cross sectional backing plate 780 behind the wear plate 770 provides support for the wear plate as pressure from filling the mold cavities is exerted into the mold cavities during the filling process. The backing plate 780 further allows bolts 790 to be screwed into a flat surface.

The wear plate 770, including the D-shaped backing plate 780, extends continuously for a length "d" as illustrated in FIG. 21. The wear plate 770 is in contact with a portion of the inner surface of the rotary mold defined by an angle "a" (FIG. 19). The wear plate is held in place using bolts 790 which are used to secure the wear plate 770 and the backing plate 780 to the feed plate 703. The bolts 790 are located on either end of the molding apparatus, extending beyond the rotary mold 990 so the bolts do not interfere with the rotation of the mold.

The bolts 790, in securing the wear plate 770 to the feed plate 703, also secures a spacer 771 with a thickness slightly greater than the thickness of the rotary mold to allow clearance for the rotation of the mold, and a spacer 772 for the fill plate if the fill plate does not extend to a length so it can be held by bolts 790, such as, for example, when the fill plate is a length "L" corresponding to the length the row of mold cavities span.

A mechanism for holding spacer components 771 and 772 in place during cleaning or maintenance of the rotary mold is used to prevent the spacers from disassembling when the bolts are removed. Fastening mechanisms such as screws can be used to join the spacer components together to prevent disassembly. Alternatively, a cradling mechanism can be used to ensure that the spacer components stay in position.

The rotary mold can be pivoted away from the feed plate 703 as illustrated in FIGS. 23, 24A, and 24B for cleaning, maintenance, or repairs. A pivoting mechanism 1110 or 1100 provides a hinge about which the rotary drum can pivot.

In an alternate embodiment, instead of using a wear plate 770 to provide support for the rotary molding apparatus, a mandrel structure 776 as illustrated in FIG. 19A can be used to provide structural support to the rotary molding apparatus. The mandrel structure 776 extends for the length of the rotary mold, and comprises two winged regions 776*a*, 776*b* which come in contact with the inner surface 920 of the rotary mold to provide support to the rotary mold as it rotates. The mandrel structure 776 can be cantilevered from one end of the rotary mold. Alternatively, the mandrel structure 776 can extend beyond the rotary mold to be supported on either end by a support structure (not shown) as known to one skilled in the art.

Knock-Out Mechanism 800

FIGS. 18 to 21 illustrate the knock out mechanism 800, which is disposed in the inner region 940 of the rotary mold 900 (FIG. 20). The knock-out mechanism, illustrated in FIG. 20, comprises stabilizing plates 810, movement plates 820, driving gears 830, and driven gears 840.

Two stabilizing plates 810 are rigidly attached to the wear plate 770, as illustrated in FIG. 20. A driving gear 830 is associated leach stabilizing plate 810, the driving gears 830 being rotationally mounted to the stabilizing plates by a rotating, common shaft 850 being journalled through the plate. The shaft 850 is attached to a motor 851 (FIGS. 20 and 21). A set of two driven gears, a top driven gear 840*a* and a bottom driven gear 840*b*, are disposed in association with each driving gear 830, such that a clockwise rotation of the driving gear 830 in direction "A" results in a simultaneous rotation of driven gears 840 in counterclockwise direction "B" as illustrated in FIG. 20. Each driven gear 840*a*, 840*b* is attached to a corresponding spaced apart driven gear 840*a*, 840*b* on the other stabilizing plate 810 by a rotating common gear shaft 860*a*, 860*b* across and through the stabilizing plate 810. The rotating, common gear shafts 860*a*, 860*b*, hold the driven gear pairs 840*a*, 840*a*; 840*b*, 840*b* in position, and stabilize the rotation of the driven gears 840*a*, 840*a*; 840*b*, 840*b*.

Each movement plate 820 is connected to a driven gear pair 840*a*, 840*a*; 840*b*, 840*b* by a pair of eccentrically mounted pins 871*a*, 871*b*. The eccentrically mounted pins 871*a*, 871*b* connect the movement plates 820 to the driven gears at a position that is off-center of the axis of the driven gears 840*a*, 840*a*; 840*b*, 840*b*, such that the location of the off-center connection allows for control over the range of movement imparted to the movement plate. The range of movement imparted to the movement plate corresponds to the desired range of movement required by knock-out cups to eject molded food products from the mold cavities while the rotary mold is in continuous rotational movement.

The movement plates 820 are attached to a movement bar 880. The movement bar 880 is a horizontal bar oriented parallel to the longitudinal axis of the rotary mold which allows the movement of the movement plates 820 to be transferred to knock out cups 885 attached to the movement bar 880. The movement bar is connected to knock out cups, corresponding in number to the number of cavities along a longitudinal row of the rotary mold. The movement bar 880 transfers the movement of the movement plate 820 to the knock out cups 885, allowing each knock out cup to travel in a trajectory that can knock out food product from a rotating mold cavity.

Figure 25:
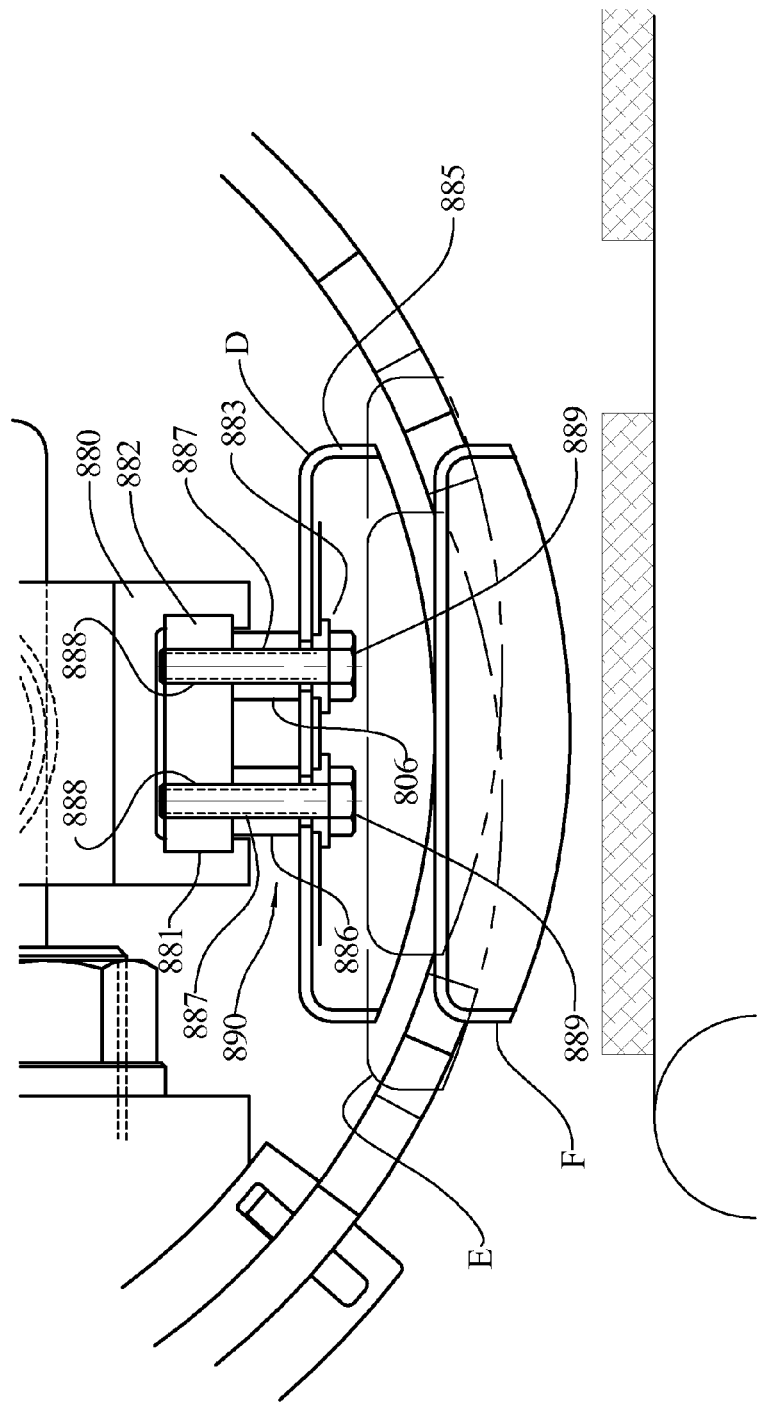
FIG. 25 illustrate the attachment of the knock out cups to the movement bar.

The movement bar 880 is connected to the knock out cups 885 via an inner movement bar 882 which is nested within the length of the movement bar 880 (FIG. 25). The movement bar 880 comprises a grooved recess 881, which is complementarily shaped to receive the inner movement bar 882. The inner movement bar 882 is connected to each of the knock out cups 885 via a connecting mechanism 890 as illustrated in FIGS. 21 and 25.

The connecting mechanism 890 illustrated in FIG. 25 comprises two screws 889 which are used to connect the knock out cups 885 to the inner movement bar 882. The knock out cup comprises two shafts 886 extending from the top surface of the knock out cups, each shaft comprising a bore 887. The bores 887 in the knock out cup shafts 886 are in alignment with bores 888 in the inner movement bar 882 such that bolts 889 can be inserted through the bores 887,888 to fasten the knock-out cups 885 to the inner movement bar 882 by a threaded mechanism, for example.

Figure 22:
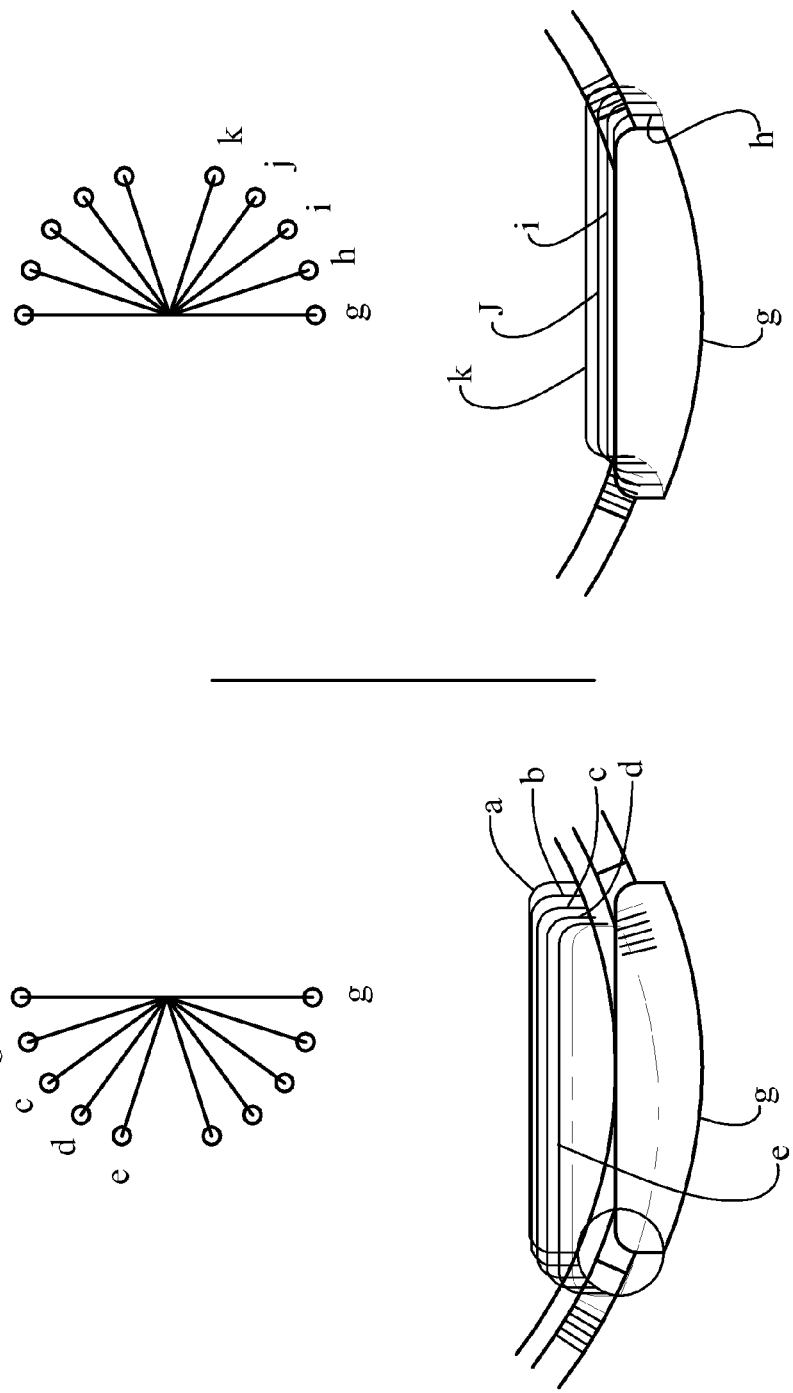
FIG. 22 illustrates the trajectory of the knock out cups.

The movement plate 820 transfers its movement to the knock out cups 885 to provide a downward range of motion starting from resting position D, as illustrated in FIG. 25, to an intermediate position E, to a knock-out position F. FIG. 22 illustrates the position of the knock-out cups 885 as a function of the position of the non-rotating shaft 871 relative to the center of the driven gear 840. FIG. 20 illustrates the gears and the knockout cups in their resting, elevated position. The trajectory of the knock out cups as dictated by the off-center connection of the movement plate to the driven gears permits the knock out cups to move in a manner which allows for knocking out molded food products in a continuously rotating rotary mold. The position of the knock out cups corresponding to the different rotational positions a, b, c, d, e, g, h, i, j, k of the driven gears are illustrated in FIG. 22. The knock-out mechanism is able to operate with mold cavities of various shapes, including asymmetrical or irregularly shaped cavities.

Heating System

When a knock out cup continuously ejects food patties, such as red meat food patties, fat accumulation may hamper the efficiency of the knock out process. To prevent fat accumulation on the edge of the knock out cups, heating system can be used in conjunction with the knock out mechanism. In one embodiment, the heat source is provided by channeling heated air into the region around the knock out cups to form a heated air curtain around the knock out cups. The use of hot pressurized air allows for efficient control of the temperature of the knock out cups, and minimizes the wait time for the region around the knock out cups to reach a desired temperature or for the temperature to decrease once the heating of the knock out cups is no longer desired. Efficient control of the temperature is achieved because the air can be turned on and off at the source.

Figure 53:
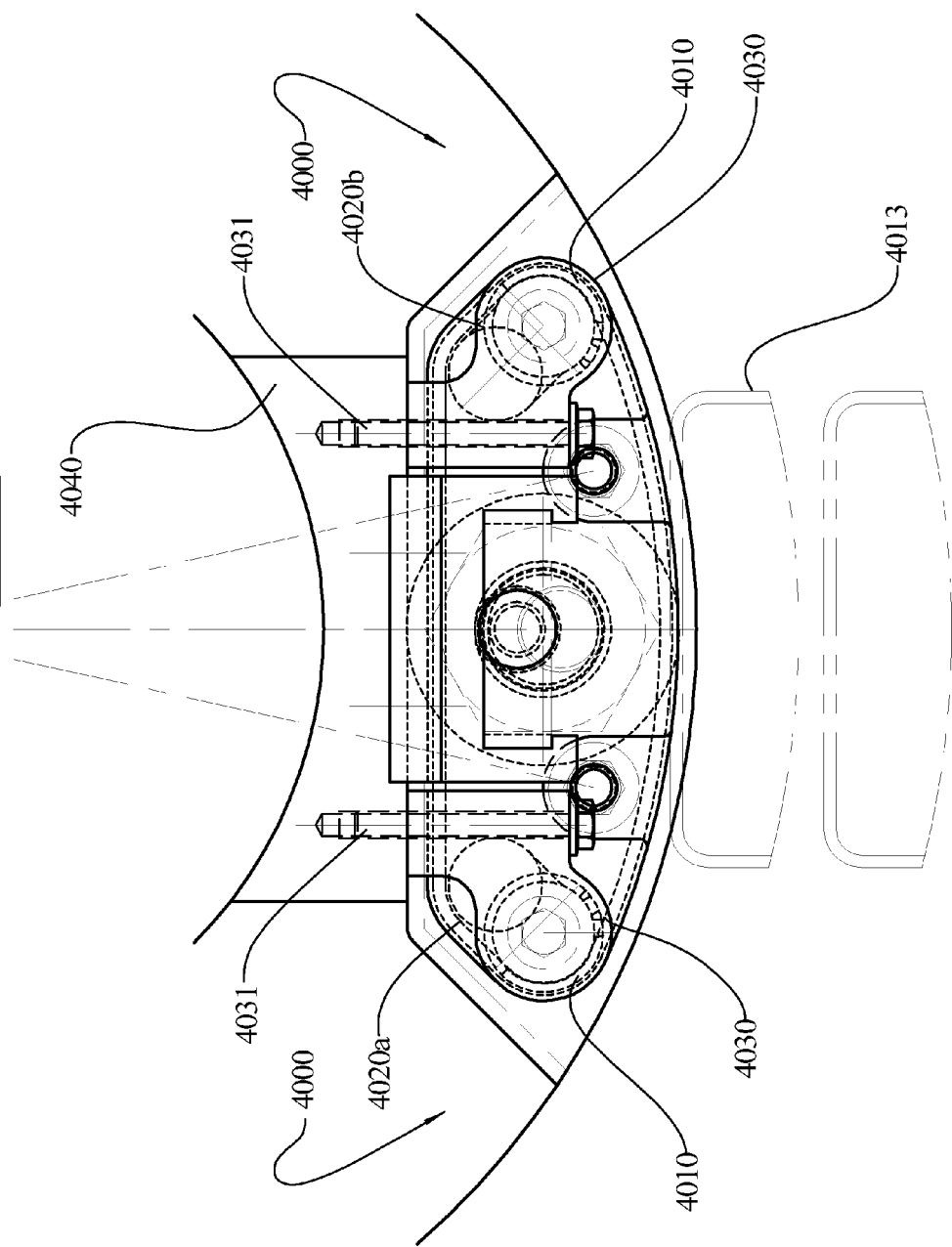
FIG. 53 is a cross sectional view of the front side of the heating system.
Figure 53A:
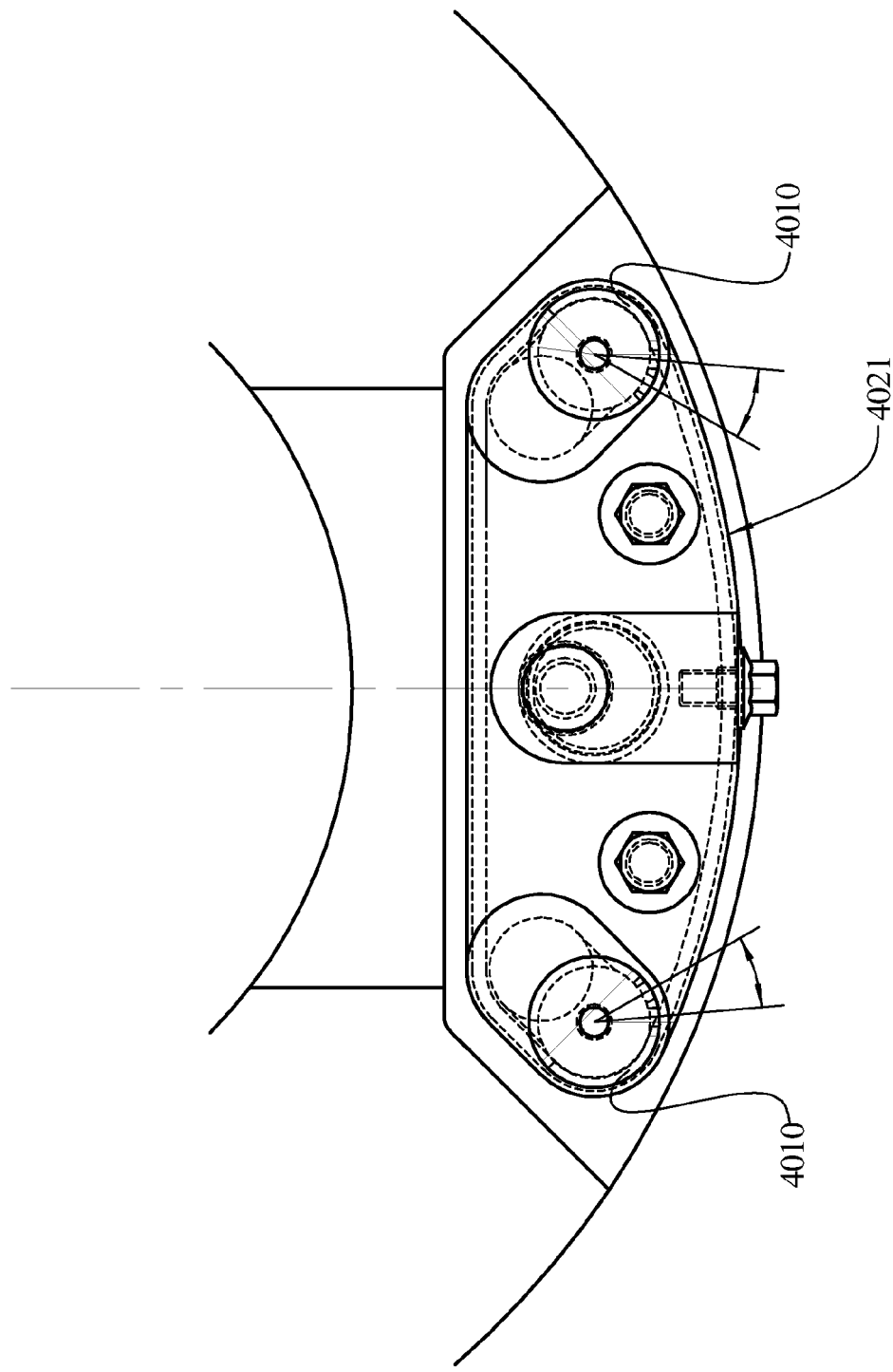
FIG. 53a is a cross sectional view of the back side of the heating system as seen from the external manifold.

In one embodiment, as illustrated in FIG. 53, a heating system comprising a source 4000 is disposed on either side of the knock out cup.

Figure 55:
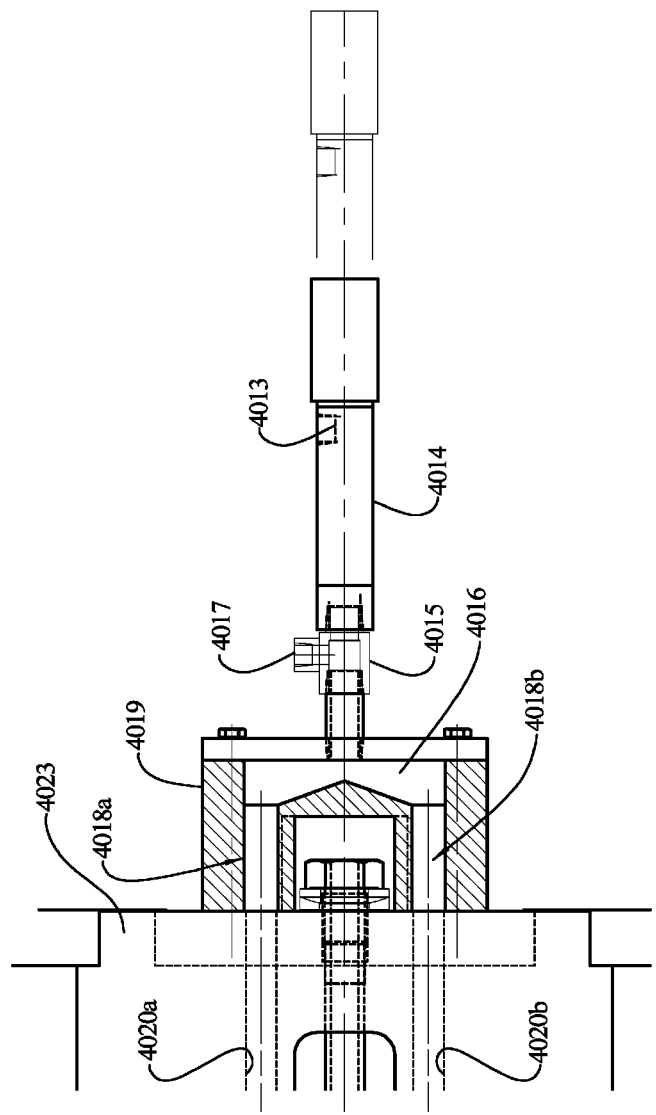
FIG. 55 is a top view of one exemplary embodiment of the heating region of the heating system.

In the embodiment illustrated in FIG. 55, air or gas is introduced into an inlet 4013 of an air heater 4014 which heats the air to a desired temperature when the air passes through the air heater 4014. The air heater 4014 can be one similar to the super high watt density cartridge heaters sold by Hotwatt, Inc., Danvers, Mass., or any other suitable heater known to one skilled in the art. Once heated, the air flows from the air heater 4014 into an outlet 4015 which channels the air into an air duct 4016. As the air exits from the air heater 4014 into the outlet 4015, the air flows through a temperature probe port 4017 wherein temperature of the exiting air can be monitored. The air duct 4016 splits the air flow into two branches, 4018a, 4018b. Each air duct feeds the air past an internal air manifold 4019 in communication with air ports 4020a, 4020b drilled through portions of the support frame of the rotary mold. The air in each branch then converges at an external air manifold 4021 (FIG. 56). At the external air manifold 4021, the heated air is branched to flow to an air tube 4010 disposed on either side of the knock out cups 4013. In other embodiments, a plurality of air tubes can be used on either side of the knock out cups.

As illustrated in FIG. 56, the perforated tube may be an air tube with holes 4012, slots 4011, or any other opening, which allows hot air passing through the tube 4010 to exit at and around the knock out cups 4013 (shown in dashed lines). Tubes can be any shape suitable for providing the desired flow of heated air surrounding the knock out cups. The air tubes 4010 are supported on one end by a support block 4030 connected to a support frame 4040 of the rotary mold. The support blocks 4030 are connected to the support frame 4040 using bolts 4031. On the opposite end of the support blocks 4030, the air tubes 4010 are fitted within a receiving member 4022 connected to the external air manifold 4021. The receiving member 4022 positions the air tube 4010 in communication with the external air manifold.

As illustrated in FIG. 53, the air tubes 4010 are arranged above knock out cups and provide heated air flow in a downwards direction towards the knock out cups. Aft flow exiting the air tube can span an angle of 25 degrees around the perimeter of the air tube. The air tube is disposed such that hot air flow reaches the corners and/or edges of the knock out cups.

Air can be introduced into the heating system through an external source such as a supply of air from an air tank, or a compressor. Alternatively air can be introduced from a supply of air generated by, or the same supply of air used for other parts of the apparatus. The heating system can be used with any molding system that includes knock out cups.

Verification System

Figure 54:
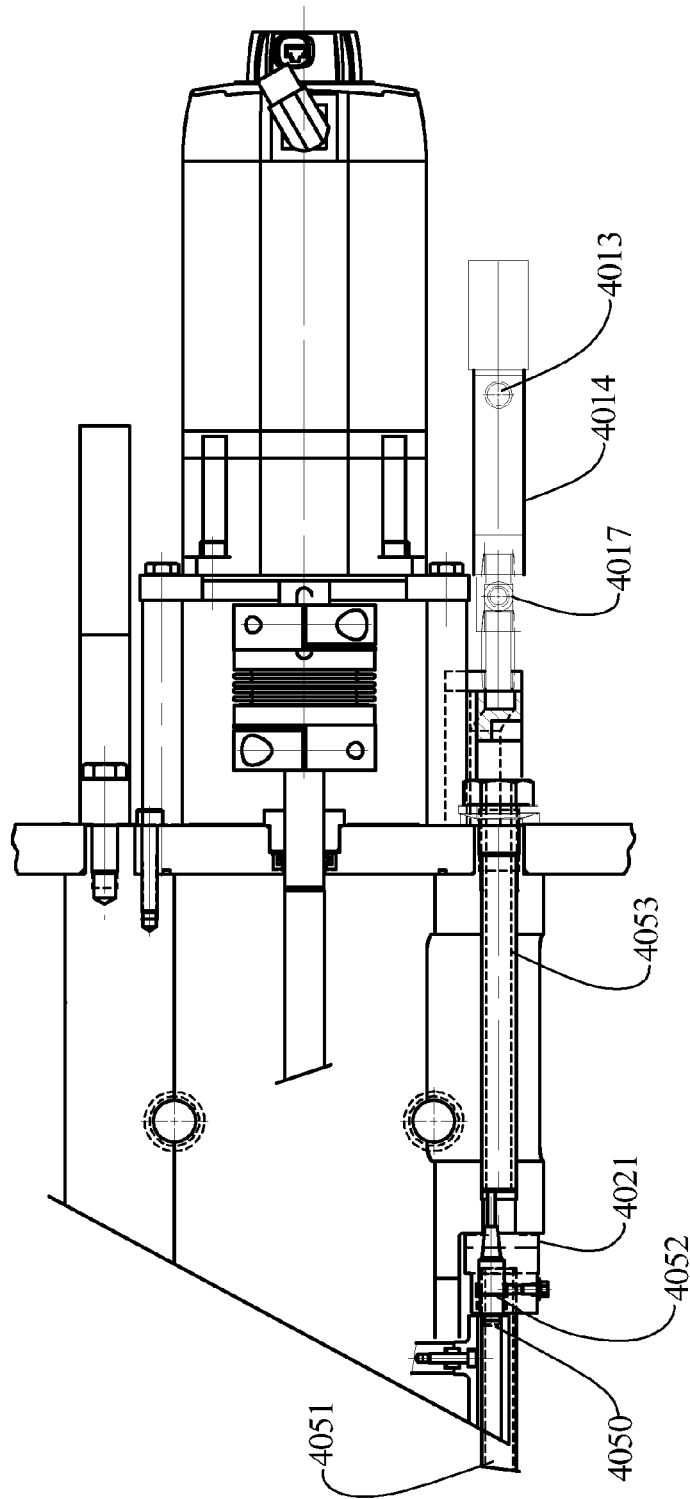
FIG. 54 is a side view of the RFID sensor system for the knock out cup bar.

In one embodiment, the food patty molding apparatus comprises a verification system for ensuring that the rotary mold is used with a corresponding set of knock out bars. In one embodiment, an RFID chip is disposed on the knock out cup bar 4051 as illustrated in FIG. 54. An RFID sensor for the knock out cup bar RFID chip is disposed in proximity to the end of the knock out cup bar containing the RFID chip. The sensor cable (not shown) can be routed though the support frame of the rotary mold via a sensor cable passage tube 4053. A second RFID chip (not shown) can be disposed on the rotary mold cylinder, such as on the surface of the rotary mold cylinder, or any other suitable location. A RFID sensor for the rotary mold is placed accordingly in a position to allow reading of the RFID sensor on the rotary mold.

The sensors communicate information on the knock out bar installed and on the rotary mold cylinder installed to a central processing unit, such as to the central machine control. If the central processing unit determines that the two components are compatible, the user will be able to proceed with operation of the rotary mold. If the central processing unit determines that the two components are not compatible, the user is notified. Once a compatible knock out bar and rotary mold cylinder pair is installed, the user is allowed to begin operation of the molding system. Any other type of smart tagging system, or a system for ensuring compatibility of the rotary mold cylinder and the knock out cups prior to operation can also be used. The use of an RFID verification system prevents accidental user mismatch of knock out cups with the rotary mold shell, or with a reciprocating mold plate. Information such as the shape and dimension of the knock out cups, as well as which rotary mold or mold plate the knock out cups are compatible with, can be stored on the RFID chip. Similarly, an RFID chip on the mold shell or mold plate will contain information on the dimensions of the mold cavity and the mold shell or mold plate's compatibility with knock out cups.

Alternate Knock-Out Mechanisms

Figure 35:
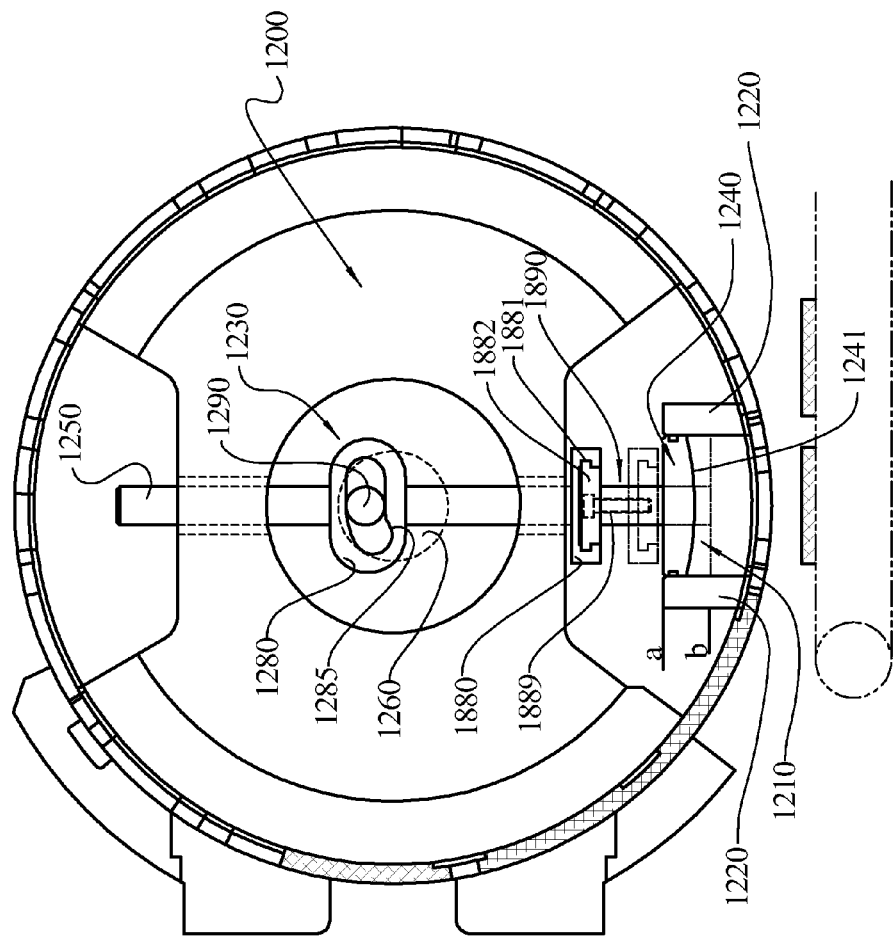
FIG. 35 illustrates an alternate embodiment of a mechanism for removing molded food product from the rotary mold.

In another embodiment, as illustrated in FIG. 35, the knock-out mechanism 1200 comprises a coupling 1230, a piston 1240, and an air pressure region 1210. The piston is disposed within an air pressure region 1210 to generate air pressure within the air pressure region. A rapid downward force as the piston moves from its retracted position "a" to its extended position "b" creates a pressure wave or "burst" of pressure within the air pressure region 1210 which is used to expel the molded food product from its mold cavity.

Figure 35A:
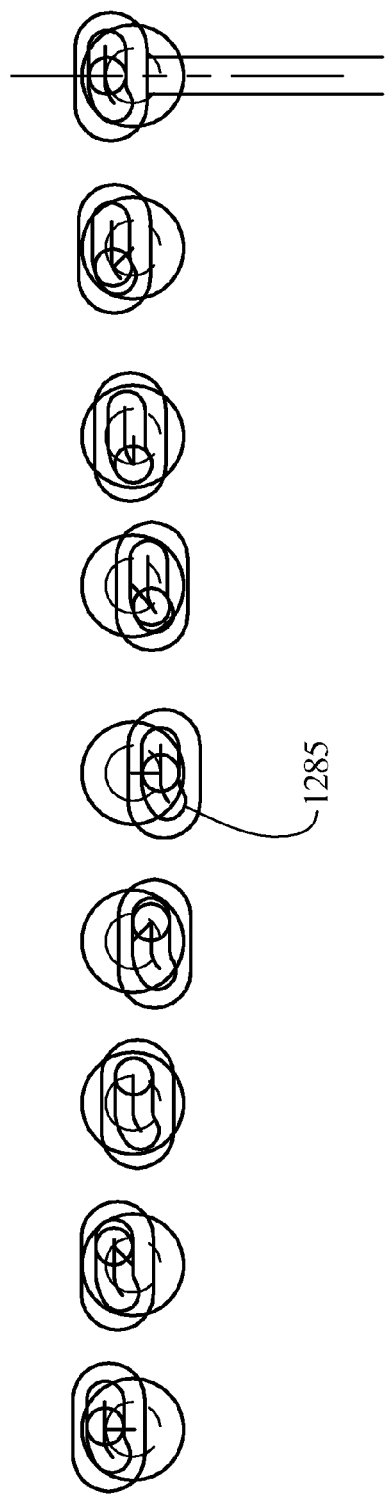
FIG. 35A illustrates the translation of rotational motion into linear motion for actuating a piston rod.
Figure 35B:
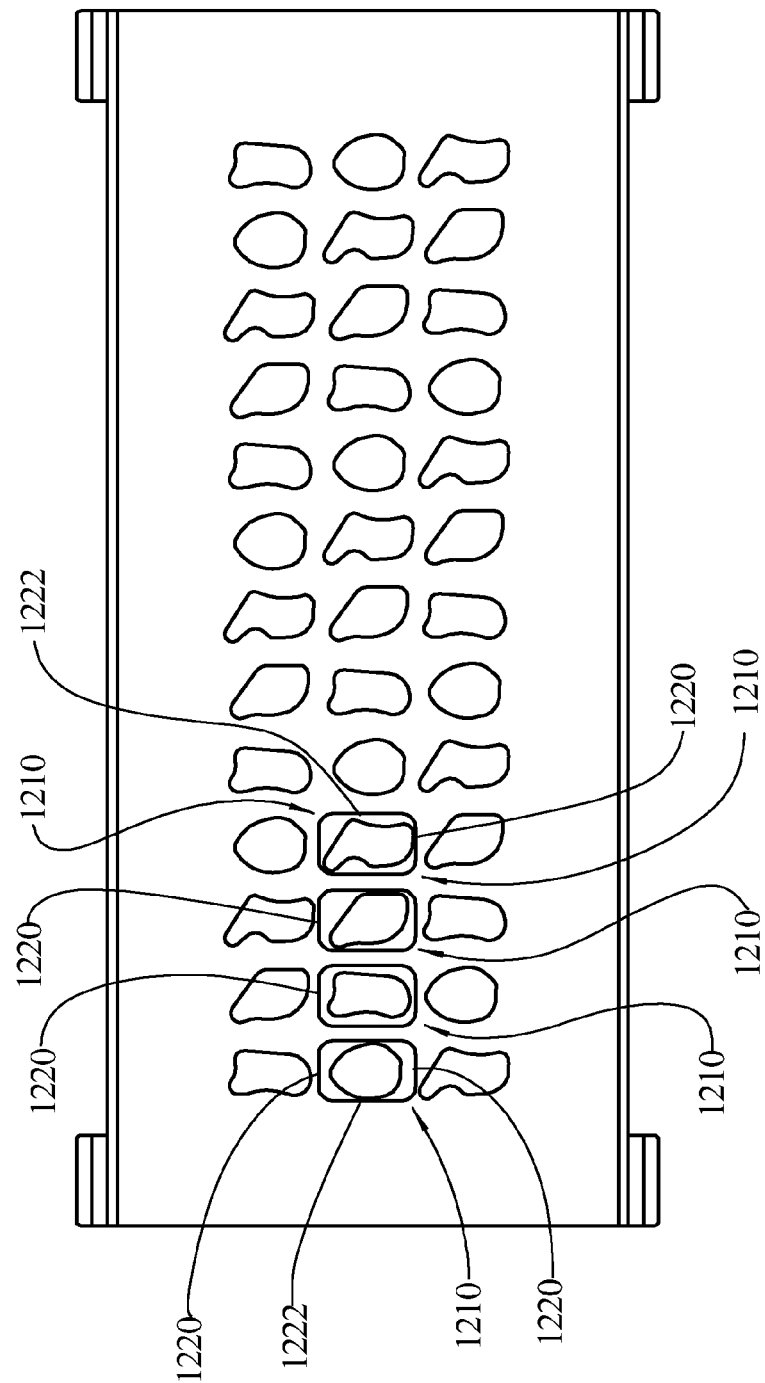
FIG. 35B illustrates mold cavities of various shapes disposed within the air pressure region.

The air pressure region 1210 as illustrated in FIGS. 35 and 35B is a rectangular cylindrical shaft defined by walls 1220 and 1222 which provide a rectangular perimeter as illustrated in FIG. 35B. The piston 1240 is shaped accordingly to fit within the air pressure region 1210 and to allow the piston 1240 to move up and down within the air pressure region. The bottom surface 1241 of the piston 1240 is curved in accordance with the radius of curvature of the rotary mold, so that the piston 1240 can extend up to the rotary mold surface. In other embodiments, the bottom surface 1241 of the piston need not be curved, or extend up until the bottom surface is adjacent to the rotary mold surface. Shafts of other shapes, such as a cylindrical or elliptical shaft, may be used to form the air pressure region.

As illustrated in FIG. 35B, the mold cavities are of different shapes. However, because all the mold cavities are within the perimeter of the air pressure region 1210 as defined by walls 1220 and 1222, molded food products of varying shapes can be ejected simultaneously by the buildup of pressure in the air pressure region which is exerted onto the molded food products.

The number of pistons 1240 and their associated air pressure regions 1210 correspond to the number of mold cavities in a row. FIG. 35B illustrates thirteen mold cavities in a row along the length of the rotary mold. Accordingly, thirteen pistons and their associated air pressure regions are required to simultaneously knock out the molded food products. In an alternate embodiment, one air pressure region can span more than one mold cavity.

To ensure that all the molded food products are knocked out simultaneously, the pistons 1240 are moved in unison within the air pressure region. In one embodiment, as illustrated in FIGS. 35 and 35D, the pistons 1240 are connected to a movement bar 1880. Pistons are connected to the movement bar via an inner movement bar 1882 which is nested within the length of the movement bar 1880. The movement bar 1880 comprises a grooved recess 1881, which is complimentarily shaped to receive the inner movement bar 1882. The pistons 1240 are connected to the inner movement bar 1882 via a bolt 1889 which passes through the inner movement bar to secure itself within a threaded bore in the piston stem 1890.

A coupling mechanism 1230 moves the piston rods 1250 in an upwards and downwards direction which is transferred to the movement bar 1880, and accordingly to the pistons 1240. In the embodiment shown in FIG. 35D, two coupling mechanisms 1230 are used for each of the piston rods 1250. The coupling mechanism 1230 comprises a disk 1260, a slider link 1280, a pin 1290, and a common shaft 1270.

Disks 1260 are connected to the common shaft which causes the disk 1260 to rotate as the shaft rotates. The pin 1290 is eccentrically mounted onto the disk 1260. The pathway of the pin 1290 as the disk 1260 rotates is illustrated in dashed lines in FIG. 35A. The disks 1260 may be gears. In an alternate embodiment, disk 1260 on which the pin 1290 is eccentrically mounted may be driven by other gears, and not directly driven by the rotating common shaft.

Pin 1290 engages with the slider link 1280 to convert the rotational movement of the pin 1290 into a linear movement which allows the piston rod 1250 to move up and down. The slider link 1280 comprises a kinked region 1285. The position of the slinder link 1280 as the pin 1290 rotates and translates motion via the slider link 1280 is illustrated in FIG. 35A. Preferably, the movement of the piston yields a rapid downward force to create a burst of pressure, and a more gradual upward force to create a gradual suction. The kinked region 1285 allows the upward motion to occur more gradually than the downward motion.

The common shaft 1270 is driven by a drive mechanism 1300 illustrated schematically in FIG. 35D. The drive mechanism 1300 may be a gear train driven by the mechanism used to rotate the rotary mold, or the drive mechanism 1300 may be a motor. Other suitable drive mechanisms 1300 may be used.

FIG. 35D illustrates the row of pistons 1240 which are disposed over the mold cavities when the mold cavities are in their eject position. Air pressure regions 1210 are not shown for the remaining pistons for clarity. As illustrated, mold cavities of varying shapes can be used within the same rotary mold because the air pressure region 1210 is not shape specific so long as the mold cavity fits within the rectangular area defined by the air pressure region 1210. The air pressure region 1210 is defined by side walls 1220 and 1222 which have a sealing mechanism where the side walls 1220 and 1222 contact the rotary mold. Each air pressure region can be held in place by being connected to a common horizontal member 1215 which is connected to a member (not shown) that exerts a downward force sufficient to maintain a seal against the rotating mold, while still allowing the mold to rotate. The horizontal member 1215 may connect the air pressure region 1210 along the side walls 1220 as shown, or in between each air pressure region 1210 via connecting side walls 1222. In another embodiment, the air pressure regions 1210 are held in position against the inner surface of the rotary mold by being connected to a mandrel 776 (FIG. 19A). The connection from the mandrel to air pressure regions 1210 creates sufficient force to form a seal between the air pressure region and the inner surface of the rotating mold to minimize any air loss. Other methods of securely positioning the air pressure regions 1210 against the rotating drum and over each individual mold cavity known to one skilled in the art can also be used.

Figure 35C:
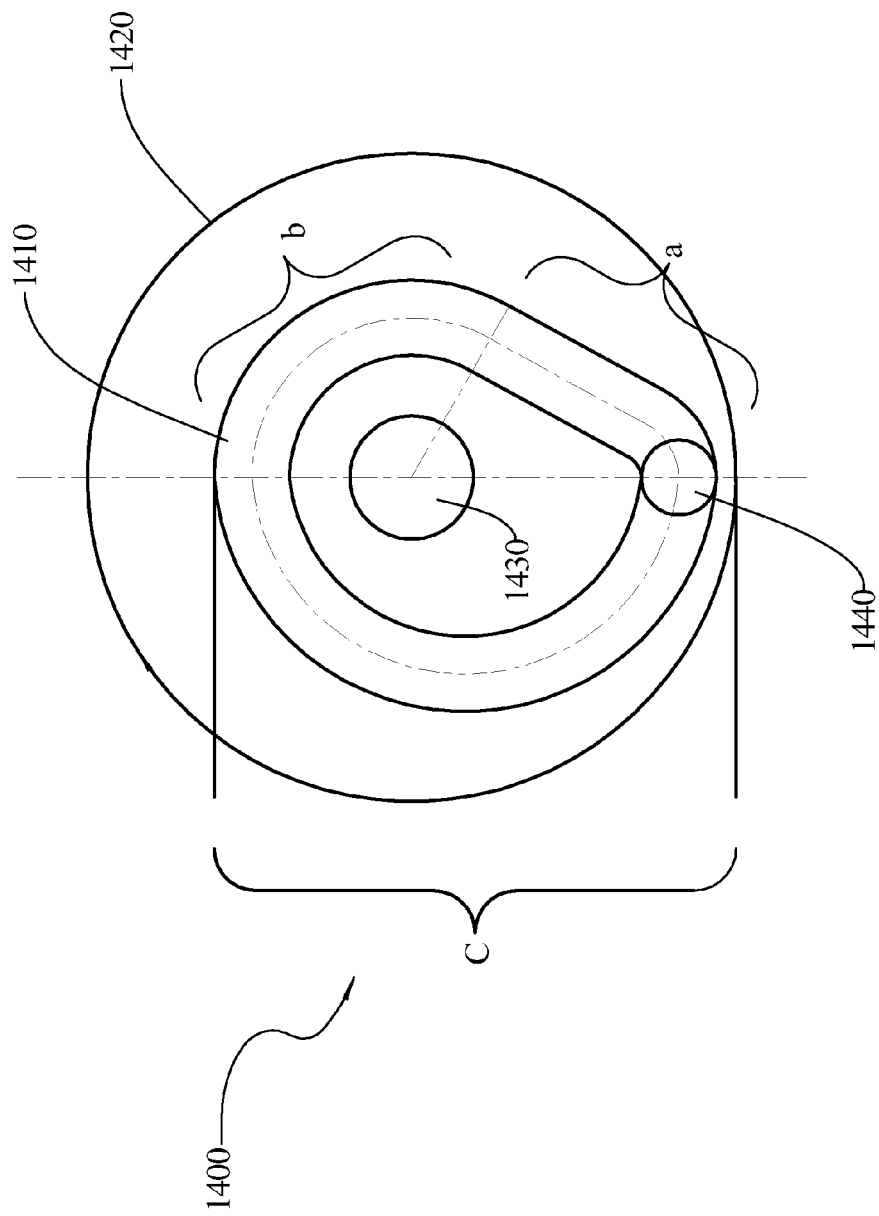
FIG. 35C illustrates an alternate embodiment for actuating the piston rod.
Figure 35D:
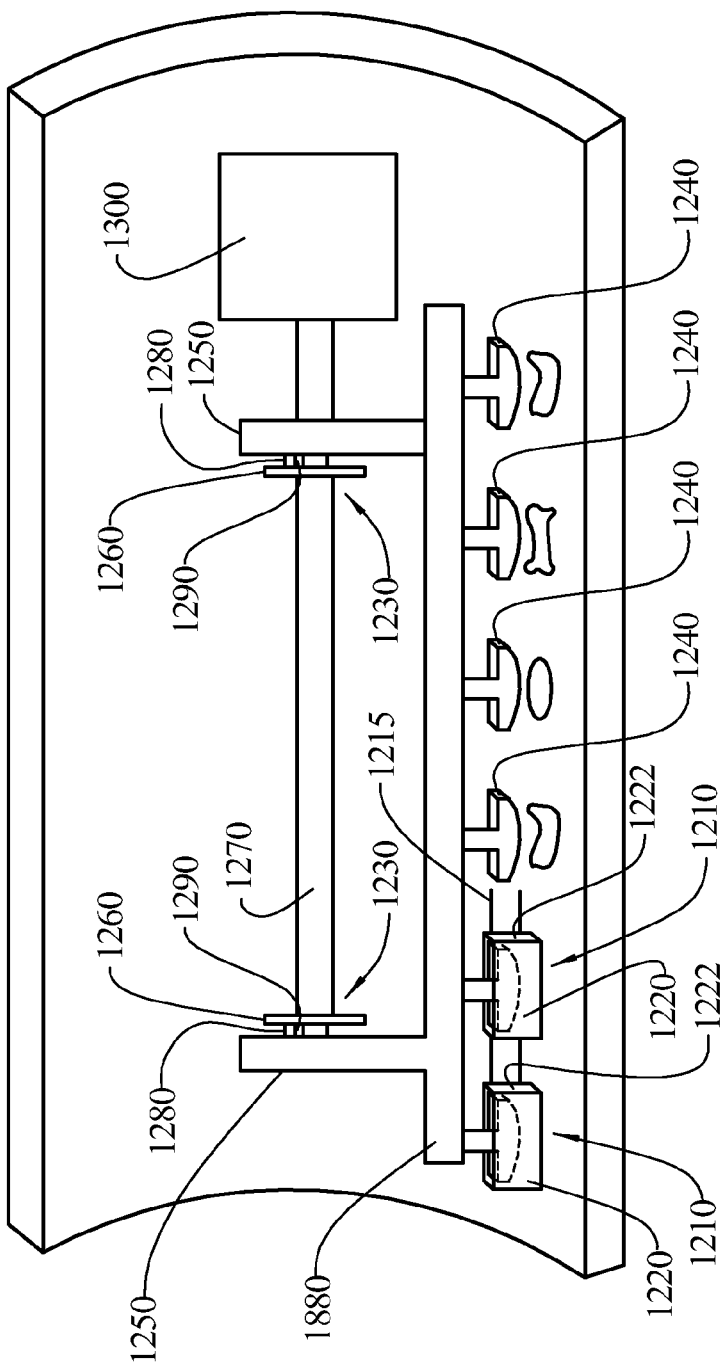
FIG. 35D illustrates an exemplary embodiment for operating the pistons.

FIG. 35C illustrates an alternate embodiment of the coupling mechanism 1400. The coupling mechanism 1400 comprises a D-shaped cam groove 1410 on the surface of a rotating disk 1420. The rotating disk can be driven by a common shaft 1430 in a similar fashion as described with respect to FIGS. 35 and 35D. Movement pin 1440 is disposed within the cam groove 1410. Movement pin 1440 is connected to the piston rod (not shown in FIG. 35C) such that movement of the pin 1440 within the cam groove actuates the up and down movement of the pistons to generate a downward burst of pressure and a gradual suction as the piston retracts within the air pressure region. Groove path portion "a" corresponds to a rise or retraction of the piston head. Groove path portion "b" maintains the piston head at a constant height during a dwell period. Groove path portion "c" corresponds to the downward movement of the piston to generate pressure.

FIG. 35E illustrates an alternate embodiment for a system of removing the molded food products 1450 from the mold cavity 1451. As illustrated, the rotary mold comprises a plurality of mold cavities 1451 around the perimeter of the rotary mold.

The system comprises a conveying surface 1460 disposed over a vacuum region 1470. The conveying surface 1460 is supported on a support frame 1462, illustrated schematically in FIGS. 35E and 35F. The vacuum region comprises a vacuum chamber 1480 connected to a vacuum source (not shown). The vacuum chamber has a top surface that is a gas permeable layer 1490. The gas permeable layer 1490 allows passing of air for transferring the vacuum force.

The idle roller 1465 is of a size and at a location relative to the rotary mold 1452 to contact the rotary mold 1452 at a point 1466 so as to allow the conveying surface 1460, in conjunction with a portion 1475 of the gas permeable layer 1490, to form a radius of curvature which conforms to the radius of curvature of the rotary mold. In an alternate embodiment, the support frame 1462 can be used to provide support for the portion 1463 of the conveying surface between the idle roller 1465 and the vacuum region 1470 such that portion 1463 conforms to the radius of curvature of the rotary mold.

Figure 35F:
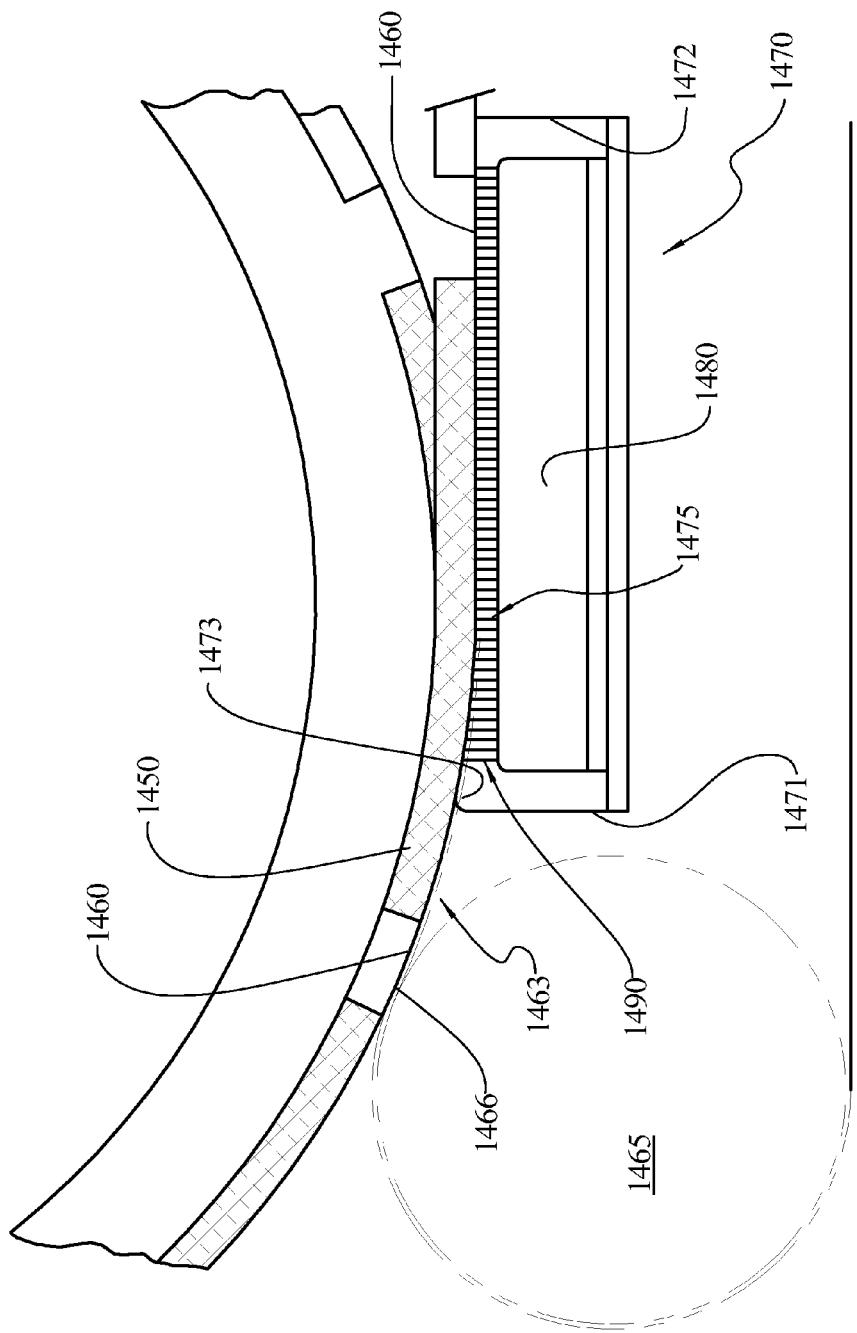
FIG. 35F is a close up view of portions of FIG. 35E.

FIG. 35F is an enlarged view of the region where the conveying surface contacts the molded food product. Downstream from the idle roller 1465, the conveying surface 1460 curves in accordance with the radius of curvature of the rotary mold to allow the molded food product to be in direct contact with the conveying surface 1460 when initially subjected to a vacuum force. A vacuum force is exerted on the mold patty as the mold patty increasingly makes contact with the conveying surface 1460.

The vacuum chamber comprises a first side wall 1471 and a second side wall 1472 downstream of the first side wall 1471. The first side wall is elongated such that it is taller than the second side wall 1472, and curves at the upper portion 1473 to assist in maintaining the radius of curvature of the conveying surface 1460. The conveying surface 1460 maintains its radius of curvature for a portion 1475 of the gas permeable layer 1490 as a result of the conveying surface's disposition on the curved top surface of the vacuum chamber. The gas permeable layer 1490 is shaped accordingly with a decreasing thickness in the downstream direction for a portion 1475 of the gas permeable layer 1490 on the top surface of the vacuum chamber to maintain the radius of curvature of the conveying surface 1460. The remainder of the gas permeable layer may be of constant thickness. The gas permeable layer 1490 may be made from sintered metal, polymeric material, ceramic, or any other suitable material. The gas permeable layer 1490 may also be a plate comprising a series of channels or other openings. The other openings or perforations on the top of the vacuum chamber can be arranged as holes, slots, or any other suitably sized and shaped arrangement which allows for passing of air therethrough and the vacuum force to be exerted.

The conveying surface can be a porous belt which allows the vacuum force to be exerted on the molded food product through the conveying surface. The porous belt maybe made of polytetraflouroethylene (PTFE), or any other suitable polymeric material or a combination thereof. The porous belt may be a 0.010 porous PTFE endless belt, or any belt with a suitable porosity. Other belt surface materials with desirable gas permeability can be used. Alternatively, the conveying surface can comprise of perforations, or comprise of belt strips to allow the vacuum force to be exerted on the molded food product.

Figure 60:
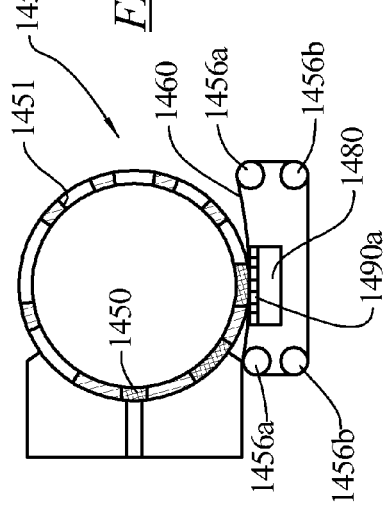

In one embodiment (FIG. 60) a vacuum chamber 1480 arranged below a porous conveying surface 1460 moving underneath a rotary mold 1452 has a flat top surface 1490a that is gas permeable. The flat top surface 1490a is in contact with the rotary mold. The conveying surface is endlessly driven between at least two rollers 1456a, at least one of which is a driving roller. Alternatively, one of the rollers 1456b can be the driving roller. Both rollers 1456a are raised above the top of the vacuum chamber 1480 such that the portion of the conveying surface between the two rollers is curved about the rotary mold.

Figure 61:
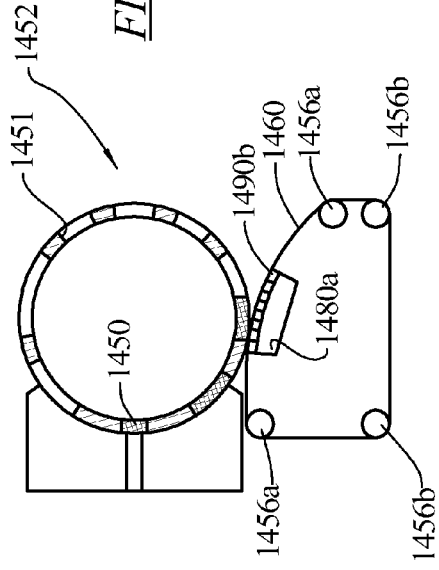
FIGS. 60-63 illustrate various embodiments of a food product removal system having a vacuum chamber disposed below the rotary mold.

In another embodiment (FIG. 61) the vacuum chamber 1480a has a curved top surface 1490b that is convex to provide additional clearance such as for when thicker food products are being produced. The porous conveying surface 1460 is disposed over the convex vacuum chamber 1480a and supported on either end by a roller 1456a. The rollers 1456a on either end of the conveying surface are arranged in a position to maintain a radius of curvature of the conveying surface that corresponds to the curvature of the vacuum chamber.

Figure 62:
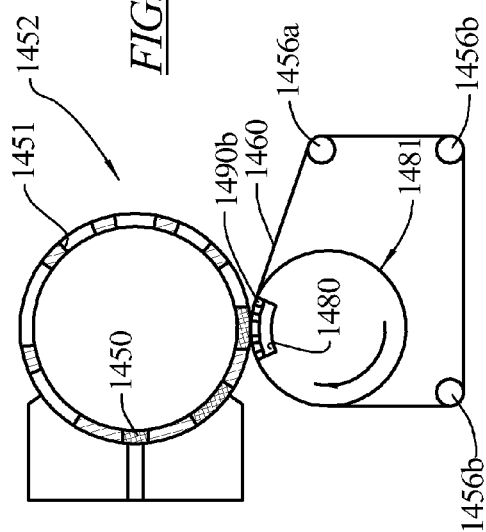

In an alternate embodiment (FIG. 62), the porous conveying surface 1460 is disposed over a roller 1456a on one end and a vacuum roll 1481 on the opposite end. The vacuum roll 1481 comprises a vacuum chamber 1480 that is disposed on the vacuum roll 1481. The vacuum roll is a driven vacuum roll. The vacuum roll may be driven such that the timing of rotation of the vacuum chamber coincides with each arrival of a filled mold cavity. In one embodiment, the leading edge of the mold cavity makes contact with the vacuum chamber when it has rotated to its lowest position on the rotary mold. The circumferential width of the vacuum surface may be the same or different size as the width of a mold cavity, or the width of the vacuum surface may be larger or smaller than the width of a mold cavity.

Figure 63:
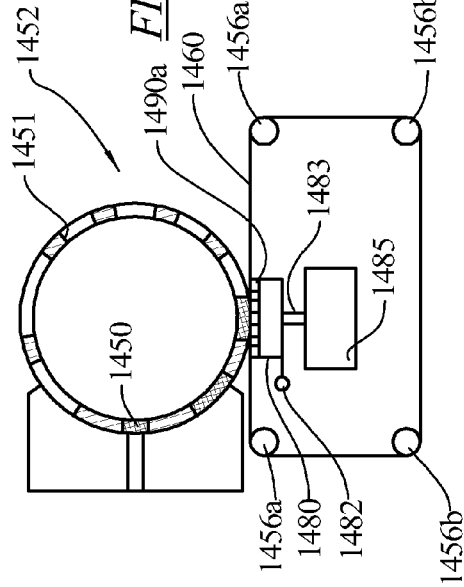

In another embodiment (FIG. 63) the vacuum chamber is disposed below the rotary mold and can pivot in and out of contact with the rotary mold about a pivot point 1482. The vacuum chamber may be any of the vacuum chambers described above, having a flat, concave, or convex gas permeable top surface. A poppet valve 1483 can be used to dose off the connection between the vacuum chamber 1480 and a vacuum source 1485 to preserve the vacuum when the vacuum chamber is pivoted out of contact from the conveying surface 1460.

Any other combination of arrangements of curved or flat vacuum chambers with conveyor belts disposed between rollers known to one skilled in the art can be used to achieve the desired removal effect of a molded food product.

FIG. 570 illustrates an alternate embodiment for a system of removing molded food products from the cavities of a rotary mold. An air it pact system or "air knife" system 5000 as illustrated in FIG. 57D comprises an elongated air nozzle or air knife 5030 mounted to the mandrel 5010 of the rotary mold cylinder. The air knife 5030 is secured to a support bracket 5020 by at least one bolt 5021a. Bolt 5021b secures the support bracket 5020 to the mandrel 5010. As illustrated in FIG. 58, the air knife 5030 comprises two members 5032 and 5031 connected to each other by way of screws such as screw 5033. The air knife has an inlet member 5031 which houses an inlet 5050 to receive a source of pressurized air flow. The air knife has a nozzle member 5032 which when dispose in contact against the inlet member 5031, forms a longitudinally slotted nozzle 5060 for at least a portion of the length of the air knife 5030. In some embodiments the slotted nozzle 5060 may extend for the entire length of the air knife 5030. The aft knife may be any suitable air knife, or can be an knife such as the SUPER AIR KNIFE™ manufactured by Exair Corporation, located in Cincinnati, Ohio. The air knife may be made of stainless steel, or any other alloys, or any suitable metals, or any other suitable material can also be used. The nozzle may be a slit 0.002 inches wide, or the nozzle may be wider or narrower depending on the desired airflow dynamic.

The air knife 5030 provides a sheet of airflow 5070. In one embodiment the sheet of airflow is a uniform sheet of air across the entire length of the air knife. The air knife is arranged such that the air flow is directed in a downwards direction, towards molded food products 5080 within a mold cavity which has rotated to the eject position. The source of airflow can be compressed air, or any suitable gas which can flow out of the nozzle at a sufficient rate to generate a force to remove the food product from its mold. The sheet of airflow is of a sufficient size to span the width of a row of mold cavities. Multiple air knives may be connected end to end to achieve the desired air flow sheet size.

Figure 57C:
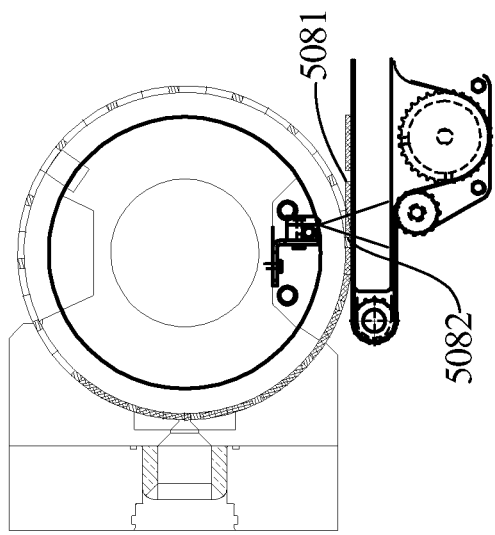
FIGS. 57A-57C illustrates the progression of removal of molded food product from a mold cavity by one embodiment of the air knife system.
Figure 57B:
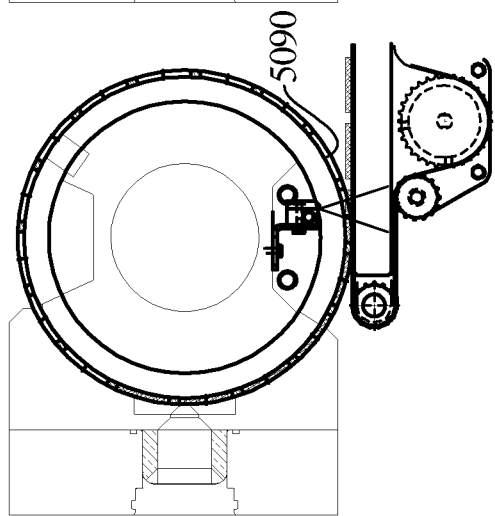
Figure 57A:
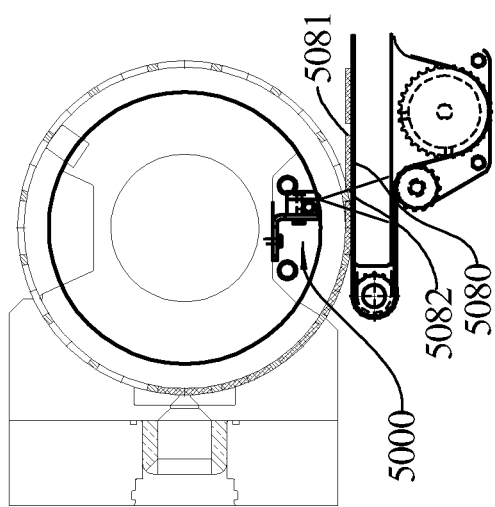
Figure 59:
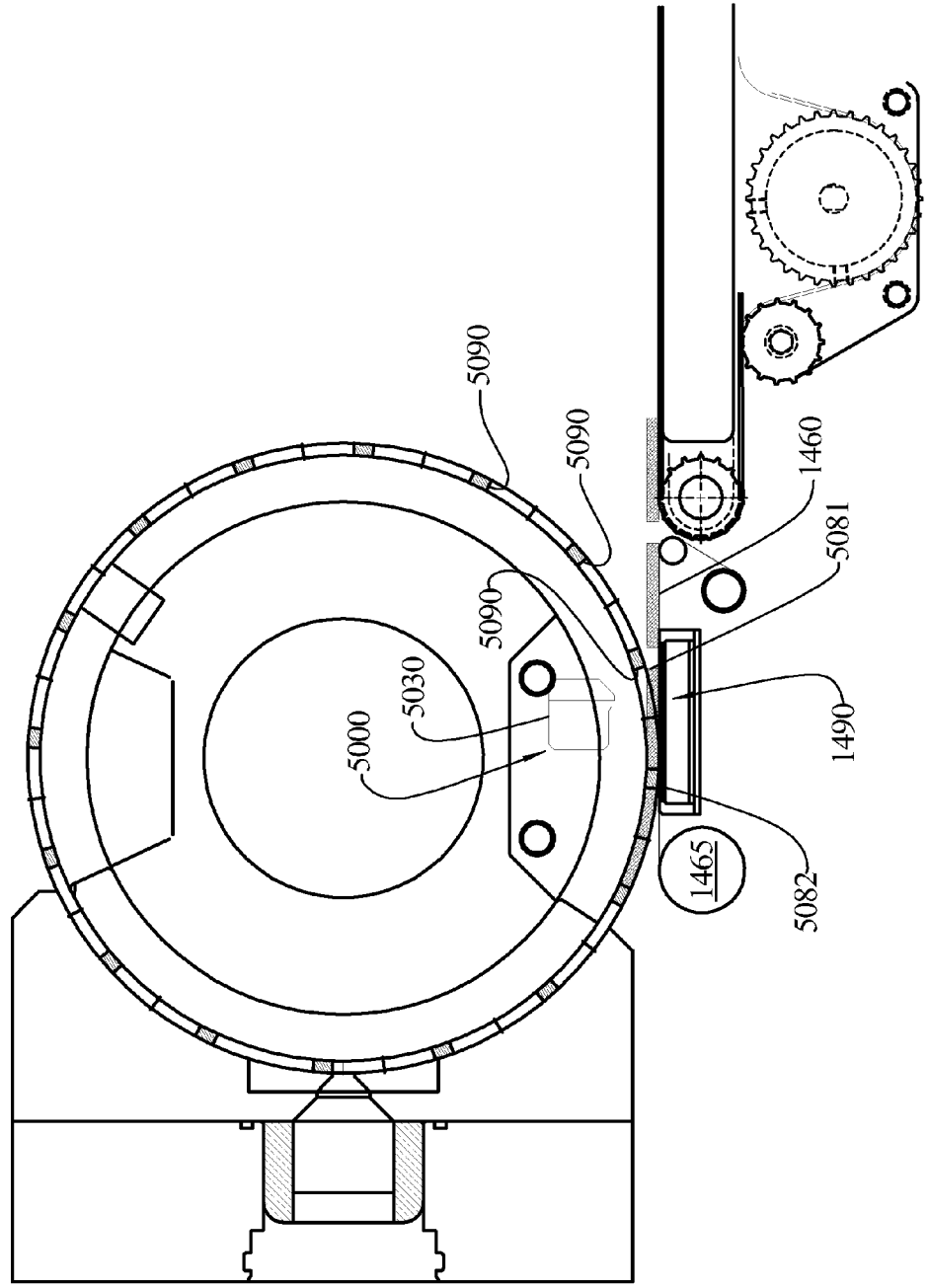
FIG. 59 illustrates one embodiment of the air knife system used in combination with a vacuum chamber disposed below the molded food product to remove the molded food product.

FIGS. 57A-57C illustrates the process of removing a molded food product using the air knife. FIGS. 57A-57C illustrate the progression of the food product 5080 removal as the mold rotates about the stationary air knife 5030. Molded food product 5080 has a leading edge 5081 and a trailing edge 5082. The leading edge 5081 of the food product first comes into contact with the sheet of airflow 5070 which provides enough force by impact of the air stream to dislodge the leading edge 5081 of the molded food product from the mold cavity. As the rotary mold turns, the sheet of airflow dislodges the molded food product starting from the leading edge 5081 end towards the trailing edge 5082 end. As the portion of the molded food product becomes dislodged from the mold cavity, the dislodged portion of the molded food product becomes disposed on to a conveying surface. In the embodiment illustrated in FIGS. 57A-59, the conveying surface is in tangential contact with the rotary mold cylinder. In other embodiments, the conveying surface may be below the rotary mold cylinder such that there is space between the conveying surface and the molded food product.

In one embodiment, the air knife system 5000 can be used in combination with any of the systems of removing melded food products described above, wherein the rotary mold rotates over a conveying surface having a vacuum force disposed below the conveying surface. In the embodiment illustrated in FIG. 59, a porous conveying surface 1460 is disposed in tangential contact with the surface of the rotary mold. A vacuum chamber 1480 disposed beneath the conveying surface 1460 has a gas permeable 1490 on the top surface of the vacuum chamber which is flat. The flat gas permeable layer 1490 supports the conveying surface 1460 to make tangential contact with the surface of the rotary mold. An idle roller 1465 is disposed on one end of the endless conveying surface 1460 and supports the endless conveying surface. In the embodiment illustrated in FIG. 59, the air knife system 5000 is used to exert a downward force from within the mold cylinder to push the molded food product from the mold cavity, while the molded food product, as it makes contact with the porous conveying surface disposed over the vacuum chamber, is pulled downwards onto the conveying surface by the vacuum force.

In other embodiments, the vacuum chamber may have a curved—convex or concaved—top surface for providing contact with the mold cavity, and may be positioned along the conveying surface at various positions with various configurations of the conveying surface.

Rotary Mold for Forming Contoured Products

FIG. 36 illustrates an alternate embodiment of a rotary molding system for forming contoured food products such as a food product shaped like a drumstick illustrated in FIG. 41. The invention is not limited to this shape, or even to the shape of an identifiable food item, and instead can be any shape which may have consumer appeal. The rotary molding system comprises a fill plate 1760, the rotary mold 1900, and the wear plate 1770. The fill plate 1760 and wear plate 1770 is in contact with a portion of the rotary mold 1900 defined by the intersection of an angle "a" with the rotary mold 1900, as illustrated in FIG. 19. The angle "a" may be 120 degrees.

FIG. 36 illustrates perspective cross sectional view across a set of mold cavities 1910 while the mold cavities are between the fill plate 1760 and the wear plate 1770. The rotary mold 1900 includes alternating flat plate regions 1082 and shaped regions 1086. The shaped regions 1086 extend circumferentially and are shaped to resemble the cross section of an identifiable food product, for example, a drumstick. FIG. 39 illustrates a cross section of the mold cavity 1910 and a portion of the flat plate regions 1082 and the shaped regions 1086. FIG. 40 illustrates a cross section of the shaped regions 1086, with the flat plate regions 1082 on either side. The rotary mold has a shaped region which protrudes on both the fill plate side and the wear plate side of the rotary mold.

As shown in FIGS. 36 and 37, the fill plate 1760 on the surface that comes in contact with the rotary mold, has a contoured surface that extends circumferentially for the entire portion of the fill plate in contact with the rotary mold, which has a shape conforming close to the contours as defined by shaped regions and flat regions of the rotary mold. In a similar fashion, the wear plate 1770 on the surface that comes in contact with the rotary mold, has a contoured surface that extends for the entire portion of the wear plate in contact with the rotary mold, which has a shape conforming close to the contours as defined by the shaped regions and flat regions of the rotary mold.

As shown in FIG. 36, each shaped region 1086 or the rotary mold 1900 contains several cavities arranged along the circumference of the rotary mold. Although three rows of shaped regions 1086 are shown, any number of rows are encompassed by the invention. The cavities can be in staggered rows, or straight rows. The cavities 1910 have an irregular or curved profile as illustrated in FIG. 36. The profile is curved to simulate a chicken drumstick. Other shaped cavities can be used.

Fill plate 1760 and any breather or vacuum regions as discussed above, includes the contoured surfaces as illustrated in FIGS. 36 and 37, which adapt to the flat plate regions 1082 and the shaped regions 1086 of the rotary mold 1900. The fill plate 1760 includes a contoured surface having flat areas 1182 that correspond in position to the flat plate regions 1082 of the rotary mold, and recessed areas 1186 that correspond in shape to the shaped regions 1086 of the rotary mold.

Wear plate 1770 comprises a contoured surface as illustrated in FIGS. 36 and 38. The contoured surface includes flat regions 1282 and recessed regions 1286 which correspond to the flat plate regions 1182 and shaped regions 1186 of the rotary mold.

Figure 42:
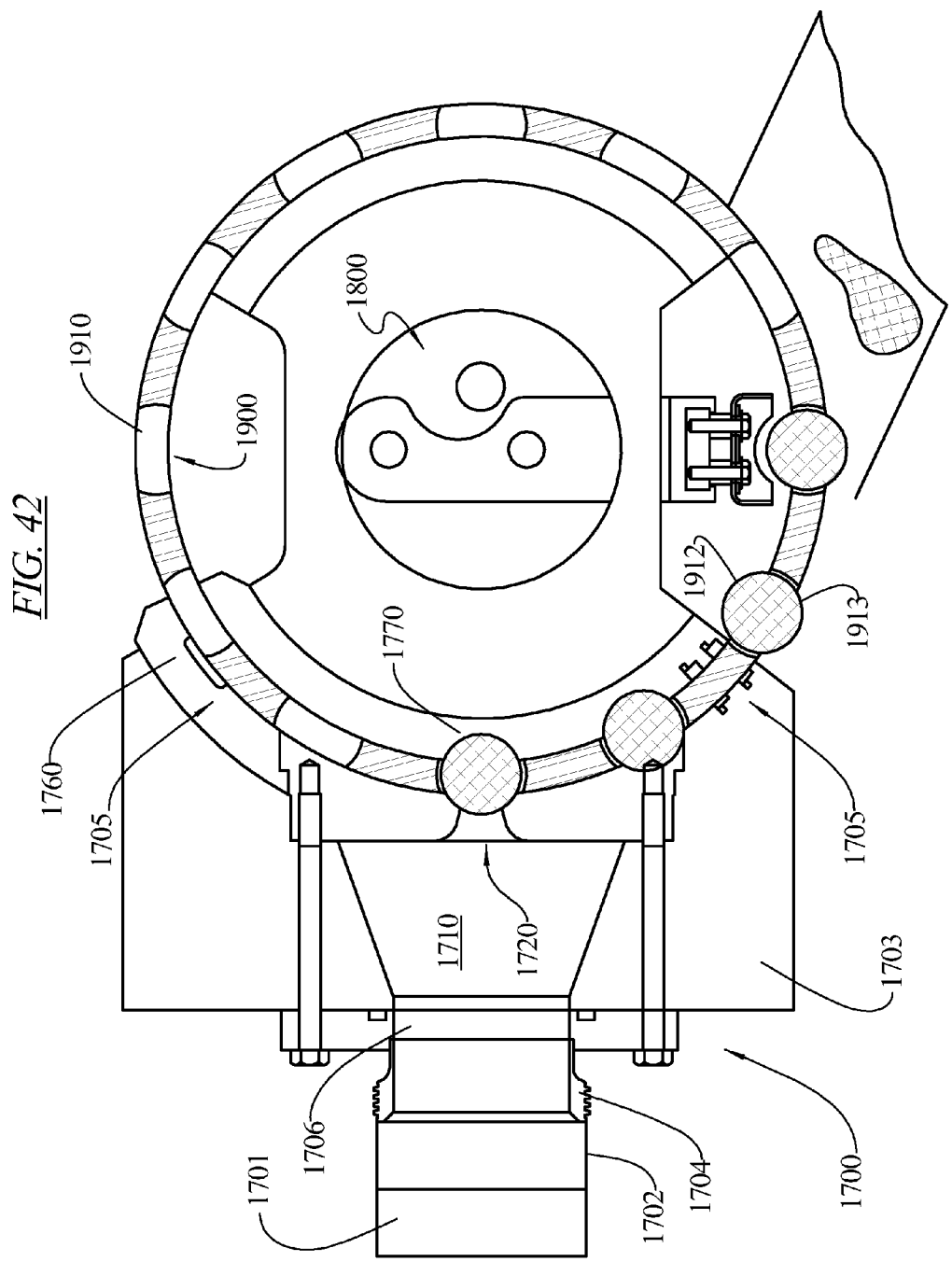
FIG. 42 is a side view of the rotary molding system of FIG. 36.

FIG. 42 illustrates the feeder portion 1700 of a rotary molding system which can be used with the rotary mold for forming contoured products. The feeder portion comprises a feeding channel 1710 within a feed plate 1703. The feed plate 1703 comprises a curved portion 1705 which is adapted to complement the curvature of the rotary mold 1900.

The food product enters the feeding channel 1710 at a feeding channel inlet 1706 located generally in the central region of the feed plate 1703 as illustrated in FIG. 42. From the channel inlet 1706, the food channel 1710 gradually fans out to a length corresponding approximately to the distance spanned by a longitudinal row of mold cavities, to ensure delivery of food product to all mold cavities within a longitudinal row. The feeding channel 1710 has a frustoconical cross section, as illustrated in FIG. 42, which assists in gradually increasing the pressure of the food product as the food product moves toward the rotary mold for injection into mold cavities 1910.

A feeding channel adaptor 1704 is used to connect the feeding channel to a source of pumped food product. Food product is moved into the feeding channel 1710 from a food hopper 1701 using a pump 1702 as discussed above with respect to the previous embodiment of the invention, and illustrated schematically in FIG. 42.

The fill plate 1760, as illustrated in FIGS. 36 and 42, is a curved plate disposed in contact with the curved portion 1705 of the feed plate 1703. The fill plate 7160 is disposed between the rotary mold 900 and the feed plate 1703. The fill plate 1760 comprises a feeder inlet passage 1720 through which the food product passes to enter the mold cavities 1910.

The mold cavities 1910 within the rotary mold 1900 provide the contours of the side 1911 of the molded food product (FIG. 41). To form a mold product with the contoured top surface 1912 and bottom surface 1913, a mold cavity with three dimensional contours is formed within the region defined by the mold cavities 1910, the contoured surface of the fill plate 1760 and the contoured surface of the wear plate 1770. A feeder inlet passage 1720 for each three dimensional contoured mold cavity can be used, or the feeder inlet passage may span a length corresponding to the length spanned by a row of mold cavities. Other arrangements for a feeder inlet passage, include those discussed previously, can be used.

As illustrated in FIG. 42, once the filled mold cavity leaves the fill station and exits from between the space formed between the fill plate and the wear plate, the top and bottom surfaces 1912, 1913 of the contoured mold product are exposed. The contoured mold product is supported by the side walls of the mold cavity. Once the contoured mold product is in an eject position under the knock out mechanism, knock-out cups shaped to complement the contours of the top surface 1912 are used to remove the molded food product from the mold cavity.

FIG. 41 illustrates a completed molded food product. The product includes a contoured top surface 1912 being curved in the horizontal as well as the vertical place, a contoured bottom surface 1913, also being contoured in the vertical and horizontal planes, and contoured side surfaces 1911 which are contoured in the horizontal plane.

Various knock out mechanisms 1800 (FIG. 42) may be used with the rotary mold 1900. Knock-out mechanism can utilize an air pressure region which exerts a force sufficient to eject the food product from the mold. Pressurized air can be transported to the air pressure region via air channels, or a piston within the air pressure region is actuated to extend rapidly from a retracted position to generate air pressure. The end of the piston may be a knock out member shaped to correspond to the shaped regions of the rotary mold such that the piston may extend to a position close to the molded food product than would be possible with a non-contoured knock-out member. The use of knock out cups which come into contact with the food product may also be used. The knock out cups will have an identical, albeit slightly smaller, outside perimeter such that the knock out cups can pass downwardly into at least a portion of the mold cavities to remove the molded product within. The knock-out cups include a bottom surface which conforms to shape to the shaped region 1086 of the rotary mold. In one embodiment, the knock out cups are mounted to a knock out assembly described with respect to FIGS. 19-21 and 25. Other knock-out mechanisms may be used.

In operation, the contoured mold cavities are filled in their fill position and rotate counterclockwise to the eject position. As they rotate toward the eject position, the molded food product rotates out from between the fill plate and the wear plate which formed the mold cavity surface on either side of the rotary mold. As the molded food patty is rotated away from the fill position by the rotary mold, the molded food patty has exposed surfaces extending from the rotary mold cavity on either side.

Figure 43:
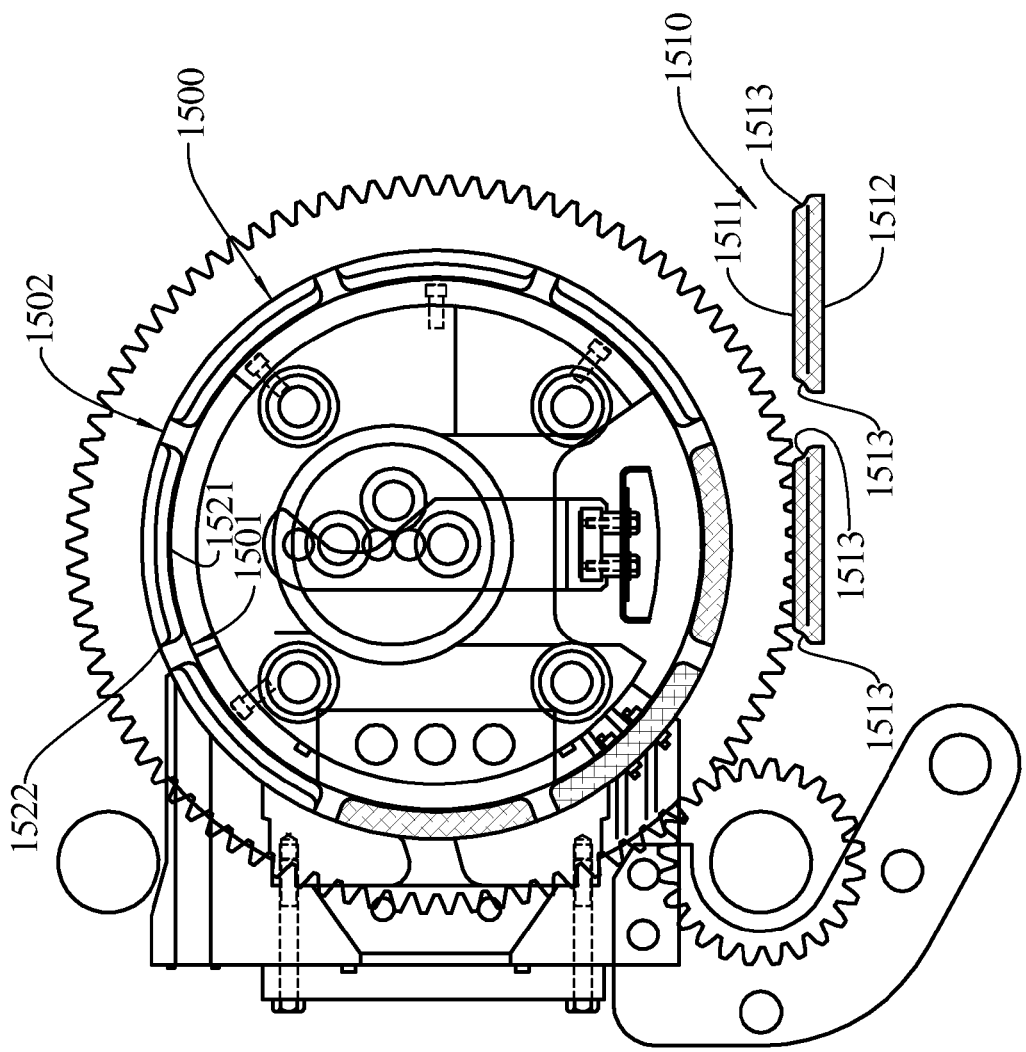
FIG. 43 is a side view of an alternate embodiment of the rotary molding apparatus for forming contoured food products.
Figure 44:
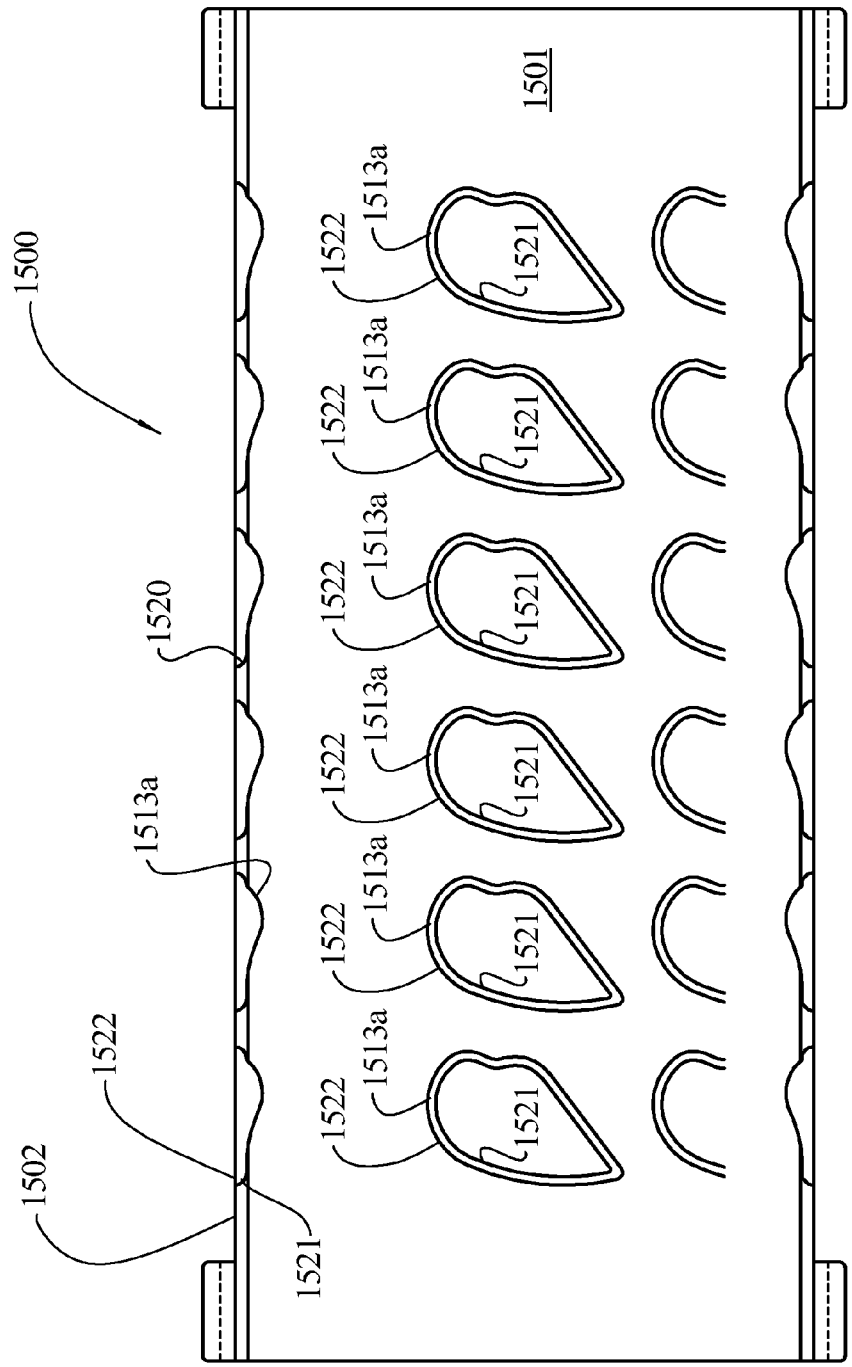
FIG. 44 is a longitudinal cross section view of the rotary mold for forming contoured food products.

FIGS. 43 and 44 illustrate an alternate embodiment of the rotary mold for forming food products with a beveled edge. Such contoured food products which comprise two flat surfaces 1511, 1512 and a beveled side edge 1513 can be made with the rotary mold as illustrated in FIG. 44. FIG. 44 is a longitudinal cross sectional view of the rotary mold. Mold cavity opening 1521 on the inner surface 1501 of the rotary mold is illustrated in solid lines while mold cavity opening 1522 on the outer surface is illustrated in dashed lines. The beveled edge 1513a of the mold cavity allows for a continuous connection of the mold cavity openings 1521 and 1522. The mold cavities 1520 in FIG. 44 are contoured in the vertical and horizontal planes. Because the resulting molded food product is flat on both surfaces 1511 and 1512, a mold cavity entirely contained within the thickness of the rotary mold suffices to produce the desired product. The portion of the fill plate and wear plate in contact with the rotary mold at the fill station are flat. Any of the mechanisms described above can be used to remove the product. If a knock-out cup is used, the knock out cup should be shaped to fit within the mold cavity opening 1521.

From the foregoing, it gill be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the extent that the references are not inconsistent with the present disclosure and to the same extent as if each reference were individually and specifically indicated to be incorporated by reference and were set forth in its entirety herein.

The invention claimed is:

1. A rotary mold system for molding three dimensional food products from a food mass comprising:
   a fill plate having an outer surface in contact with a feed source, and a inner surface;
   a wear plate having an outer surface facing the inner surface of the fill plate;
   a cylindrical mold shell with mold shapes, the mold shell having an inner and outer surface, said mold shell rotating between the fill plate and the wear plate, the fill plate in contact with the outer surface of the mold shell, the wear plate in contact with the inner surface of the mold shell;
   mold cavities formed when mold shapes are between the fill plate and the wear plate, said mold cavities having a depth corresponding to the thickness of the mold shell, and said mold cavities having a bottom surface formed by the outer surface of the wear plate; and
   a knock out mechanism comprising at least one knock out cup disposed within the cylindrical mold shell for removing the mold shapes from the mold cavity.

2. The rotary mold system of claim 1 wherein the knock out cup travels along a trajectory to coincide with the rotation of the cylindrical mold to allow the knock out cup to pass through at least a portion of the mold cavity.

3. The rotary mold system of claim 2 wherein the trajectory of the knock out cup has translational motion component, said translational motion component of the knock out cup trajectory is in the same direction of rotation as the mold cavity.

4. The rotary mold system of claim 2 wherein the trajectory comprises an upward stroke and a downward stroke, the downward stroke of the knock out cup comprises a net lateral movement in one direction, and the upward stroke of the knock out up comprises a net lateral movement in the opposite direction.

5. The rotary mold system of claim 1 wherein the knock out mechanism comprises at least two knock out cups arranged in a row along the axial length of the cylindrical mold shell, the at least two knock out cups connected to a common support bar.

6. A knock out mechanism - a rotary molding system, the molding system having a fill plate, a wear plate, and a cylindrical mold shell, the cylindrical mold shell rotating between the wear and fill plate, the knock out mechanism having knock out cups disposed within a rotary mold, comprising:
- a support bar in connection with the knock out cups, said support bar arranged horizontally such that knock out cups extend downward from the support bar;
- a movement plate connected to the support bar, the movement plate imparting motion to the support bar by being in connection with a pair of eccentrically mounted pins which are each eccentrically mounted on a driven gear; and
- a driving gear which dives the driven gear.

7. The knock out mechanism of claim 6 further comprising:
- a stabilizing plate connected to the wear plate and extending into the region within the mold shell;
- a shaft journalled through a support hole within the stabilizing plate, the shaft connected to a motor on one end, and the driving gear on the opposite end.

8. The knock out mechanism of claim 7 comprising two stabilizing plates.

9. A mold system for molding three dimensional food products from a food mass comprising:
- a fill plate having an outer surface in contact wth a feed source, and an inner surface;
- a wear plate having an outer surface facing the inner surface of the interface plate;
- a cylindrical mold shell with mold shapes, the mold shell having an inner and outer surface, said mold shell rotating between the fill plate and the wear plate, the fill plate in contact with the outer surface of the mold shell, the wear plate in contact with the inner surface of the mold shell;
- mold cavities formed when mold shapes are between the fill plate and the wear plate, said mold cavities having a depth corresponding to the thickness of the mold shell, and said mold cavities having a bottom surface formed by the outer surface of the wear plate; and
- a knock out mechanism comprising a knock out bar connected to knock out cups disposed within the mold shell;
- a first identification system for storing and retrieving information pertaining to the mold shell;
- a second identification system for storing and retrieving information pertaining to the knock out bar; and
- a processing unit for comparing information retrieved from the first and second identification system.

10. The mold system of claim 9 wherein the first identification system comprises a first RFID tag and a first RFID sensor; and wherein the second identification system comprises a second RFID tag and a second RFID sensor.

11. The mold system of claim 10 wherein the first RFID tag is disposed on the mold shell.

12. The mold system of claim 10 wherein the second RFD tag is disposed on the movement bar.

* * * * *